(12) United States Patent
Kirshon

(10) Patent No.: US 10,531,699 B2
(45) Date of Patent: Jan. 14, 2020

(54) IMPACT DISSIPATING LINERS AND METHODS OF FABRICATING IMPACT-DISSIPATING LINERS

(71) Applicant: Impact Technologies, LLC, Cleverdale, NY (US)

(72) Inventor: Jason E. Kirshon, Albany, NY (US)

(73) Assignee: Impact Technologies, LLC, Cleverdale, NY (US)

( * ) Notice: Subject to any disclaimer, the term of this patent is extended or adjusted under 35 U.S.C. 154(b) by 57 days.

(21) Appl. No.: 15/833,747

(22) Filed: Dec. 6, 2017

(65) Prior Publication Data

US 2018/0153244 A1 Jun. 7, 2018

Related U.S. Application Data

(60) Provisional application No. 62/430,420, filed on Dec. 6, 2016.

(51) Int. Cl.
*A42B 3/12* (2006.01)
*B29D 99/00* (2010.01)
(Continued)

(52) U.S. Cl.
CPC .............. *A42B 3/121* (2013.01); *A42B 3/125* (2013.01); *B29C 39/026* (2013.01); *B29C 39/10* (2013.01); *B29C 71/0009* (2013.01); *B29D 99/0064* (2013.01); *F41H 1/08* (2013.01); *B29K 2007/00* (2013.01); *B29K 2021/003* (2013.01); *B29K 2023/06* (2013.01); *B29K 2023/12* (2013.01); *B29K 2023/16* (2013.01);
(Continued)

(58) Field of Classification Search
CPC .......... A42B 3/121; A42B 3/124; A42B 3/125; A42B 3/127; A42C 2/00; F41H 11/08
USPC ............................................................. 2/413
See application file for complete search history.

(56) References Cited

U.S. PATENT DOCUMENTS

| | | |
|---|---|---|
| 3,039,109 A | 6/1962 | Simpson |
| 3,600,714 A | 8/1971 | Cade et al. |

(Continued)

OTHER PUBLICATIONS

International Search Report from corresponding PCT application PCT/US2017/064936, dated Apr. 30, 2018, 6 pages.

(Continued)

*Primary Examiner* — Gloria M Hale
(74) *Attorney, Agent, or Firm* — Tech Valley Patent, LLC; John Pietrangelp

(57) ABSTRACT

Impact-dissipating liners, helmets having an impact-dissipating liner, and methods of fabricating impact-dissipating liners are provided. The liners include a fluid impermeable enclosure having cavities with sidewalls and a fluid contained in the enclosure. The enclosure may have a central portion and lobes extending from the central portion, wherein the central portion and the lobes are adapted to conform to the shape of an internal surface of a helmet. The helmets may include bodies positioned within the cavities of the liner, where, under impact loading, contact between the bodies and the liner absorbs at least some of the energy of the impact loading. Aspects of the invention are particularly adapted for use for head protection, such as, helmets; however, aspects of the invention are also adaptable to provide impact-dissipation for any body or surface that would benefit from such protection.

20 Claims, 52 Drawing Sheets

(51) Int. Cl.

| | | |
|---|---|---|
| *B29C 39/02* | (2006.01) | |
| *B29C 39/10* | (2006.01) | |
| *B29C 71/00* | (2006.01) | |
| *F41H 1/08* | (2006.01) | |
| *B29K 25/00* | (2006.01) | |
| *B29L 31/48* | (2006.01) | |
| *B29K 83/00* | (2006.01) | |
| *B29K 23/00* | (2006.01) | |
| *B29K 21/00* | (2006.01) | |
| *B29K 7/00* | (2006.01) | |
| *B29K 27/06* | (2006.01) | |
| *B29K 77/00* | (2006.01) | |
| *B29K 67/00* | (2006.01) | |
| *B29K 27/18* | (2006.01) | |

(52) U.S. Cl.
 CPC ...... *B29K 2025/04* (2013.01); *B29K 2027/06* (2013.01); *B29K 2027/18* (2013.01); *B29K 2067/003* (2013.01); *B29K 2077/00* (2013.01); *B29K 2083/005* (2013.01); *B29L 2031/4821* (2013.01)

(56) References Cited

U.S. PATENT DOCUMENTS

| | | |
|---|---|---|
| 3,994,022 A | 11/1976 | Villari et al. |
| 4,534,068 A | 8/1985 | Mitchell et al. |
| 4,586,200 A | 5/1986 | Poon |
| 5,148,950 A | 9/1992 | Hosaka |
| 5,669,079 A | 9/1997 | Morgan |
| 6,117,176 A | 9/2000 | Chen |
| 6,434,755 B1 | 8/2002 | Halstead et al. |
| 6,493,881 B1 | 12/2002 | Picotte |
| 6,865,759 B2 | 3/2005 | Pearce |
| 7,140,126 B2 | 11/2006 | Crane et al. |
| 8,739,316 B1 | 6/2014 | Norton |
| 8,856,972 B2 | 10/2014 | Kirshon |
| 9,314,060 B2 * | 4/2016 | Giles .................. A42B 3/00 |
| D844,252 S * | 3/2019 | Kirshon .................. D29/102 |
| D853,038 S * | 7/2019 | Kirshon .................. D29/102 |
| 2006/0059606 A1 | 3/2006 | Ferrara |
| 2006/0075544 A1 | 4/2006 | Kriesel et al. |
| 2008/0307569 A1 | 12/2008 | Roberts |
| 2009/0158506 A1 | 6/2009 | Thompson et al. |
| 2012/0151664 A1 * | 6/2012 | Kirshon .................. A42B 3/121 2/413 |
| 2013/0340147 A1 * | 12/2013 | Giles .................. A42B 3/00 2/412 |
| 2015/0164172 A1 * | 6/2015 | Linares .................. A42B 3/064 2/411 |
| 2016/0295949 A1 * | 10/2016 | Giles .................. A42B 3/00 |
| 2018/0153244 A1 * | 6/2018 | Kirshon .................. A42B 3/121 |
| 2018/0184745 A1 * | 7/2018 | Stone .................. A42B 3/064 |

OTHER PUBLICATIONS

Written Opinion from corresponding PCT application PCT/US2017/064936, dated Apr. 30, 2018, undated, 9 pages.

* cited by examiner

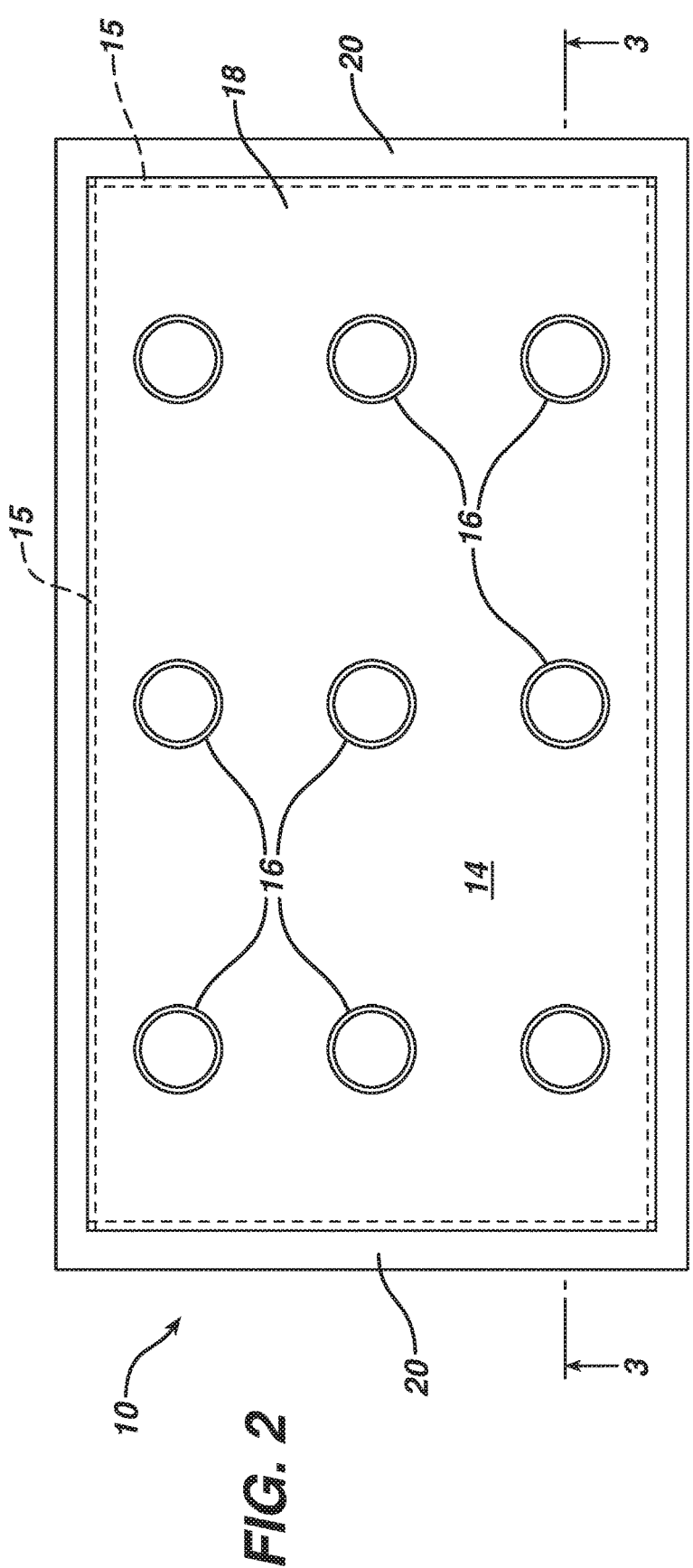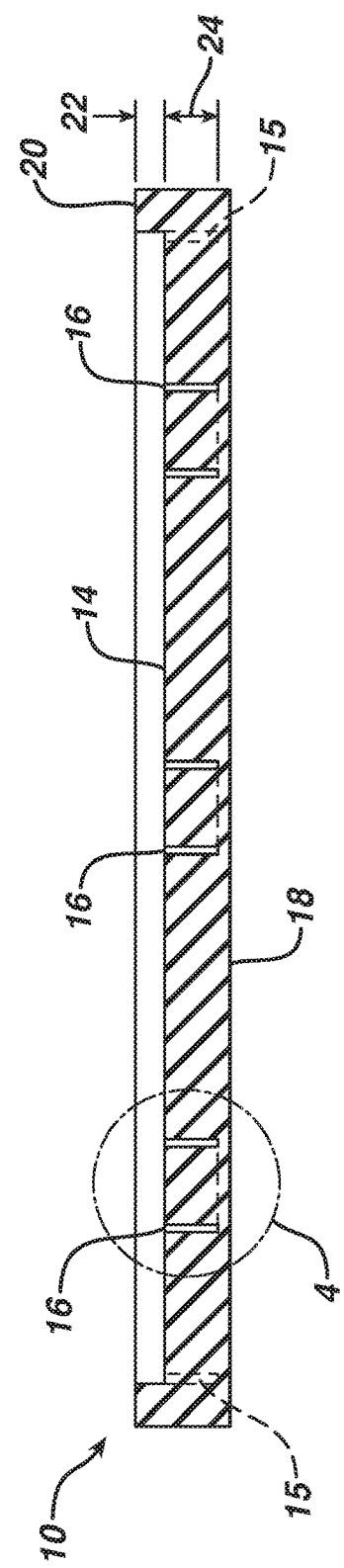

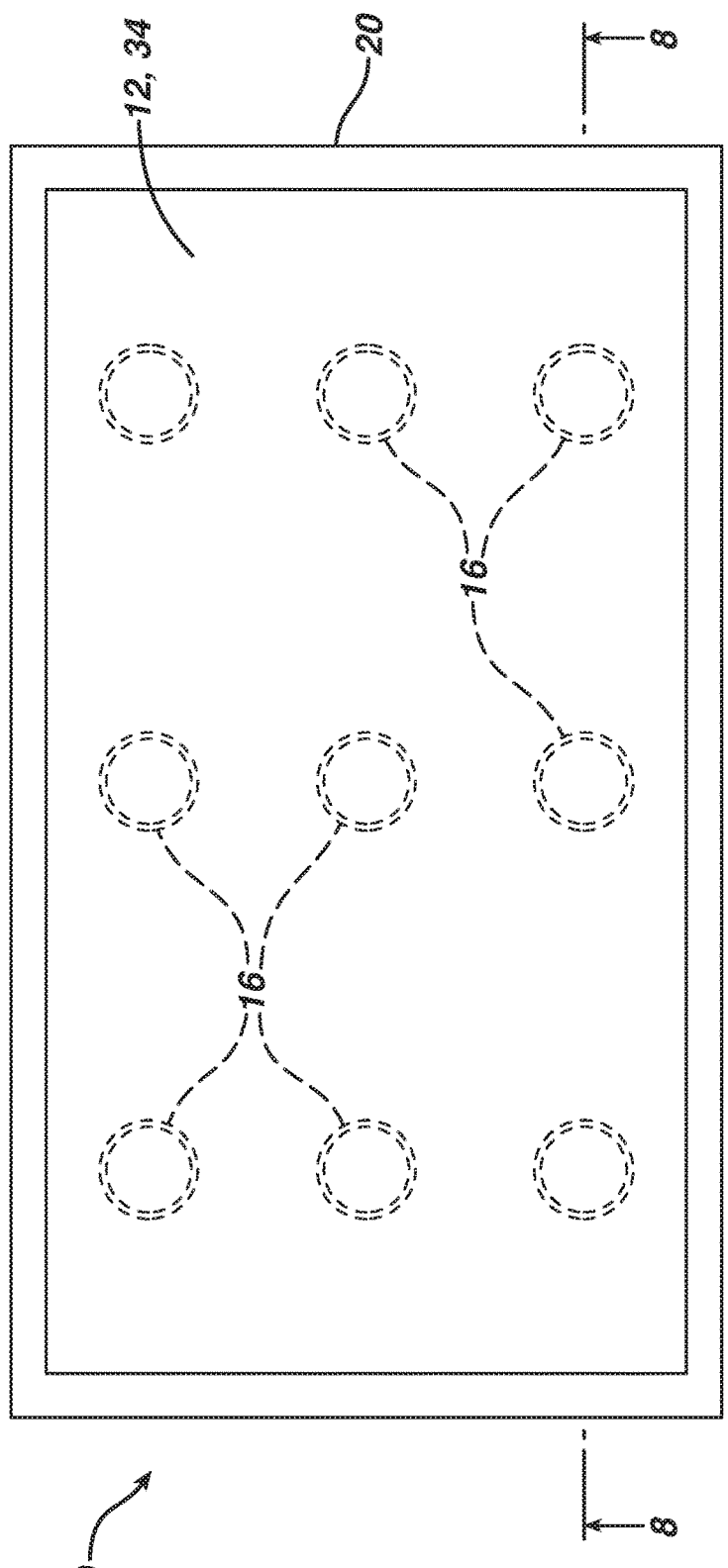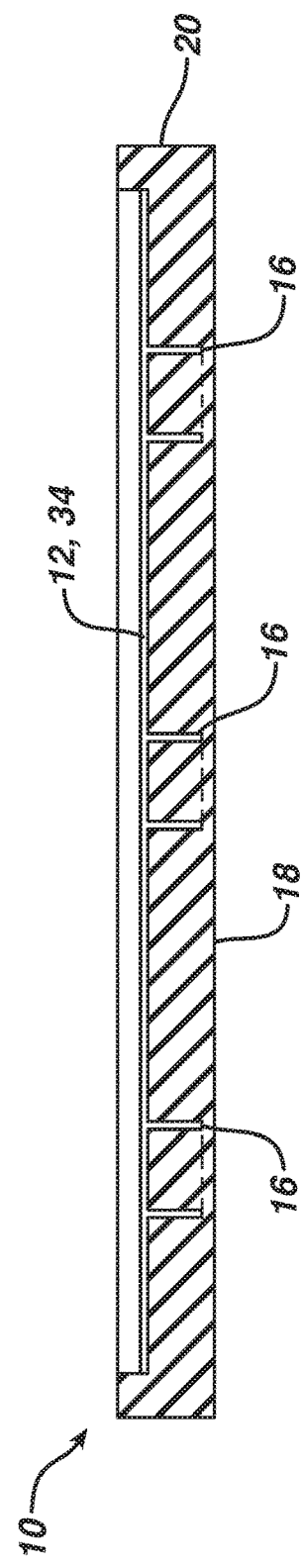

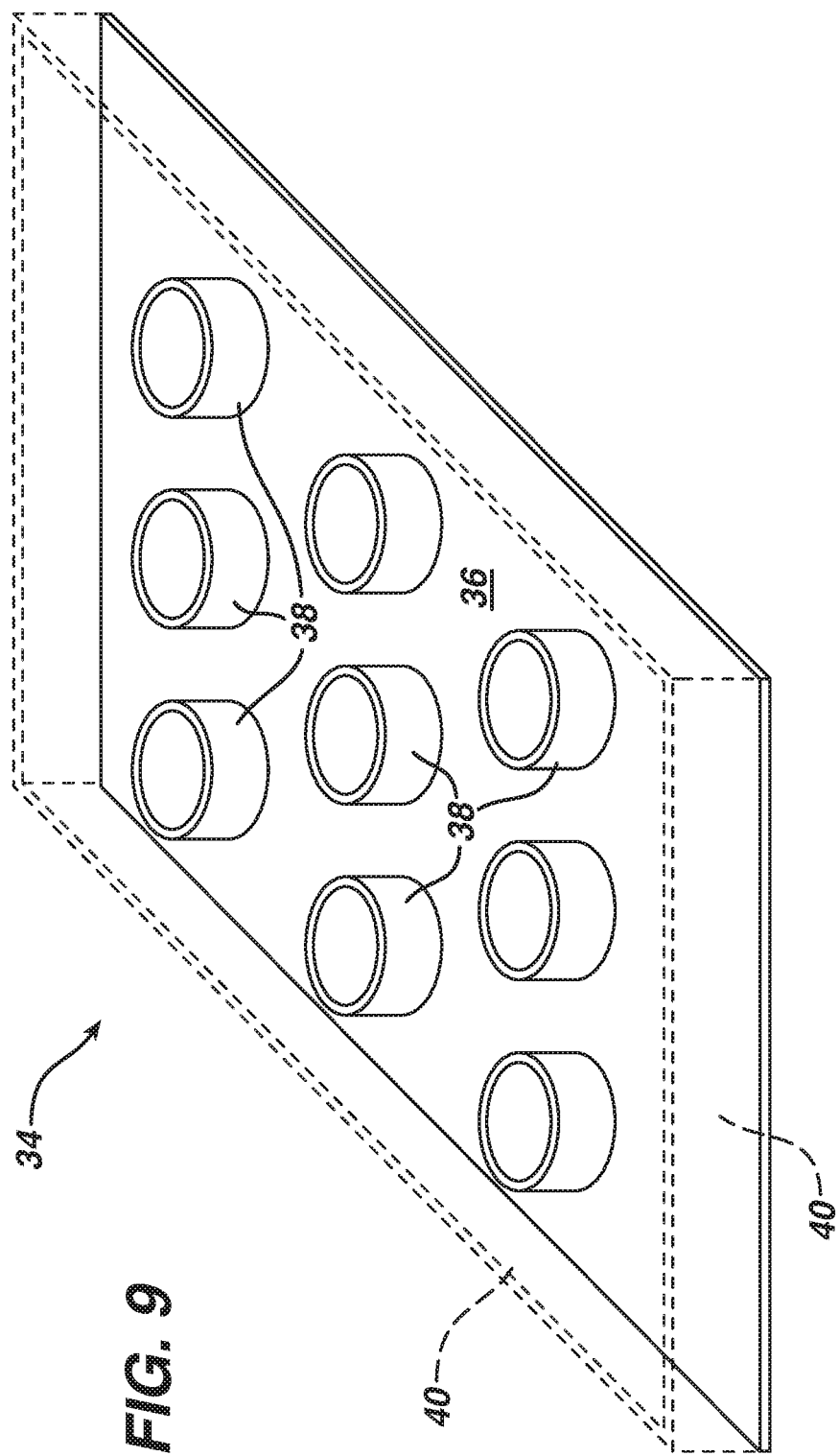

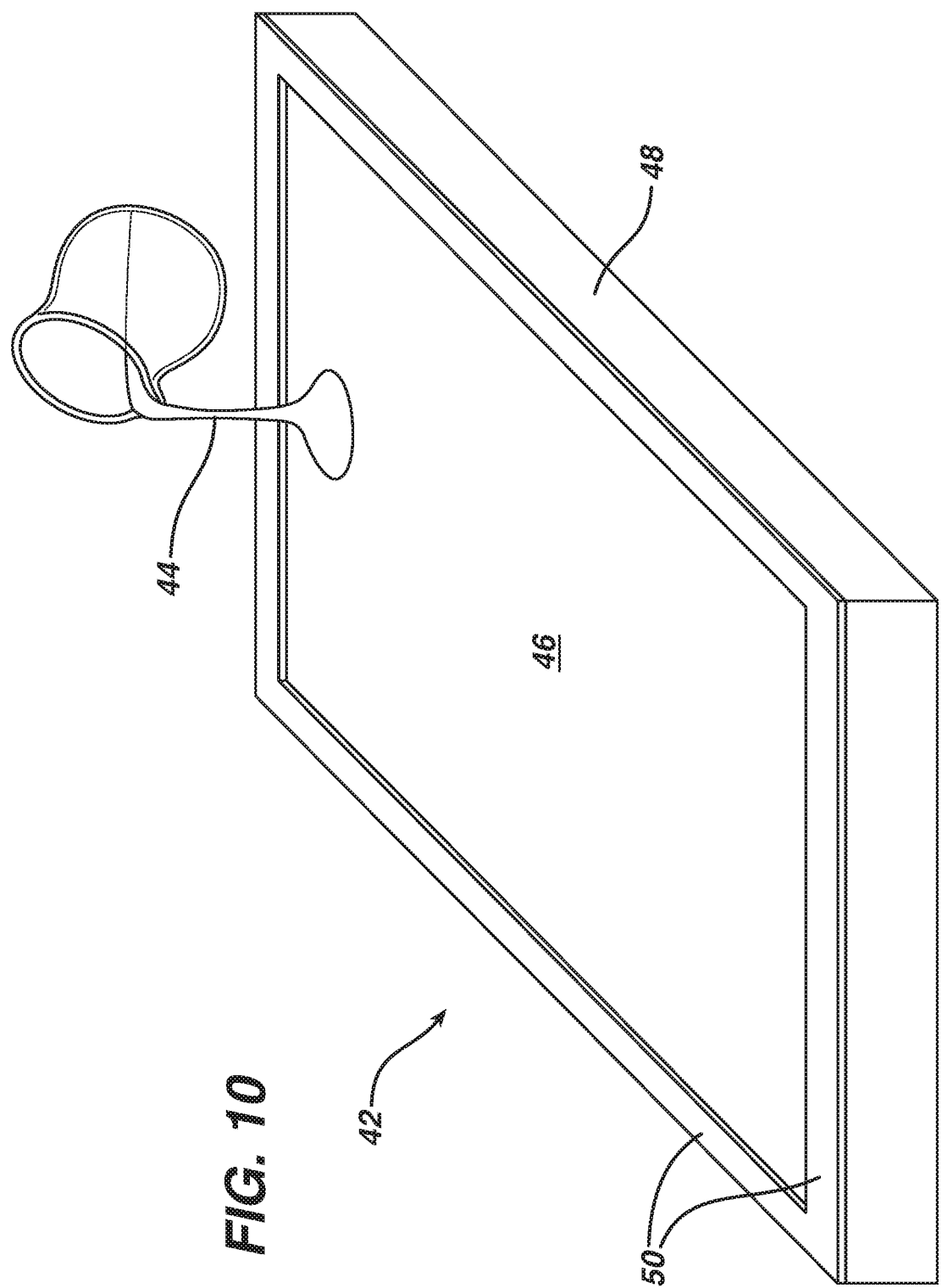

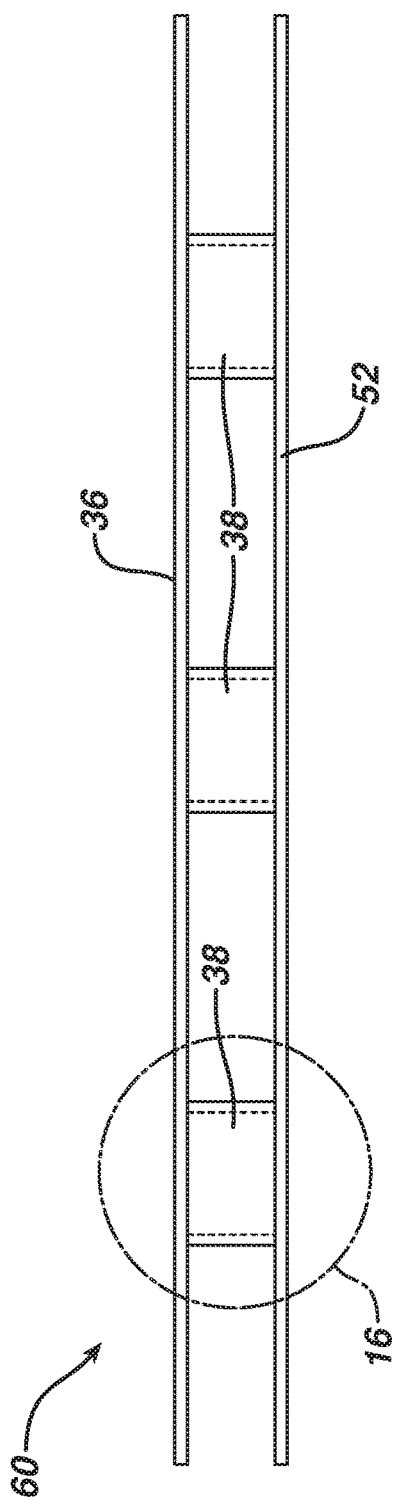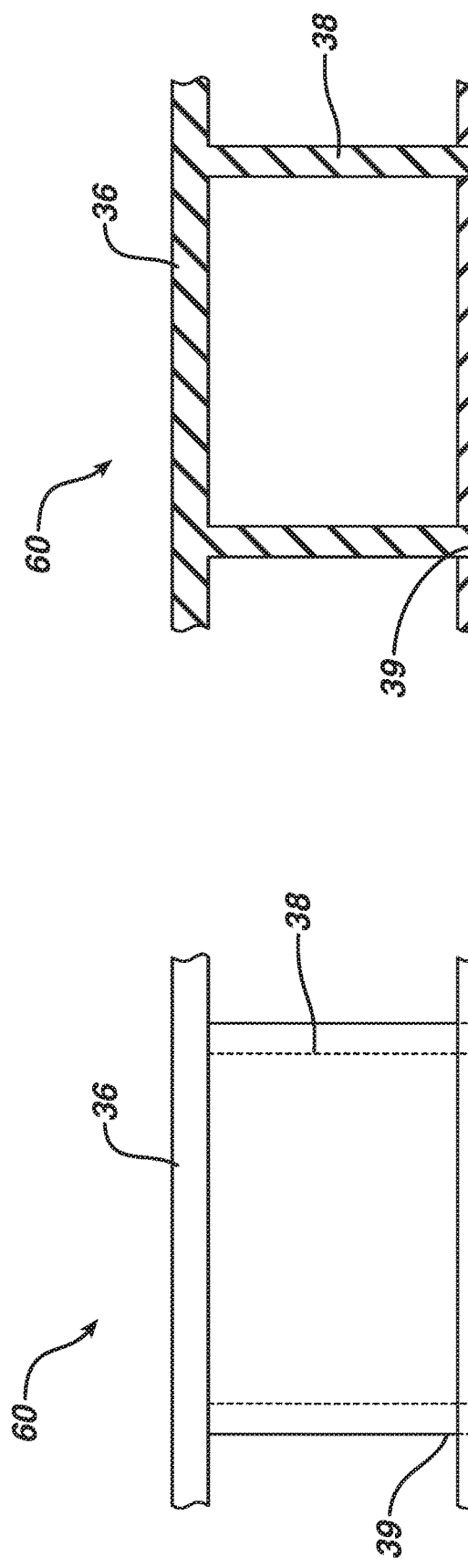

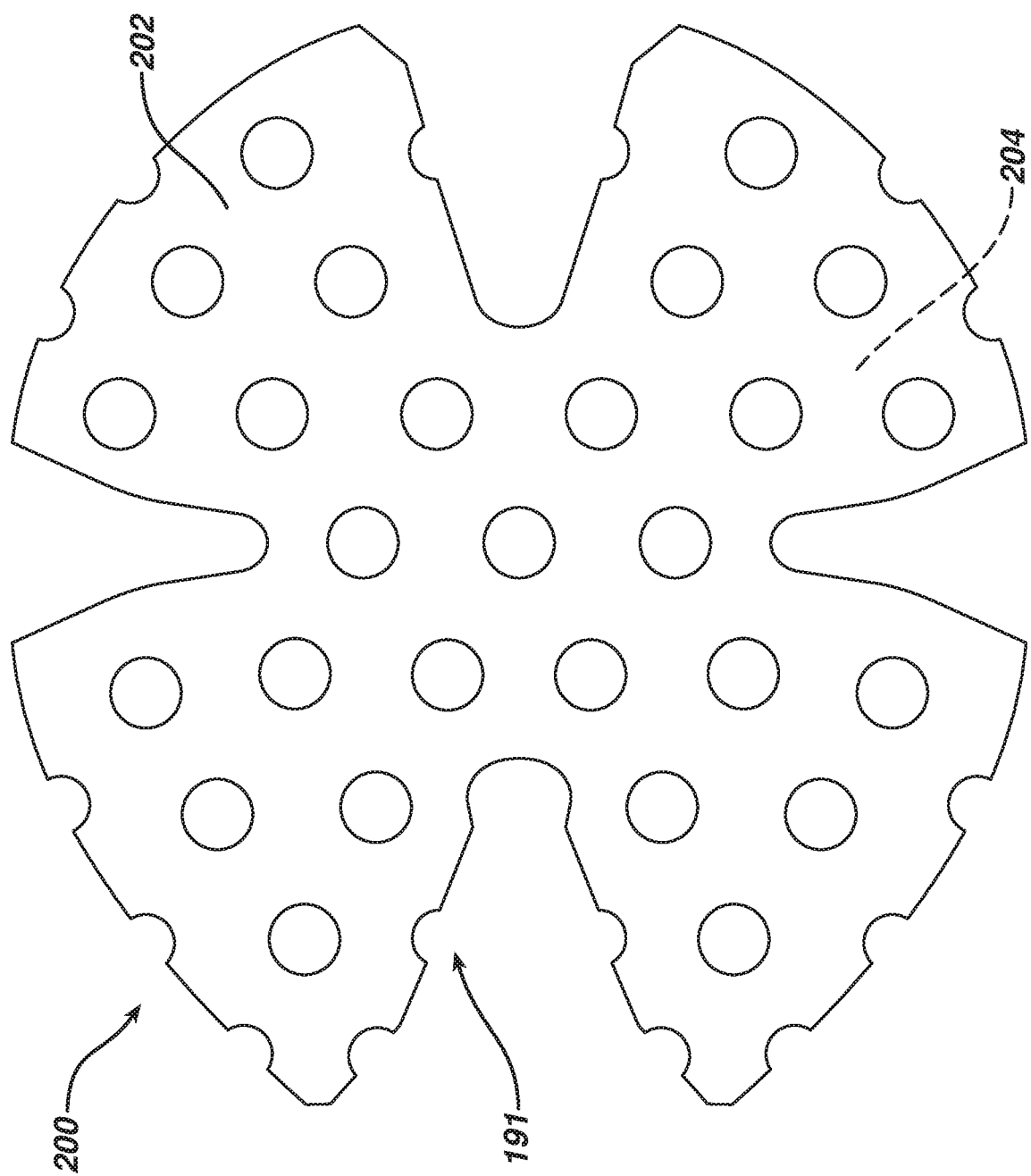

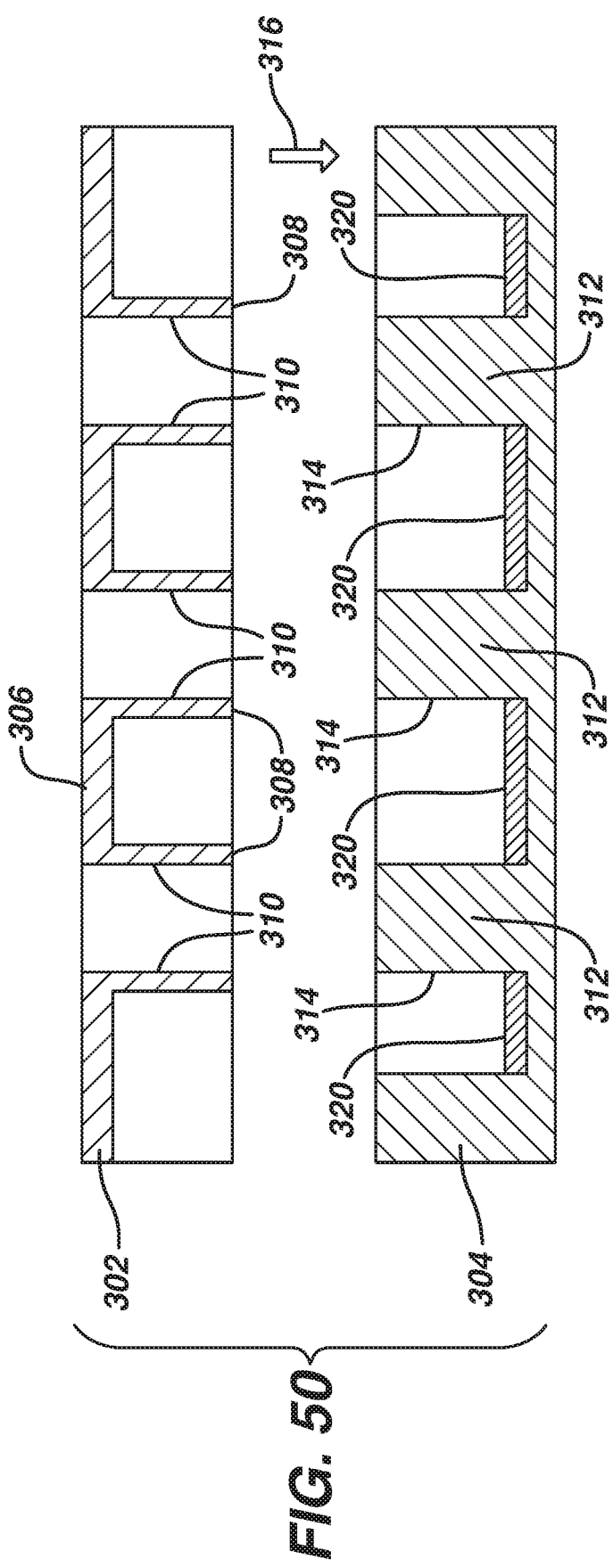
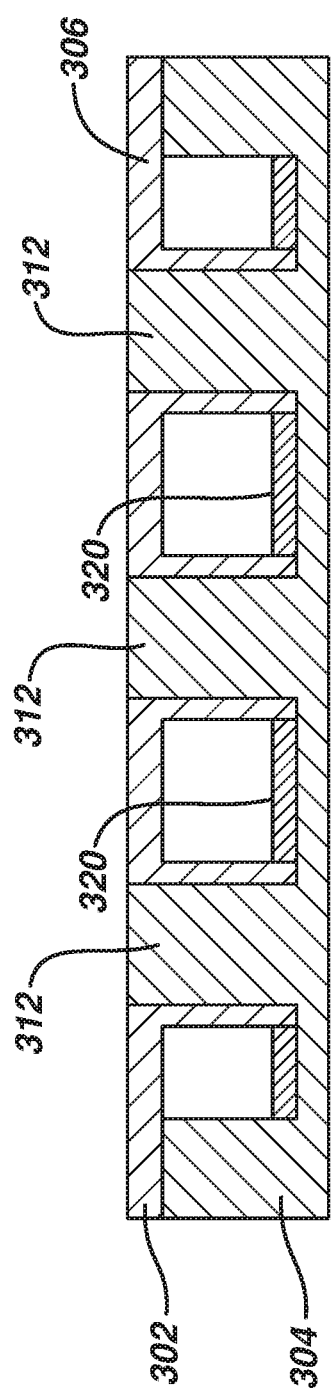
FIG. 50
FIG. 51

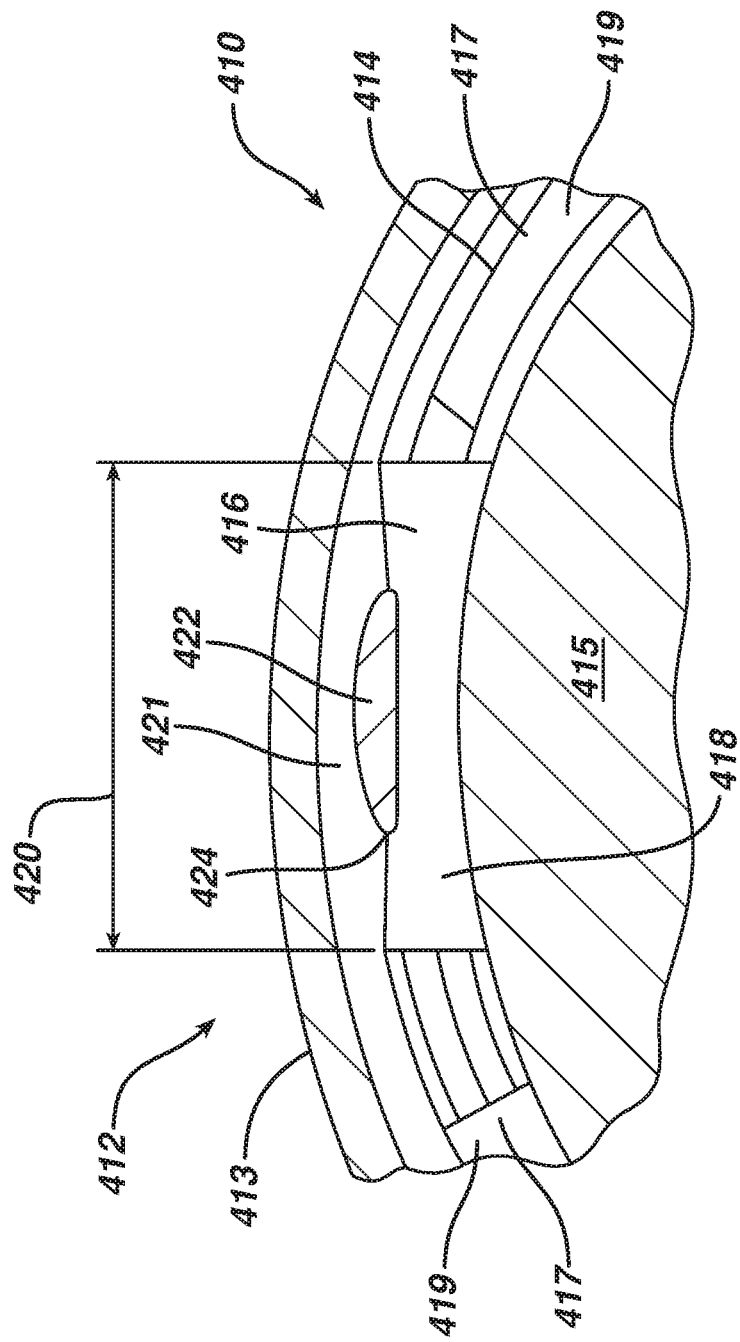

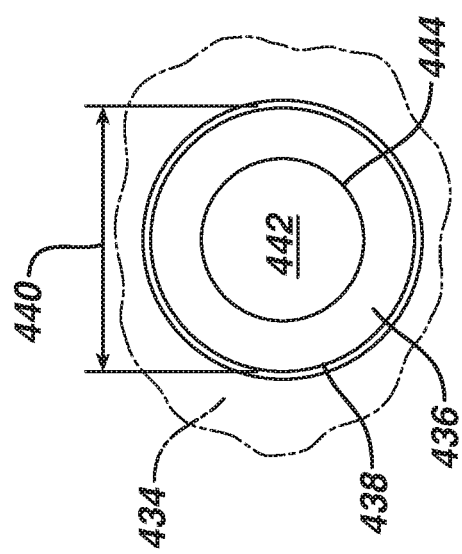
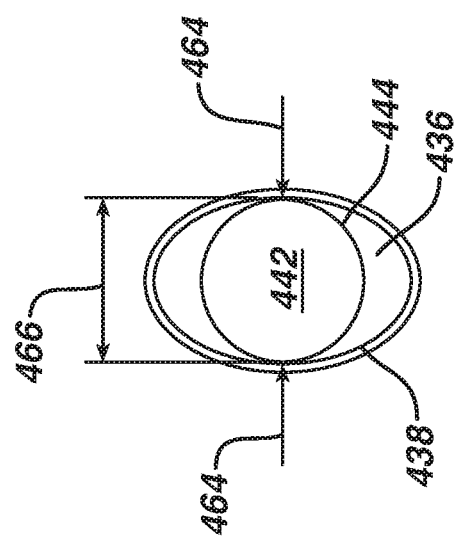
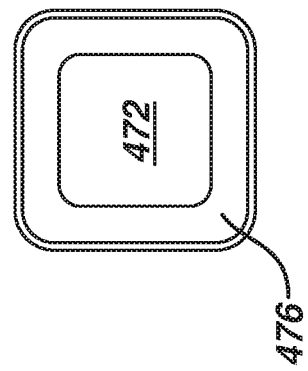
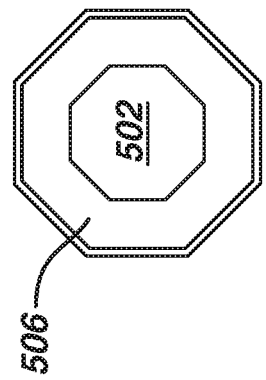
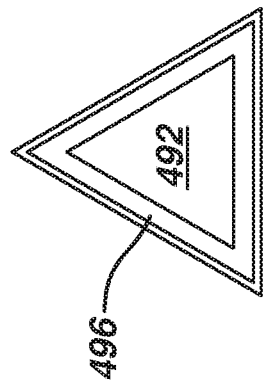

IMPACT DISSIPATING LINERS AND METHODS OF FABRICATING IMPACT-DISSIPATING LINERS

CROSS-REFERENCE TO RELATED APPLICATION

This application claims priority from U.S. Provisional Patent Application 62/430,420, filed on Dec. 6, 2016, the disclosure of which is included by reference herein in its entirety.

BACKGROUND OF THE INVENTION

Technical Field

Aspects of the present invention relate generally to protective barriers and headgear, such as, helmets. More particularly, aspects of the invention, in its several embodiments, provide protective, fluid-containing, impact-dissipating liners having recesses that enhance the dissipation of impact loading upon a surface, such as, a human body.

Description of Related Art

Numerous human activities, such as, recreation and sports, public protection, and armed service expose the human body, especially, the head, to impact and injury.

Head injury can be the most traumatic type of bodily injury. Especially when in motion, the exposure of the human head to contact and injury can be a continuous concern, whether the motion is while in a motorized vehicle or a bicycle. Many attempts have been made in the art of head protection to minimize damage to the skull, brain, and brain stem due to head impact.

Many prior art attempts to address this concern have yielded various helmet designs that provide impact energy absorbing materials, for example, foam rubbers and plastics, in an attempt to provide as much "cushioning" material between the surface of impact and the head. Accordingly, in the state of the helmet art in the early 21st century, it is typical to provide as much foam cushioning within a helmet without detracting from the aesthetic appearance of the helmet. The resulting helmets have been limited in their success in meeting either goals of head protection or aesthetics.

Among other things, as the amount of cushioning material, for example, plastic foam, increases, the larger the envelope and the greater the exposure of the resulting helmet. Specifically, though a larger volume of cushioning material within a helmet may absorb more impact energy, and lessen the amount of impact energy transmitted to the head, the larger volume also increases the torsional movement arm between the point of contact and, for example, the neck, brain stem, and spinal cord of the helmet wearer. Accordingly, providing impact protection while minimizing torsional loading on the wearer is desirable.

Though of relatively minor consequence to some users, the larger the amount of cushioning material typically also results in a more unsightly appearance of the resulting helmet to the typical helmet wearer. Accordingly, there is a need in the art to ensure proper head protection, while, it is preferred, providing an aesthetically appealing helmet.

Though many forms of activity can expose the head to impact loading, athletic completion or contact sports can be one of the more acute concerns for helmet design and head protection. It is well recognized that the repeated contact of the head in such contact sports as football, hockey, and soccer expose the athlete, even though protected with some form of head gear, to degenerative brain damage. The occurrence of chronic traumatic encephalopathy (CTE) in professional athletes, especially in former professional football and hockey players, is well documented. It is generally believed that the repeated exposure of the head to impact loading, even when protected, can result in deteriorating and life changing effects upon cognitive abilities and behavior. Efforts continue to be made to investigate the cause of CTE and to mitigate or prevent its occurrence. Accordingly, there is need in the art to provide more protective head gear for athletes.

In addition to head protection, many other bodily, structural, or ornamental surfaces can be exposed to damage due to damaging contact and/or impact loading. Enhancements in, for example, body armor or padding, for bodily protection during military activity, construction, or personal protection, among other activities, continue to be needed. The protection of general walls, barriers, and other surfaces from damage is also desirable.

U.S. Pat. No. 8,856,972 of Kirshon first introduced the concept of liquid-filled, fluid-displaced liner technology to the art. This technology is marketed by KIRSH Helmets of Schenectady, N.Y. under the trademarks Fluid Displacement Liner™ technology or FDL™ technology. Though the inventions disclosed in the '972 patent provide an effective means for dissipating impact loading, further improvements and advantages are provided by the present inventions.

Aspects of the present invention provide protective impact-dissipating liners, for example, headgear, methods of minimizing the transfer of impact loads upon a surface, such as a human body, and methods of fabricating such impact-dissipating liners.

SUMMARY OF THE INVENTION

One embodiment of the invention is a method of fabricating an impact-dissipating liner, the method comprising or including: providing a mold adapted to receive a curable fluid, the mold having a surface and a plurality of recesses in the surface; introducing a first curable fluid to the mold to at least partially fill each of the plurality of recesses and at least partially cover the surface of the mold; allowing the first curable fluid to cure in the plurality of recesses and on at least a portion of the surface; removing the first cured fluid from the mold to provide a first flexible sheet comprising the first fluid cured on the at least the portion of the surface and a plurality of projections from the first flexible sheet defined by the first curable fluid cured in the plurality of recesses; introducing a second curable fluid to a surface; introducing the first flexible sheet of the cured fluid and the plurality of projections to the second curable fluid where distal ends of the plurality of projections contact the second curable fluid; allowing the second curable fluid to cure to form a second flexible sheet adhered to the distal ends of the plurality of projections; sealing peripheral edges of the first flexible sheet and the second flexible sheet to provide a fluid-impermeable enclosure; and introducing a fluid to the fluid-impermeable enclosure to provide the impact-dissipating liner. In one aspect, the plurality of recesses in the mold may be cylindrical recesses, for example, circular cylindrical recesses. In another aspect, the plurality of recesses in the mold may be circular rings having a depth.

In another aspect, the first curable fluid and the second curable fluid may have similar properties, for example, the first curable fluid and the second curable fluid may the same type of curable fluid, for example, each may be a silicone fluid.

In one aspect, injecting the fluid into the fluid-permeable enclosure, for example, injecting the fluid with a syringe, can be practiced for introducing the fluid. In one aspect, the method may further include the step of "degassing" the fluid prior to introducing the fluid to the enclosure.

Another embodiment of the invention is an impact dissipating helmet liner comprising or including: a flexible, fluid impermeable enclosure having an upper wall, an opposing lower wall, and a sidewall extending between the upper wall and the lower wall; a plurality of cavities extending between the upper wall and the lower wall, each of the plurality of cavities having a cavity sidewall extending from the upper wall to the lower wall; and a fluid contained in the enclosure; wherein the flexible, fluid impermeable enclosure comprises a central portion and a plurality of lobes extending from the central portion, wherein the central portion and the plurality of lobes are adapted to conform to the shape of an internal surface of a helmet. In one aspect, the plurality of lobes defines radially extending gaps or cavities between adjacent lobes. In another aspect, the radially extending cavities comprise divergent sidewalls.

In another aspect, each of the plurality of cavities extends through at least one of the upper wall and the lower wall. In another aspect, each of the plurality of cavities extends through both the upper wall and the lower wall.

In one aspect, the fluid comprises a liquid, for example, at least one glycol, such as, ethylene glycol or propylene glycol.

Another embodiment of the invention is a method of fabricating an impact-dissipating liner, the method comprising or including: providing a first mold adapted to receive a curable fluid, the first mold having a first surface and a plurality of cylindrical projections; providing a second mold adapted to receive a curable fluid, the second mold having a second surface and a plurality of cylindrical recesses; prior to or after engaging the first mold with the second mold, introducing a first curable fluid to one of the first mold and the second mold to at least partially fill each of the plurality of recesses and at least partially cover one of the first surface and the second surface; allowing the first curable fluid to cure in the plurality of recesses and on at least a portion one of the first surface and the second surface; removing the first cured fluid from the first mold and the second mold to provide a first flexible sheet comprising the first fluid cured on the at least the portion of the first surface and the second surface and a plurality of projections from the first flexible sheet defined by the first curable fluid cured in the plurality of recesses; introducing a second curable fluid to a surface; introducing the first flexible sheet of the first cured fluid and the plurality of projections to the second curable fluid where distal ends of the plurality of projections contact the second curable fluid; allowing the second curable fluid to cure to form a second flexible sheet adhered to the distal ends of the plurality of projections; sealing peripheral edges of the first flexible sheet and the second flexible sheet to provide a fluid-impermeable enclosure; and introducing a fluid to the fluid-impermeable enclosure to provide the impact-dissipating liner.

In one aspect, introducing the first curable fluid comprises injecting the first curable fluid into the engaged first mold and second mold. In another aspect, introducing the first curable fluid comprises, prior to engaging the first mold to the second mold, introducing the first curable fluid to the plurality of recesses.

In one aspect, the plurality of recesses may be cylindrical recesses, for example, circular cylindrical recesses. In another aspect, the first curable fluid and the second curable fluid each comprises a silicone.

A further embodiment of the invention is a helmet comprising or including a deformable liner having at least one recess having an internal surface having an internal dimension; and at least one body having an external surface; wherein upon an impact, the deformable liner deforms reducing the internal dimension of the at least one recess wherein at least a portion of the internal surface of the at least one recess contacts at least a portion of the external surface of the at least one body. In one aspect, the contact between the at least the portion of the internal surface of the at least one recess with the at least the portion of the external surface of the at least one body may limit further reduction of the internal dimension of the at least one recess.

In one aspect, the recess may comprise one of a blind hole and a through hole. In another aspect, the at least one recess may have a circular axial cross-section and wherein the at least one body may have a circular axial cross section. In another aspect, the external surface of the at least one body may be shaped to conform to a shape of the internal surface of the at least one recess. In another aspect, the deformable liner of the helmet comprises gel-type plastic and the deformable liner may comprise a fluid-encasing liner, for example, encasing water, an oil, an alcohol, and/or idol, such as, propylene glycol or ethylene glycol.

Another embodiment of the invention is a method of protecting a head from impact, the method comprising or including: positioning a deformable liner on a head exposed to impact, the deformable liner having at least one recess having an internal surface having an internal dimension; positioning at least one body externally or within the at least one recess of the deformable liner, the at least one body having an external surface shaped to conform to a shape of the internal surface of the at least one recess; and upon an impact, allowing the deformable liner to deform and reduce the internal dimension of the at least one recess wherein at least a portion of the internal surface of the at least one recess contacts at least a portion of the external surface of the at least one body.

In one aspect, the step of positioning the at least one body may comprise retaining the at least one body adjacent to or within the at least one recess, for example, retaining the at least one body in an interface. In another aspect, positioning the at least one body may be practiced by mounting the at least one body to an interior surface of a helmet having the deformable liner, for example, with an adhesive or mechanical fastener. The at least one body or "pin" may be shaped and located to engage, for example, via friction, a cavity, or hole in the deformable liner. In another aspect, the engagement of the body or pin with the cavity or hole in the deformable liner may provide at least some retention of the deformable liner within the helmet.

Another embodiment of the invention is a head protection arrangement comprising or including: a deformable liner having at least one recess having an internal surface having an internal dimension; and at least one body having an external surface; wherein upon an impact, the deformable liner deforms reducing the internal dimension of the at least one recess wherein at least a portion of the internal surface of the at least one recess contacts at least a portion of the external surface of the at least one body. In one aspect, the contact between the at least the portion of the internal surface of the at least one recess with the at least the portion of the external surface of the at least one body may limit further reduction of the internal dimension of the at least one recess.

In one aspect of the arrangement, the recess may be a blind hole or a through hole. In another aspect, the at least one recess may have a circular axial cross-section and the at least one body may have a circular axial cross section. The internal dimension may be an internal width, an internal length, or an internal diameter. In one aspect, the deformable liner may comprise a gel-type plastic and/or elastomer.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

FIG. 2 is a top plan view of the mold shown in FIG. 1.

FIG. 3 is a cross-sectional view of the mold shown in FIG. 2 as viewed along section lines 3-3 in FIG. 2.

FIG. 7 is a top plan view of the mold shown in FIGS. 1 through 4 having a curable material according to one aspect of the invention.

FIG. 8 is a cross-sectional view of the mold and curable fluid shown in FIG. 7 as viewed along section lines 8-8 in FIG. 7.

FIG. 9 is a perspective view of an at least partially cured portion of an impact-dissipating liner according to one aspect of the invention.

FIG. 10 is a perspective view of a mold for another portion of an impact-dissipating liner according to one aspect of the invention.

FIG. 15 is a side-elevation view of the impact-dissipating liner shown in FIG. 14.

FIG. 16 is a detailed view of the a side-elevation view shown in FIG. 15 as identified by Detail 16 in FIG. 15.

FIG. 17 is a detailed cross-sectional view of the detailed side-elevation view shown in FIG. 16.

FIG. 37 is a top plan view of an impact-dissipating liner according to an aspect of the present invention after the portion of the liner shown in FIG. 34 is combined with another portion and filled with a fluid according to aspects of the invention.

FIG. 50 is a cross section view of portions of the liner portion shown in FIG. 34 or 45 and male-type mold prior to engagement according to another aspect of the invention.

FIG. 51 is a cross section view of portions of the liner portion and male-type mold shown in FIG. 50 after engagement according to another aspect of the invention.

FIG. 56 is a detailed view of a portion of the aspect shown in FIG. 55 identified by Detail 56 in FIG. 55.

FIG. 57 is a side elevation view of one body shown in FIG. 56 according to one aspect of the invention.

FIG. 58 is top plan view of the body shown in FIG. 57.

FIG. 61 is a schematic plan view of the aspect of the invention shown in FIGS. 59 and 60, before impact, according to one aspect of the invention.

FIG. 62 is a schematic plan view of the aspect of the invention shown in FIG. 61, after impact, according to one aspect of the invention.

FIGS. 63 through 66 are schematic plan views, similar to FIG. 61, of other aspects, before impact, according to other aspects of the invention.

DETAILED DESCRIPTION OF THE INVENTION

Figure 1:
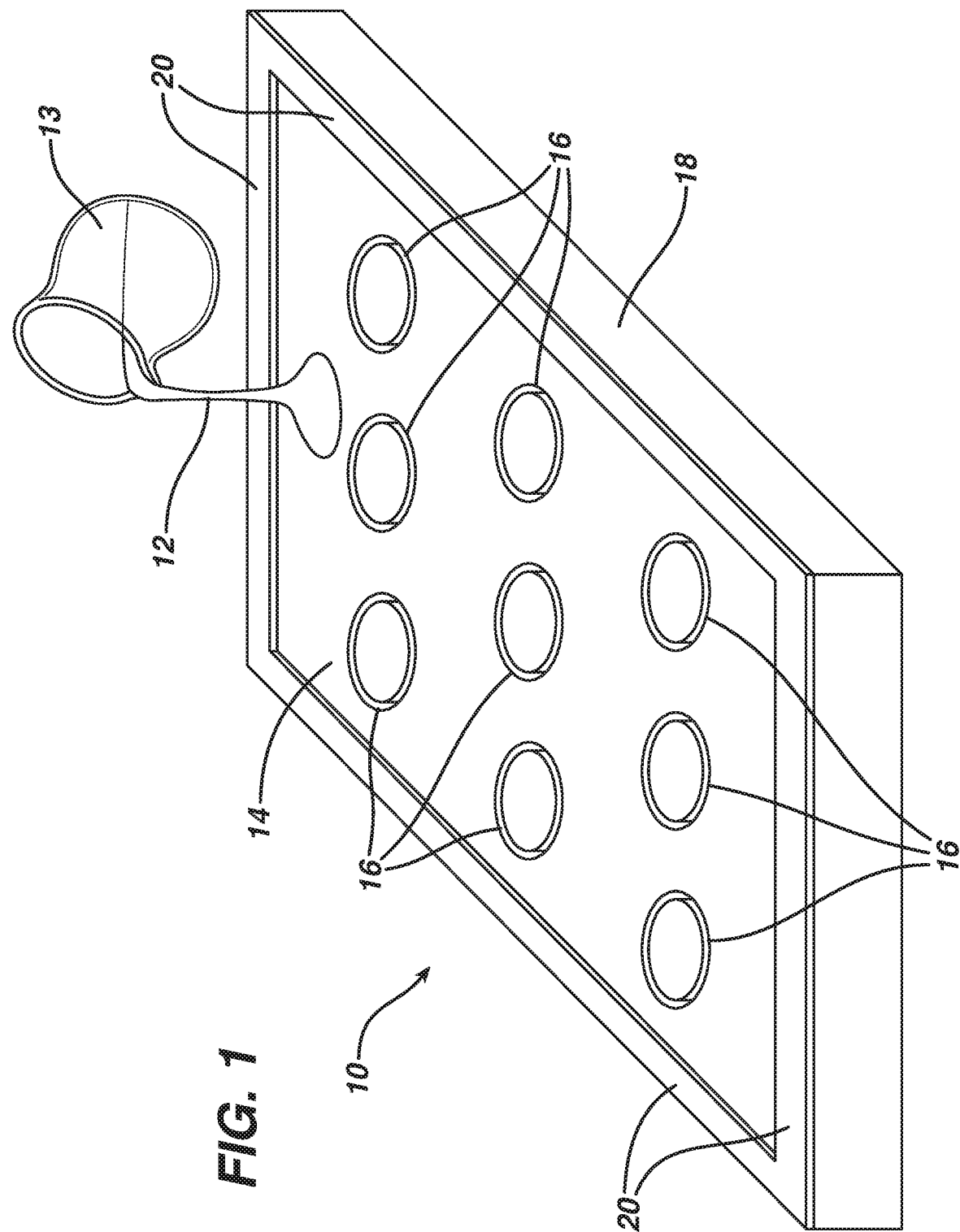
FIG. 1 is a perspective view of a mold for a portion of an impact-dissipating liner according to one aspect of the invention.

FIG. 1 is a perspective view of a mold 10 for a portion of an impact-dissipating liner (not shown) according to one aspect of the invention. FIG. 2 is a top plan view of mold 10 shown in FIG. 1. As shown in FIG. 1, according to aspects of the invention, a curable or hardenable fluid 12, for example, a fluid polyethylene, is introduced to mold 10, and the curable fluid 12 is allowed to cure, that is, solidify or harden, to form the portion of the impact-dissipating liner. As will be discussed further below, according to aspects of the invention, the portion of the impact-dissipating liner formed in mold 10 is then mated with another portion of the impact-dissipating liner to fabricate the substantially complete liner, which, for example, can then be filled with a fluid, for example, a liquid.

According to aspects of the invention, the curable or hardenable fluid 12 may comprise any liquid or fluid that can be introduced to mold 10, or any mold disclosed herein, and then, with appropriate time and/or treatment, will cure or at least partially harden to form a relatively firm structure, for example, a structure that can subsequently be moved, manipulated, and/or otherwise handled as a single, integral component, as disclosed herein, while substantially retaining its molded shape. For example, a curable fluid may comprise a fluid polymer that, upon appropriate treatment, hardens by cross-linking polymer chains. The curing may be may be effected by time, temperature, chemical additives, and/or radiation, for example, an electron beam or ultraviolet radiation. Curable fluid 12, and the liner portions formed from curable fluid 12 disclosed herein, may comprise an elastomeric material, for example, a natural or synthetic rubber, a foam, a thermoplastic elastomer, a polyurethane elastomer, a silicone elastomer, a polyvinyl chloride (PVC) elastomer, an olefinic elastomer, a polyamide elastomer, or a gelatinous elastomers, among others. In one aspect, curable fluid 12 may be a silicone, or its equivalent.

In FIG. 1, curable or hardenable fluid 12 is shown to be representatively poured on to mold 10 from a container 13; however, according to aspects of the invention, fluid 12 may be introduced to mold 10 by any conventional means. For example, fluid 12 may be introduced to mold 10 by injection, by gravity feed, and/or through one or more valves, among other methods. In one aspect, fluid 12 may be introduced by pouring from one or more containers 13.

As shown in FIGS. 1 and 2, mold 10 includes a surface 14, and surface 14 includes a number of recesses 16, for example, a "plurality" of recesses, distributed about surface 14, for example, uniformly distributed, and into which curable fluid 12 flows and substantially fills each recess 16 with curable fluid 12. Though 9 representative recessives 16 are shown in FIGS. 1 and 2, aspects of the invention may have as few as 1 recess to tens, hundreds, or even thousands of recesses 16, for example, depending upon the application of the aspect of the invention. The surface 14 and the recesses 16 may typically be formed in a block, panel, or plate 18. Mold 10 may include a rim or peripheral barrier 20, for example, encircling the perimeter of plate 18, and rim 20 may act to retain the curable fluid 12 introduced to mold 10.

FIG. 3 is a cross-sectional view of mold 10 shown in FIG. 2 as viewed along section lines 3-3 in FIG. 2 showing, among other things, cross section views of typical recesses 16. As shown in FIG. 3, the surface 14 may comprise a depth 22, for example, below the top of panel 18, or below the top of rim 20, of from about ⅛ inch to about 3 inches, but is typically between about ½ inch to about 1 inch. As also shown in FIG. 3, the recesses 16 may comprise a depth 24 from surface 14.

As also shown in FIGS. 2 and 3, mold 10 may include one or more peripheral slots or grooves 15 (shown in phantom) in surface 14. According to this aspect, slots 15 may be comparable in depth to recesses 16 and provide mold spaces for the formation of a peripheral wall or barrier in the portion of the liner formed with mold 10. For example, as will become more apparent in the discourse below, slots 15 may be provided to receive curable fluid 12 and, when cured, provide at least a partial peripheral wall or barrier for the liner portion or liner.

Figure 4:
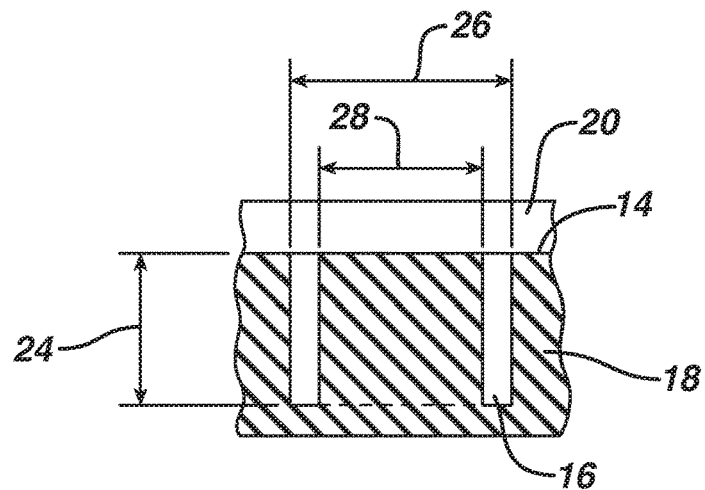
FIG. 4 is a detailed view of the cross-sectional view of the mold shown in FIG. 3 as identified by Detail 4 in FIG. 3.

FIG. 4 is a detailed view of the cross-sectional view of mold 10 shown in FIG. 3 as identified by Detail 4 in FIG. 3. FIG. 4 illustrates a detailed cross section of one recess 16 that may be used for an aspect of the invention. As shown, in this aspect, at least some, but typically all, of recesses 16 comprise cylindrical recesses, for example, circular cylindrical recesses (for instance, right circular cylindrical recesses) having a depth 24 from surface 14, an outside dimension (for example, diameter) 26, and an inside dimension (for example, diameter) 28. The depth 24 of each recess 16 from surface 14 may range from about ¼ inch to about 3 inches, but is typically between about 0.5 inches to about 1 inch. According to aspects of the invention, outside dimension 26 may range from about ¼ inch to about 3 inches, but is typically between about 0.5 inches and about 1 inch. Inside dimension 28 may range from about ¼ inch to about 3 inches, but is typically between about 0.5 inches and about 1 inch.

Though in the aspect shown in FIG. 4 recesses 16 are shown as right circular cylindrical, it is envisioned that recesses 16, and any recesses disclosed herein, may be non-circular cylindrical, for example, triangular cylindrical, rectangular cylindrical, square cylindrical, oval or elliptical cylindrical, pentagonal cylindrical, hexagonal cylindrical, or octagonal cylindrical, among other polygonal cylindrical shapes.

Figure 5:
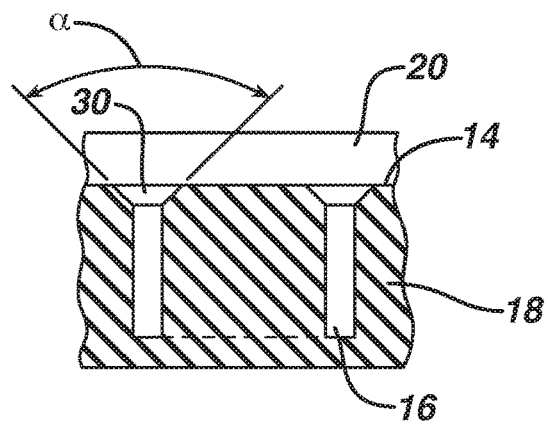
FIG. 5 is detailed view, similar to FIG. 4, of the cross-sectional view of the mold shown in FIG. 3 according to another aspect of the invention.
Figure 6:
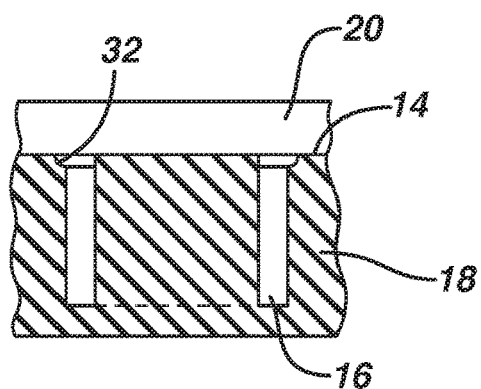
FIG. 6 is still detailed view, similar to FIGS. 4 and 5, of the cross-sectional view of the mold shown in FIG. 3 according to a further aspect of the invention.

FIGS. 5 and 6 are detailed views, similar to FIG. 4, of the cross-sectional view of the mold shown in FIG. 3 according to other aspects of the invention. Specifically, in contrast to the substantially normal (that is, 90-degree) interface between recess 16 and surface 14 shown in FIG. 3, FIG. 5 illustrates that recesses 16 may be circular cylindrical, for example, as shown in FIG. 3, but may include a countersink 30. For example, the countersink 30 may comprise a chamfer angle α ranging from 30 to 120 degrees. Also, as shown in FIG. 6, recesses 16 may include radius 32 about the inside diameter and/or the outside diameter. For example, the radius 32 may range from 1/32 inch to 1 inch, but is typically about ⅛ inch to about ½ inch.

As disclosed herein, according to aspects of the invention, a curable fluid 12, for example, "a first curable fluid," may be introduced to mold 10 shown in FIGS. 1 through 6, to at least partially fill each of the plurality of recesses 16 and at least partially cover the surface 14 of the mold 10, and then the curable fluid 12 may be allowed to cure (or harden) in the plurality of recesses 16 and on at least a portion of the surface 14. In one aspect, the curable fluid substantially completely fills each of plurality of recesses 16 and overflows the recesses 16 to substantially completely cover surface 14 with curable fluid. FIG. 7 is a top plan view of the mold 10 shown in FIGS. 1 through 4 having the curable fluid 12 according to one aspect of the invention. FIG. 8 is a cross-sectional view of the mold 10 and the curable fluid 12 shown in FIG. 7 as viewed along section lines 8-8 in FIG. 7. As shown in FIGS. 7 and 8, fluid 12 may fill and cover recesses 16 where recesses 16 appear in phantom.

After allowing the curable fluid 12 to cure (or harden), for example, for at least about 1 hour to at least about 6 hours, according to an aspect of the present invention, the cured fluid 12 may comprise a portion 34 of the impact-dissipating liner. FIG. 9 is a perspective view of an at least partially cured portion 34 of an impact-dissipating liner formed from cured fluid 12 according to one aspect of the invention. In one aspect of the invention, portion 34 comprising the cured fluid 12, for example, "the first cured fluid," of the impact-dissipating liner is removed from mold 20. As shown in FIG. 9, portion 34 includes a sheet 36, for example, "a first flexible sheet," comprising the cured fluid and a plurality of projections 38 from the flexible sheet 36 defined by the curable fluid cured in the plurality of recesses 16. Projections 38, and any projections disclosed herein, may comprise the shape and dimensions of recesses 16 disclosed herein, for example, right circular or non-circular cylindrical projections. As also shown in FIG. 9, portion 34 may include one or more peripheral walls or barriers 40 (shown in phantom). Walls 40 may typically be formed from cured fluid 12 solidifying in slots 15 (see FIGS. 2 and 3).

According to aspects of the invention, the sheet 36 may have a thickness ranging from about 0.5 millimeters [mm] to about 30 mm, but the thickness of sheet 36 may typically range from about 1 mm to about 2 mm. The thickness of the walls 40 may be comparable in thickness to the thickness of sheet 36.

According to aspects of the invention, portion 34 shown in FIG. 9 may comprise a first portion of at least two portions of cured fluid that may be used to fabricate an impact-dissipating liner according to aspects of the invention. FIGS. 10 through 13 illustrate the fabrication of a second portion of the impact-dissipating liner that can be mated with portion 34 shown in FIG. 9.

FIG. 10 is a perspective view of a mold 42 for another, or second, portion of an impact-dissipating liner according to one aspect of the invention. As shown in FIG. 10, in this aspect, mold 42 is adapted to receive a curable fluid 44, for example, a "second curable fluid." Mold 42 may comprise a surface 46 formed on a block, panel, or plate 48. Mold 42 may include a rim or peripheral barrier 50, for example, encircling the perimeter of plate 48, and rim 50 may act to retain the curable fluid 44 introduced to mold 42.

Mold 10 and mold 42, and any mold disclosed herein, may be provided in any appropriate material, for example, in wood, in plastic, or by a metal. For example, in one aspect, molds 10 and 42 may be fabricated from wood, such as, a hardwood. In other aspect, molds 10 42 may be made from a conventional plastic, for example, molded from a polyethylene. In another aspect, molds 10 and 42 may be formed or machined from a metal, for example, steel, a stainless steel, a tool steel, or an aluminum.

Figure 11:
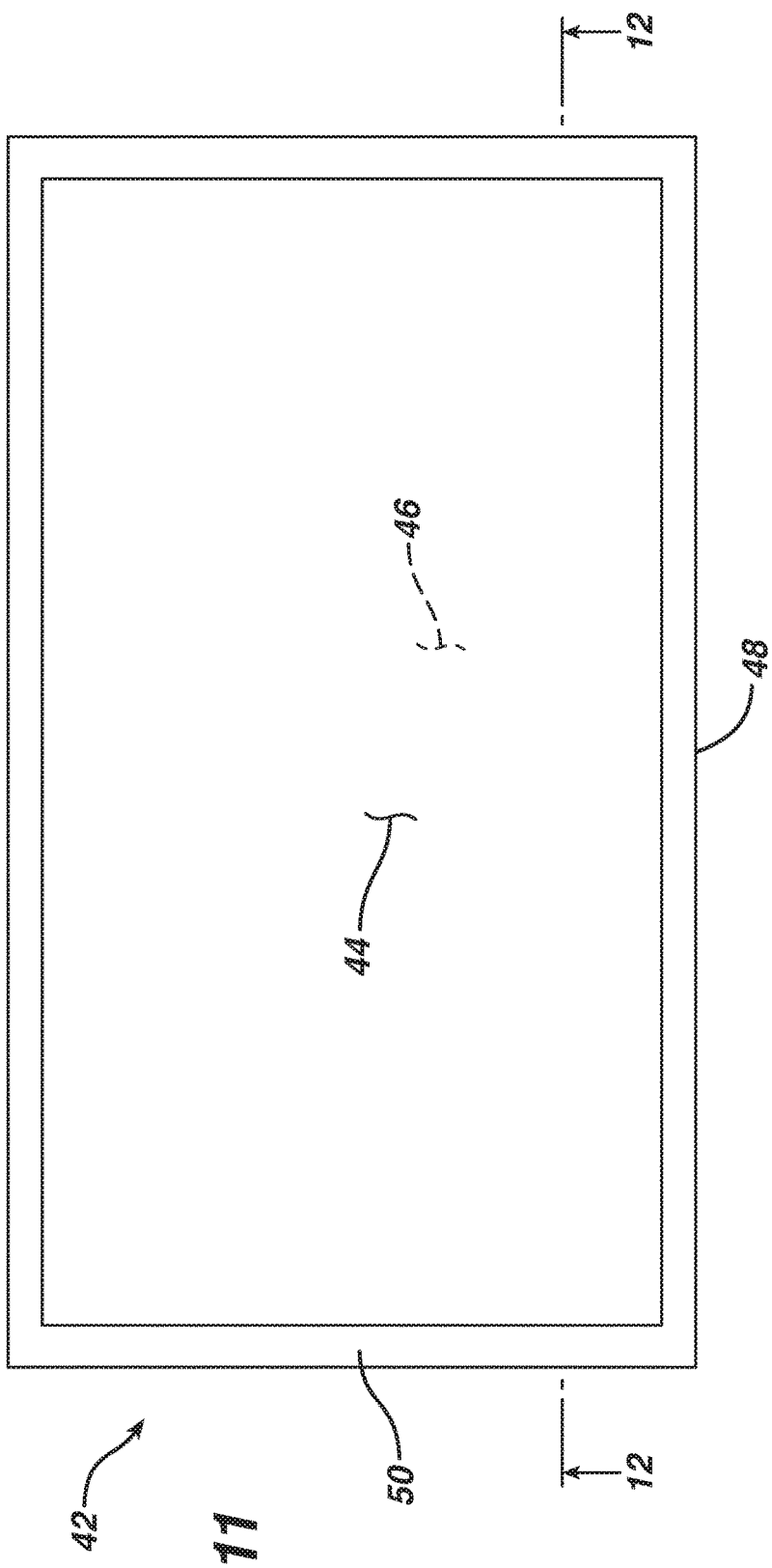
FIG. 11 is a top plan view of the mold shown in FIG. 10 having a curable fluid.
Figure 12:
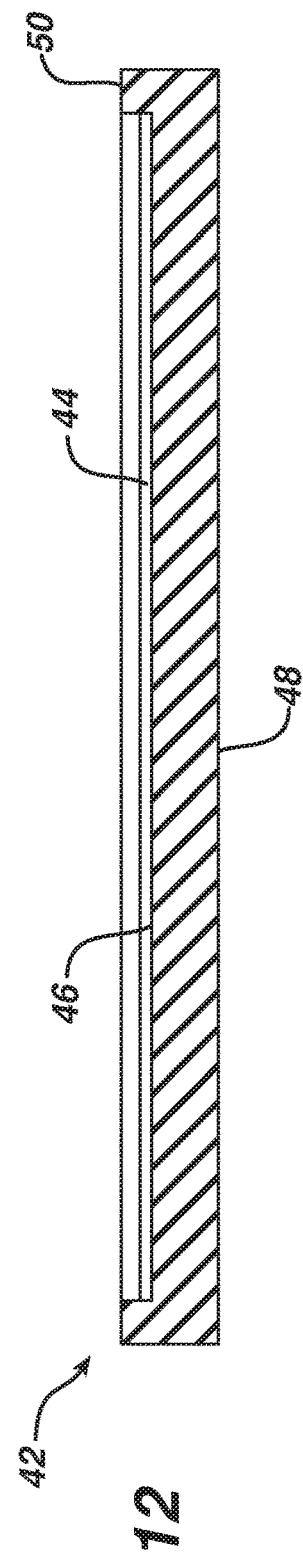
FIG. 12 is a cross-sectional view of the mold and curable fluid shown in FIG. 11 as viewed along section lines 12-12 in FIG. 11.

According to an aspect of the invention, a curable fluid 44, for example, a "second curable fluid," may be introduced to surface 46 of mold 42 and at least partially covers surface 46 with uncured fluid 44. FIG. 11 is a top plan view of mold 42 shown in FIG. 10 having a curable fluid 44. FIG. 12 is a cross-sectional view of mold 42 and curable fluid 44 shown in FIG. 11 as viewed along section lines 12-12 in FIG. 11.

Figure 13:
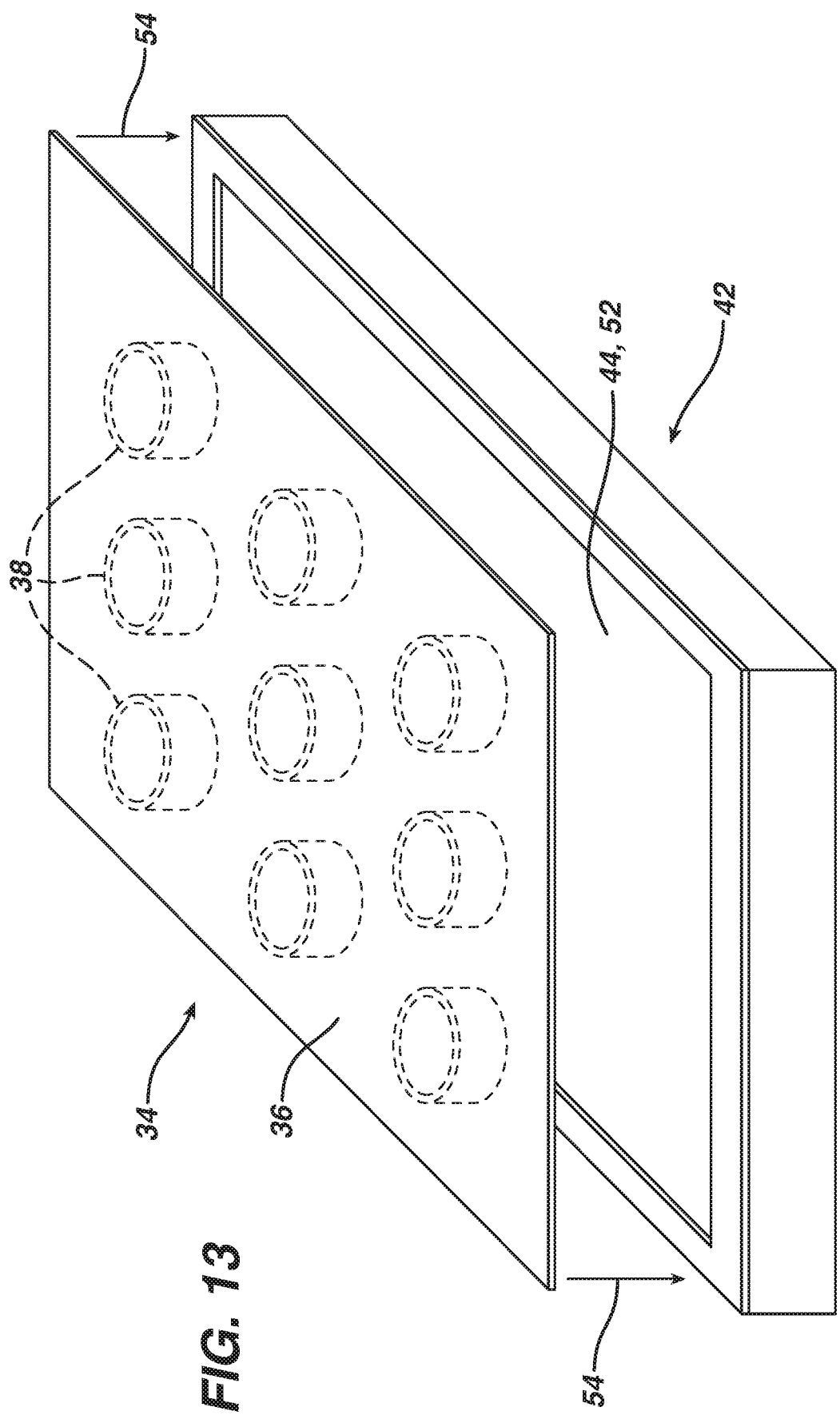
FIG. 13 is a perspective view, prior to assembly, of two portions of an impact-dissipating liner according to one aspect of the invention.

According to an aspect of the invention, prior to at least the partial curing or hardening of uncured fluid 44, the portion 34 of the impact-dissipating liner, for example, as shown in FIG. 9, may be introduced to the uncured or at least partially cured fluid 44 in mold 42 shown in FIGS. 11 and 12 to mate the portion 34 with the fluid 44. FIG. 13 is a perspective view, prior to assembly, of two portions of an impact-dissipating liner: portion 34 and uncured portion 52 formed from curable fluid 44 shown in FIGS. 11 and 12, according to one aspect of the invention. As indicated by arrows 54 in FIG. 13, in one aspect, portion 34 may be mated with uncured portion 44/52, for example, uncured portion 44/52 may be contacted with the lower extremities or the distal ends of projections 38 to at least partially contact or imbed the distal ends of projections 38 into fluid 44. In one aspect, flexible sheet 36 of first cured fluid and the plurality of projections 38 may be introduced to the second curable fluid 44 where distal ends of the plurality of projections 38 contact the second curable fluid 44.

Figure 14:
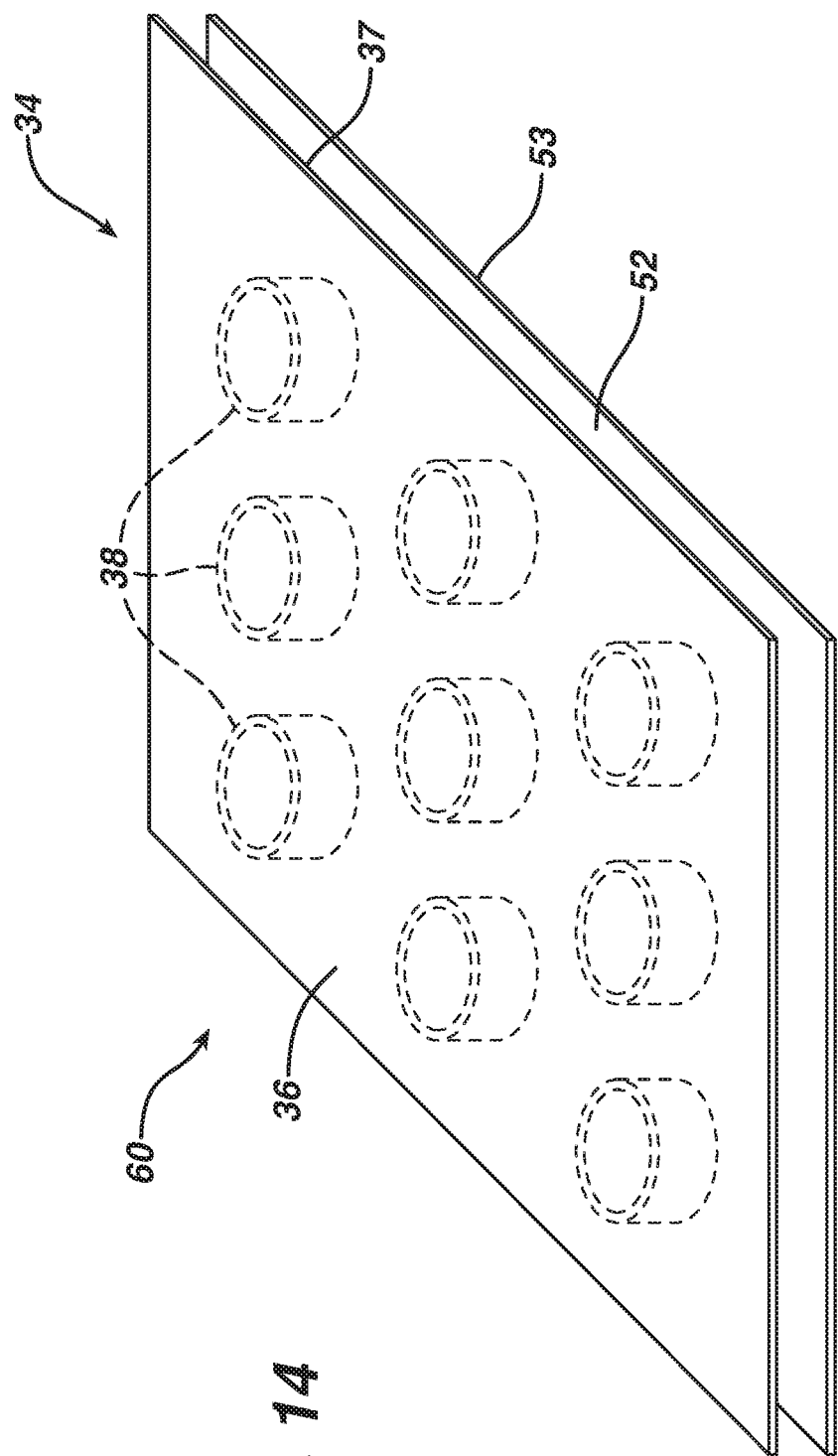
FIG. 14 is a perspective view, after assembly, of the two portions of an impact-dissipating liner shown in FIG. 13.

Once the distal ends of projections 38 contact or are embedded in fluid 44, fluid 44, for example, the "second curable fluid," may be cured or allowed to cure to form a second flexible sheet 52, that is, a second portion of the impact-dissipating liner, where the flexible sheet 52 is adhered to the distal ends of the plurality of projections 38. FIG. 14 is a perspective view, after assembly, of two portions of an impact-dissipating liner, that is, portion 34 and portion 52, shown in FIG. 13 to form liner assembly 60. FIG. 15 is a side-elevation view of the impact-dissipating liner assembly 60 shown in FIG. 14. FIG. 16 is a detailed view of the side-elevation view of liner assembly 60 shown in FIG. 15 as identified by Detail 16 in FIG. 15. FIG. 17 is a detailed cross-sectional view of the detailed side-elevation view of liner assembly 60 shown in FIG. 16.

As shown in FIGS. 16 and 17, in one aspect, the distal ends 39 of projections 38 may be embedded in liner portion 52. However, in other aspects, the distal ends 39 of projections 38 may sufficiently contact the surface of liner portion 52 where, upon at least partial curing, the distal ends 39 are substantially secured to liner portion 52 to form the liner assembly 60. In one aspect, at least some of the distal ends 39 of projections 38 may penetrate liner portion 52, for example, may contact surface 46 of mold 42 when introduced to mold 42.

With the assembly of liner assembly 60 from liner portions 34 and 52 shown in FIGS. 13 through 17, in one aspect, the periphery or perimeter 37 (see FIG. 14) of liner portions 34 and the periphery or perimeter 53 of liner portion 52 may be sealed, for example, somehow coupled to provide a substantially enclosed cavity between liner portions 34 and 52. In one aspect, sealing periphery 37 to periphery 53 may provide a substantially fluid-impermeable enclosure. In one aspect, this sealing of perimeter 37 to perimeter 53 may be provided with an adhesive, with mechanical fasteners, or with thermal fusion of perimeter 37 to perimeter 53, for example, thermal fusion while under applied compression. However, according to another aspect, the sealing of perimeter 37 to perimeter 53 may be provided by providing separate walls or barriers (see FIG. 18) between the two peripheries 37 and 53.

Figure 18:
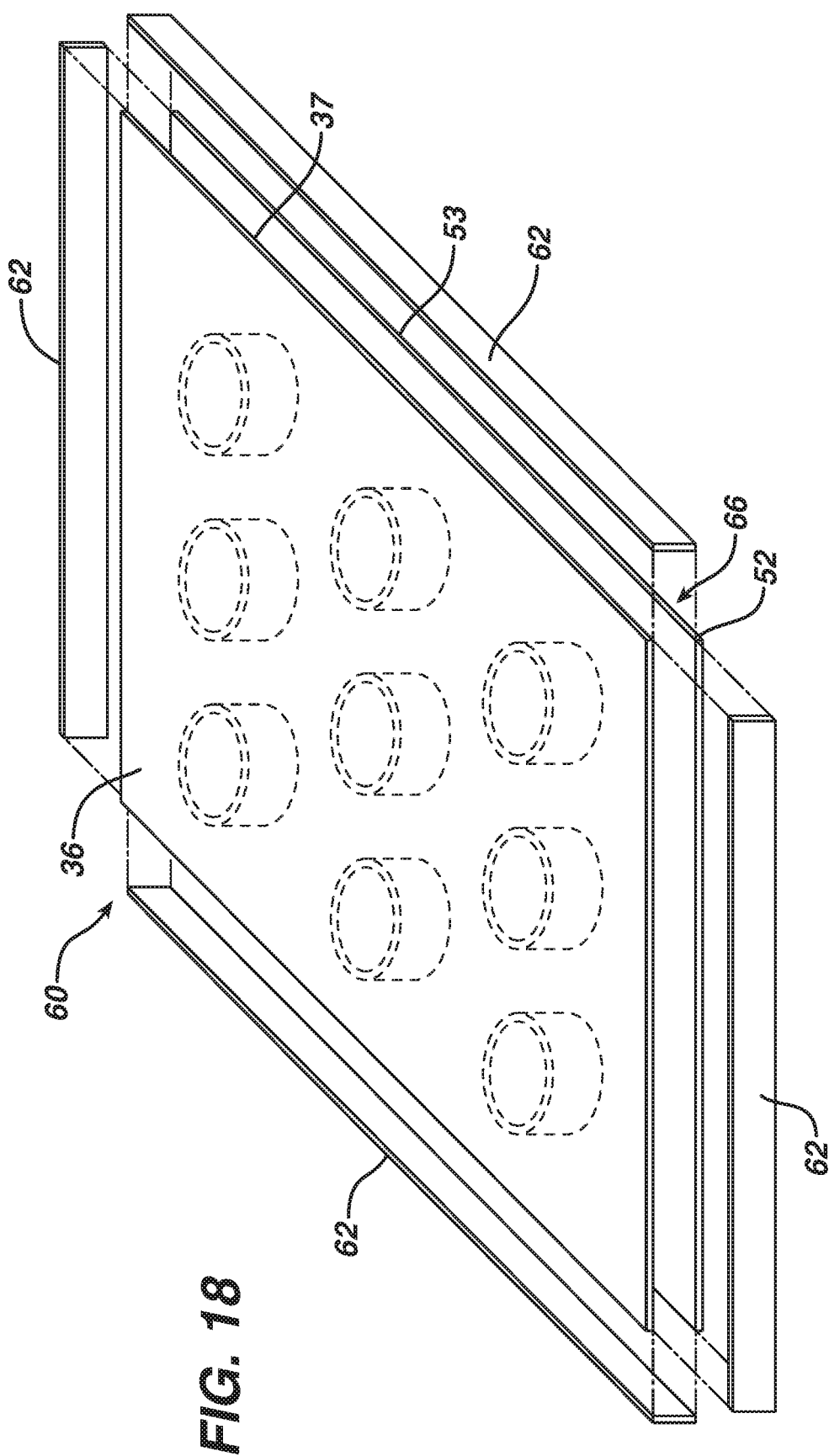
FIG. 18 is a perspective view, prior to assembly, of an impact-dissipating liner according to another aspect of the invention.

FIG. 18 is a perspective view, prior to assembly, of an impact-dissipating liner assembly 60 with sidewalls 62 according to another aspect of the invention. According to aspects of the invention, sidewalls 62 may comprise separate individual panels appropriately sized to engage the two peripheries 37 and 53. In another aspect, sidewalls 62 may be integrally formed with liner portion 34, liner portion 52, or both liner portion 34 and liner portion 52. For example, sidewalls 62 may comprise the sidewalls 40 shown in FIG. 9 that may be formed from the curing of fluid 44 in slots 15 shown in FIGS. 2 and 3. Regardless of the source of sidewalls 62, according to aspects of the invention, sidewalls 62 may typically be secured to liner portion 34 and liner portion 52 to provide a liner assembly having an enclosed cavity or enclosure 66, for example, a substantially fluid-impermeable enclosure. The securing of sidewalls 62 to liner portion 34 and liner portion 52 may be practice, with an adhesive, with mechanical fasteners, or with thermal fusion, for example, thermal fusion under an applied compression.

Figure 19:
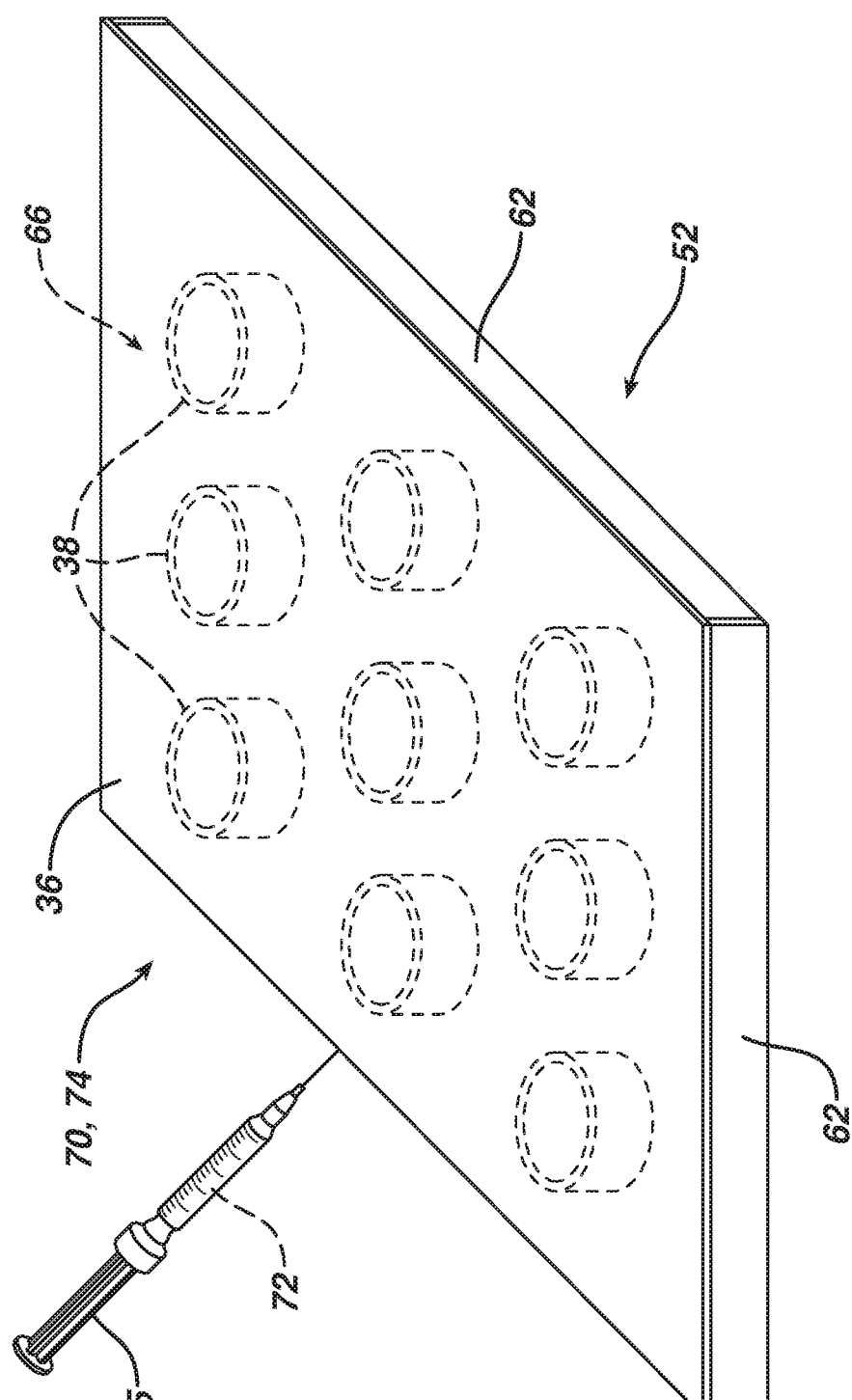
FIG. 19 is a perspective view, after assembly, of the impact-dissipating liner according shown in FIG. 18 while being injected with a fluid according to one aspect of the invention.

FIG. 19 is a perspective view, after assembly, of an impact-dissipating liner assembly 70 as assembled as illustrated in FIG. 18. With the assembly of liner assembly 70, according to aspects of the invention, a fluid 72 may be introduced to enclosure 66 of liner assembly 70 to provide the impact-dissipating liner 74 according to an aspect of the present invention. The fluid may be any fluid, including a liquid or a gas. In one aspect, the fluid may be substantially water, in another aspect, the fluid may be oil, for example, naturally occurring oil or synthetic oil. In one aspect, the fluid may include a diol, for example, ethylene glycol and/or propylene glycol. In one aspect, the fluid may be a saline solution, or its equivalent.

In one aspect of the invention, the ratio of the volume of the internal volumes of the projections 38, for example, the volume of the through holes, in impact dissipation liner assembly 70 (and in any liner assembly disclosed herein) may be related to the volume of the enclosure 66, that is, the volume of the enclosure outside projections 38 and within sidewalls 62 of liner assembly 70 (and in any liner assembly disclosed herein). For example, in one aspect, the volume of the projections 38 may be comparable to the volume of the enclosure 66, for instance, the ratio of the internal volumes of the projections 38 to the volume of enclosure 66 may be about 1.0, for example, ranging from about 0.90 to about 1.10 or ranging from about 0.75 to about 1.25. According to one aspect of the invention, when the internal volumes of the projections 38, for example, the total internal volumes of all the projections 38 in liner assembly 70 (and in any liner assembly disclosed herein) is comparable in volume to the volume of the substantially fluid-filled enclosure 66, it is believed that the impact energy dissipating capability of liner assembly 70 is enhanced. However, it is also envisioned that volume ratios varying from unity may also provide beneficial impact energy dissipation properties.

In one aspect of the invention the fluid 72 may be "degassed" prior to introducing the fluid to liner assembly 70, or to any other liner or liner assembly disclosed herein. According to this aspect of the invention, degassing may comprise removing any gaseous components that may be present in the fluid 72 introduced to liner assembly 70. For example, the fluid 72 may contain entrained or dissolved gas, for example, air, which preferably may be removed from the fluid 72 prior to introducing it to the liner assembly 70. It is believe that, if dissolved gasses are not removed prior to introducing, dissolved gas may degas from the fluid while the fluid is within the liner assembly 70, and this gas may interfere with the desired dissipation of applied forces.

The fluid 72 may be degassed by any conventional degassing means, for example, by heating or by via membrane separation. In one aspect, exposing the fluid 72 to a reduced pressure, for example, a sub-atmospheric pressure, such as, a vacuum, may degas the fluid. For example, exposing the fluid to a pressure of at most 28 inches of mercury [Hg] absolute, for example, for at least 1 minute, can be effective in removing dissolved gas from the fluid 72.

According to aspects of the invention, the fluid 72 may be introduced to internal enclosure 66 of liner assembly 70 by any conventional means. In a non-limiting illustration of one aspect of the invention, as shown in FIG. 19, fluid 72 may be introduced to liner assembly 70 via injection, for example, with a syringe 75 or a syringe-type device. Other means of introducing fluid 72 to liner assembly 70 will be apparent to those of skill in the art.

Figure 20:
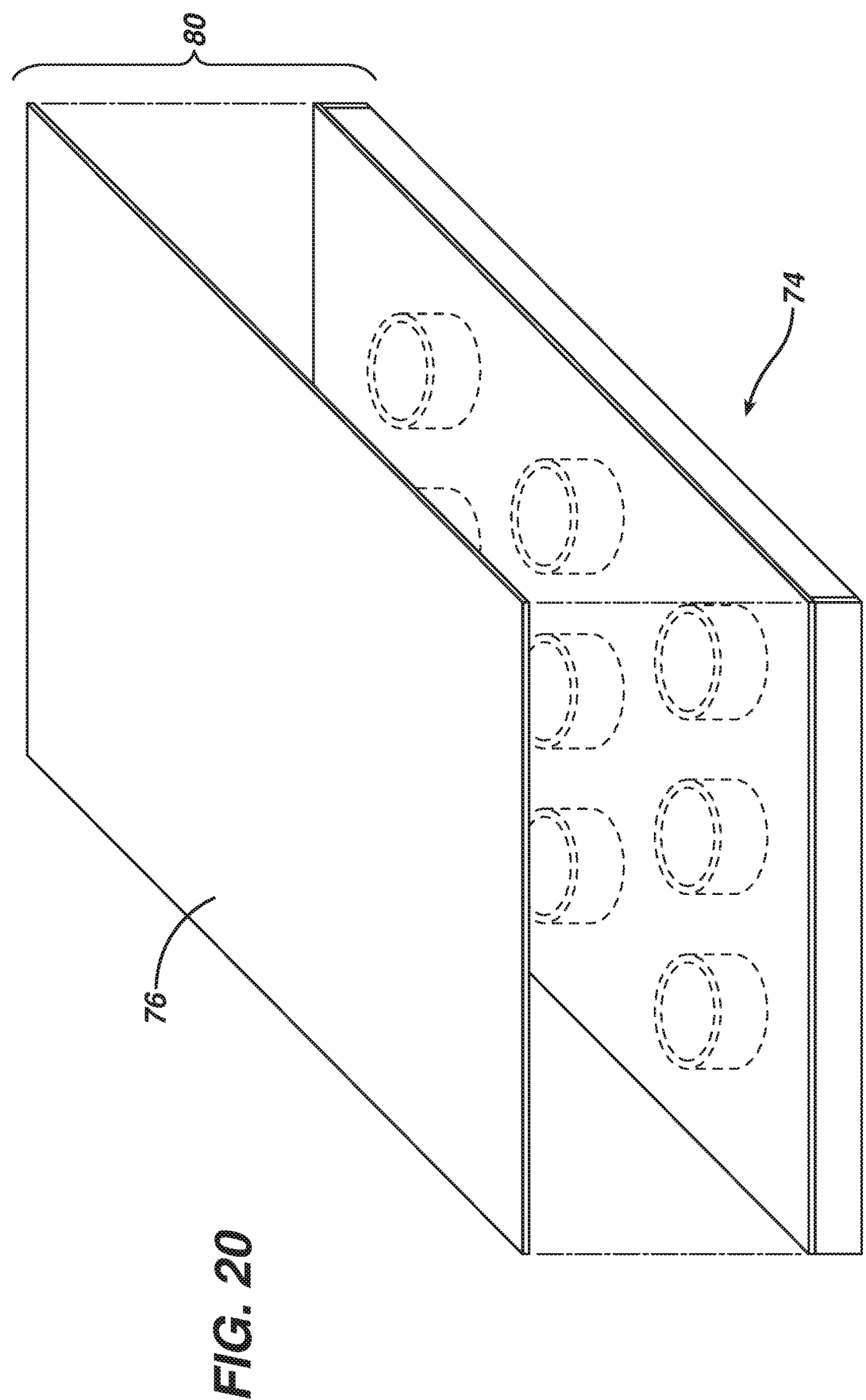
FIG. 20 is a perspective view, prior to assembly, of the impact-dissipating liner shown in FIG. 19 while being assembled with a panel according to one aspect of the invention.
Figure 21:
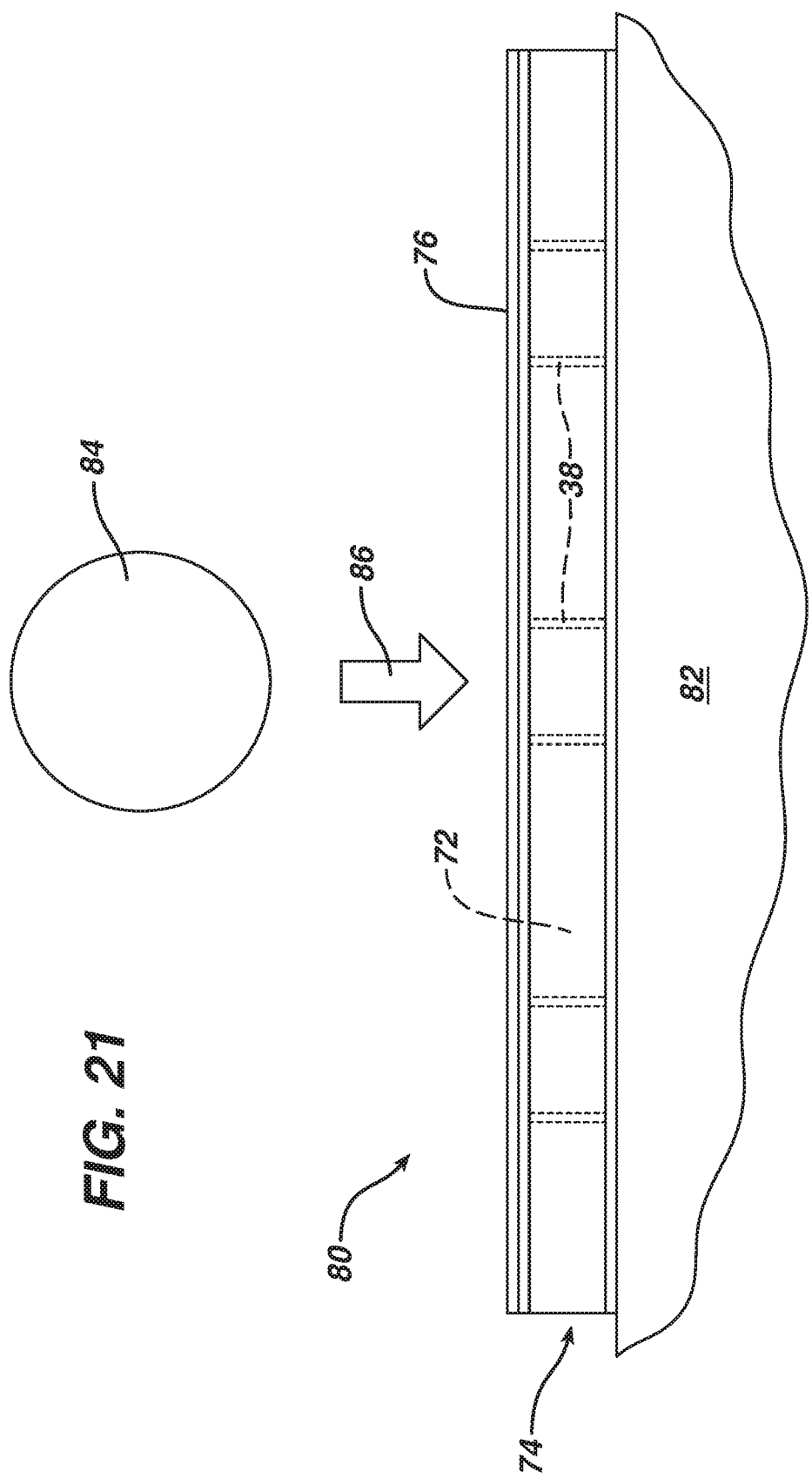
FIG. 21 is a side elevation, after assembly, of the impact-dissipating liner and panel shown in FIG. 20 while being impacted by an object according to one aspect of the invention.

FIG. 20 is a perspective view, prior to assembly, of the impact-dissipating liner assembly 74 having a fluid 72 shown in FIG. 19 while being assembled with a panel 76 according to one aspect of the invention to form a protective barrier or shield 80. FIG. 21 is a side elevation, after assembly, of the protective barrier or shield 80 having the impact-dissipating liner assembly 74 and panel 76 shown in FIG. 20. In one aspect, protective shield or barrier 80 may not include panel 76, but may comprise, or consist of, liner assembly 74. Panel 76 may be a substantially rigid panel, though panel 76 may have some inherent flexibility. Panel 76 may comprise a wood panel, an elastomeric panel, a plastic panel, or a metallic panel. For example, panel 76 may comprise one or more elastomeric materials, for example, a natural polymer, such as, polyisoprene rubber, or a synthetic polymer, such as, a neoprene, a thermoplastic elastomer, a thermoplastic rubber, and a polyvinyl chloride, or an ethylene propylene diene monomer (EPDM) rubber, and the like. Panel 76 may comprise one or more plastics, for example, a polyamide (PA), for example, nylon; a polyethylene (PE), both high-density polyethylene (HDPE) and low-density polyethylene (LDPE); a polyethylene terephthalate (PET); a polypropylene (PP); a polyester (PE); a polytetrafluoroethylene (PTFE); a polystyrene (PS); an acrylonitrile butadiene styrene (ABS); a polycarbonate (PC); or a polyvinylchloride (PVC); among other plastics. Panel 76 may be metallic, for example, an iron, a steel, a stainless steel, an aluminum, a titanium, a nickel, a magnesium, a brass, a bronze, a copper, a silver, a gold, or any other structural or ornamental metal.

According to aspects of the invention, protective barrier 80 may comprise a device for protecting any structure 82 upon which barrier 80 may be mounted. For example, structure 82 may be a human body, such as, a head, back, or chest, or structure 82 may be any structure, which could benefit from the dissipation of force, for example, an impact force. For instance, protective barrier 80 may comprise part of a protective helmet, a chest protector, a shoulder pad, a knee pad, a fore arm pad, a shin guard, or a leg protector, among others. Protective barrier 80 may also be adapted to protect any structure 82 requiring or desiring protection, for example, structure 82 may be a wall or barrier, for example, a surface related to a sport, such as, race track wall or barrier, a stadium or ballpark wall or barrier, or a hockey rink wall, barrier, or "board," among others. In another aspect, protective barrier 80 may also be adapted to protect any structure 82 used by the military, police, firefighters, first responders, and the like. For example, protective barrier 80 may comprise a shield, an armor, or a padding, among others.

As schematically illustrated in FIG. 21, barrier 80 may be effective in dissipating impact from an object 84 (as indicated by arrow 86) and, due to the presence of the fluid-containing liner assembly 74 having projections 38, minimize the transmission of the impact loading to structure 82.

The aspects of the invention shown and described with respect to FIGS. 1 through 21 comprise the general features of various aspects of the invention. The following disclosure and figures illustrate several more specific embodiments of the general features and aspects disclosed in FIGS. 1 through 21.

Figure 22:
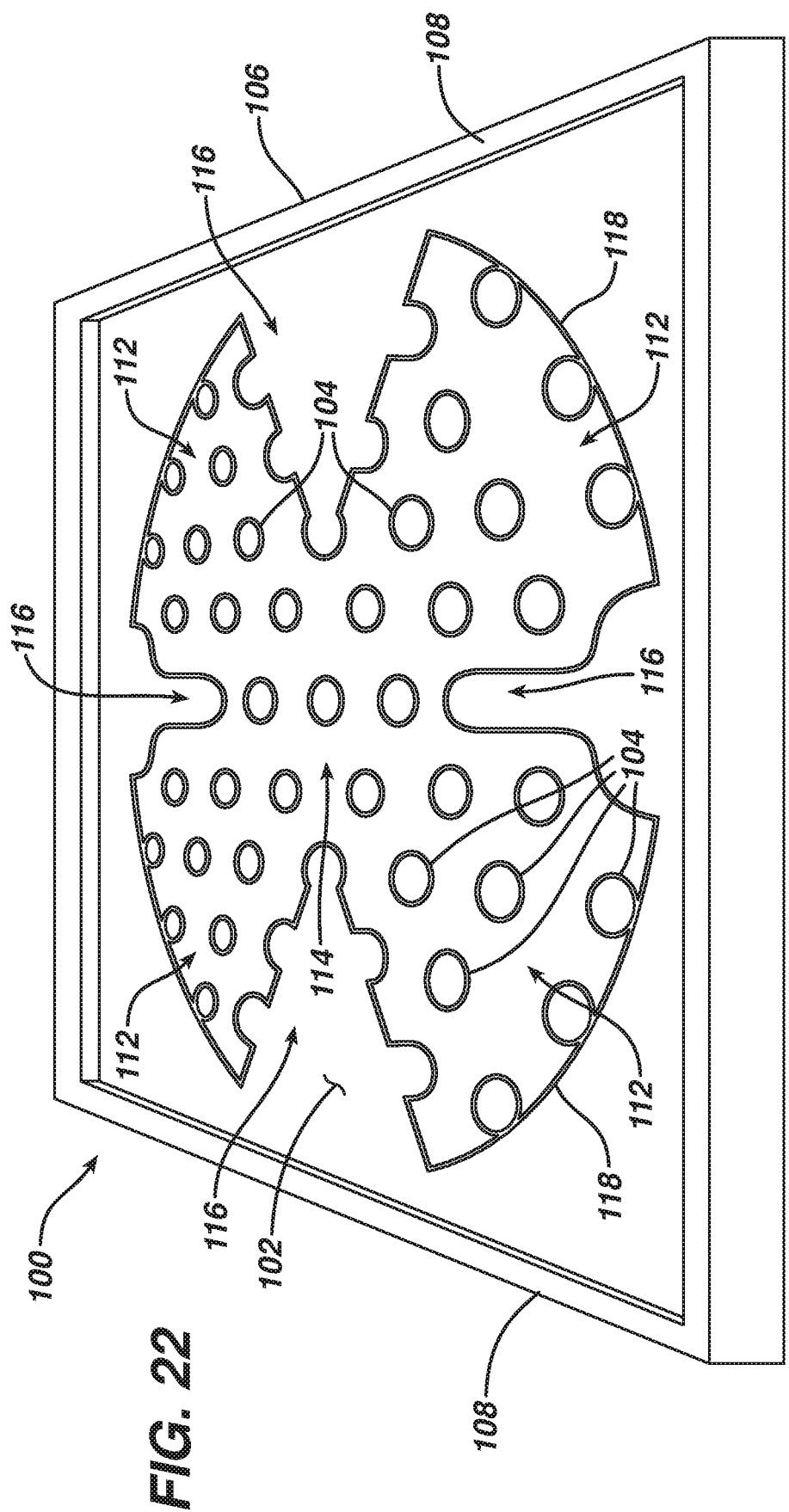
FIG. 22 is a perspective view of a mold for a portion of an impact-dissipating liner according to another aspect of the invention.

For example, FIG. 22 is a perspective view of a mold 100 for a portion of an impact-dissipating liner according to another aspect of the invention. Mold 100 may comprise many of the features and attributes of mold 10 shown in FIGS. 1 through 8. Specifically, mold 100 may also be adapted to receive a curable, or hardenable fluid (not shown), for example, a fluid polyethylene or a fluid silicone, and the curable fluid may be allowed to cure, that is, solidify or harden, to form a portion of an impact-dissipating liner.

As shown in FIG. 22, mold 100 may include a surface 102, and surface 102 may include a number of recesses 104 evenly distributed about surface 102 and into which curable fluid (not shown) flows and substantially fills each recess 104 with the curable fluid. The surface 102 and the recesses 104 of mold 100 may typically be formed in a block, panel, or plate 106. Mold 100 may also include a rim or peripheral barrier 108, for example, encircling the perimeter of plate 106, and rim 108 may act to retain the curable fluid introduced to mold 100.

According to this aspect of the invention, mold 100 may be uniquely adapted for the fabrication of liner portions that can be formed into spherical shapes, for example, for use as a protective liner or barrier for a headgear or helmet, for example, a motorcycle helmet, among other helmets envisioned. Accordingly, in order to permit the folding or contortion of the liner portion, mold 100 may comprise a plurality of lobes 112 radiating from a central portion 114, and lobes 112 may be delimited by radially directed gaps, cavities, or voids 116. Gaps 116 may be devoid of recesses 104.

As shown in FIG. 22, in this aspect, mold 100 may include one or more peripheral slots 118, for example, substantially encircling recesses 104, and, in a fashion similar to slot 15 shown in FIGS. 2 and 3, when slot 118 is filled with a curable fluid and cured, slot 118 may provide a wall or barrier to the liner portion formed from mold 100.

Figure 23:
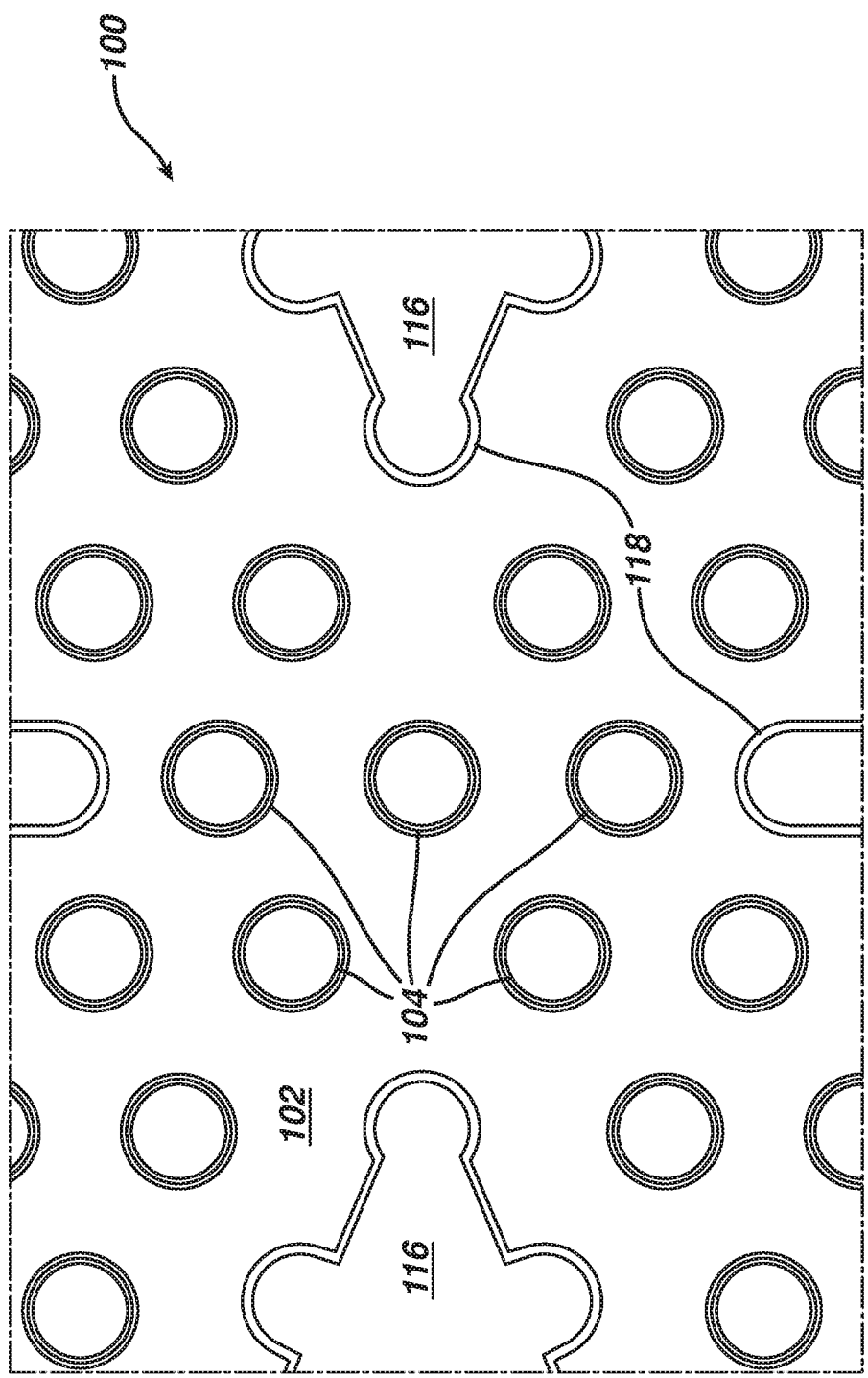
FIG. 23 is a plan view of a portion of the mold shown in FIG. 22.
Figure 24:
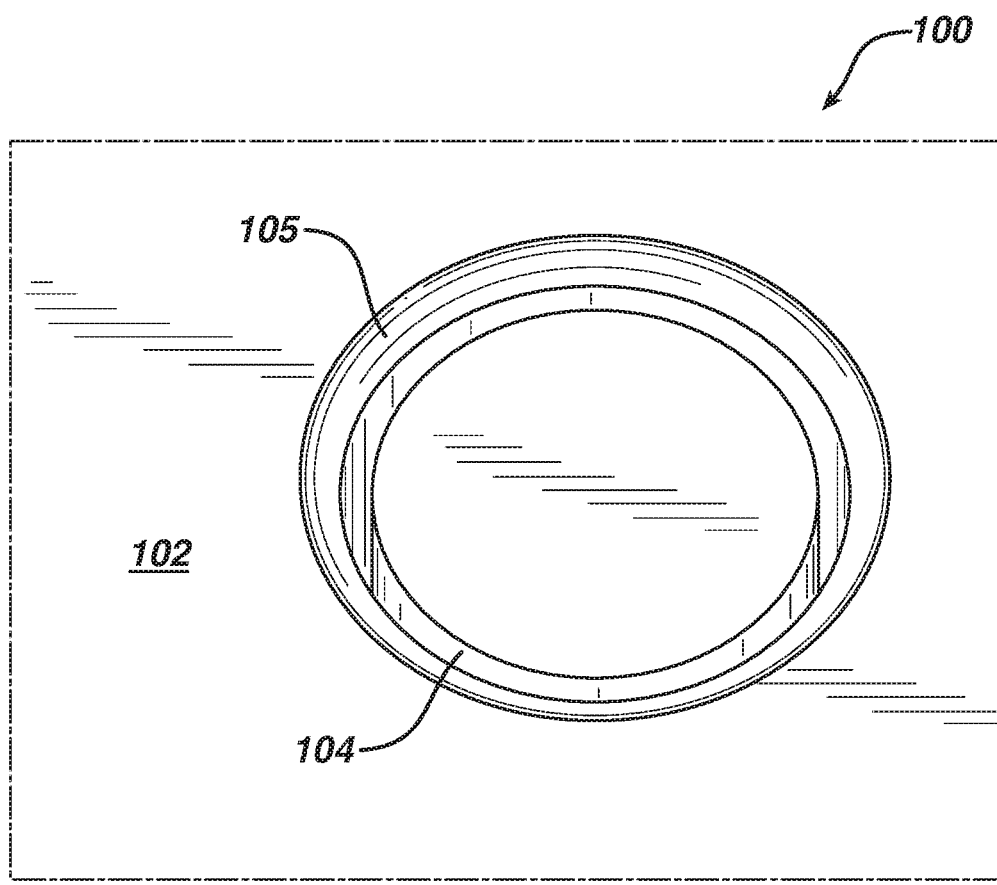
FIG. 24 is a detailed perspective view of a recess in the mold shown in FIG. 23.

FIG. 23 is a plan view of a portion of the mold 100 shown in FIG. 22. FIG. 24 is a detailed perspective view of a recess 104 in the mold 100 shown in FIG. 23. As shown most clearly in FIG. 24, recesses 104 may be similar, if not identical to, and have all the attributes and dimensions of recesses 16 shown and described with respect to FIGS. 1 through 3. For example, as shown in FIG. 24 recesses 104 may include a radius 105 about the outside diameter in a fashion similar to that shown in FIG. 6.

Figure 25:
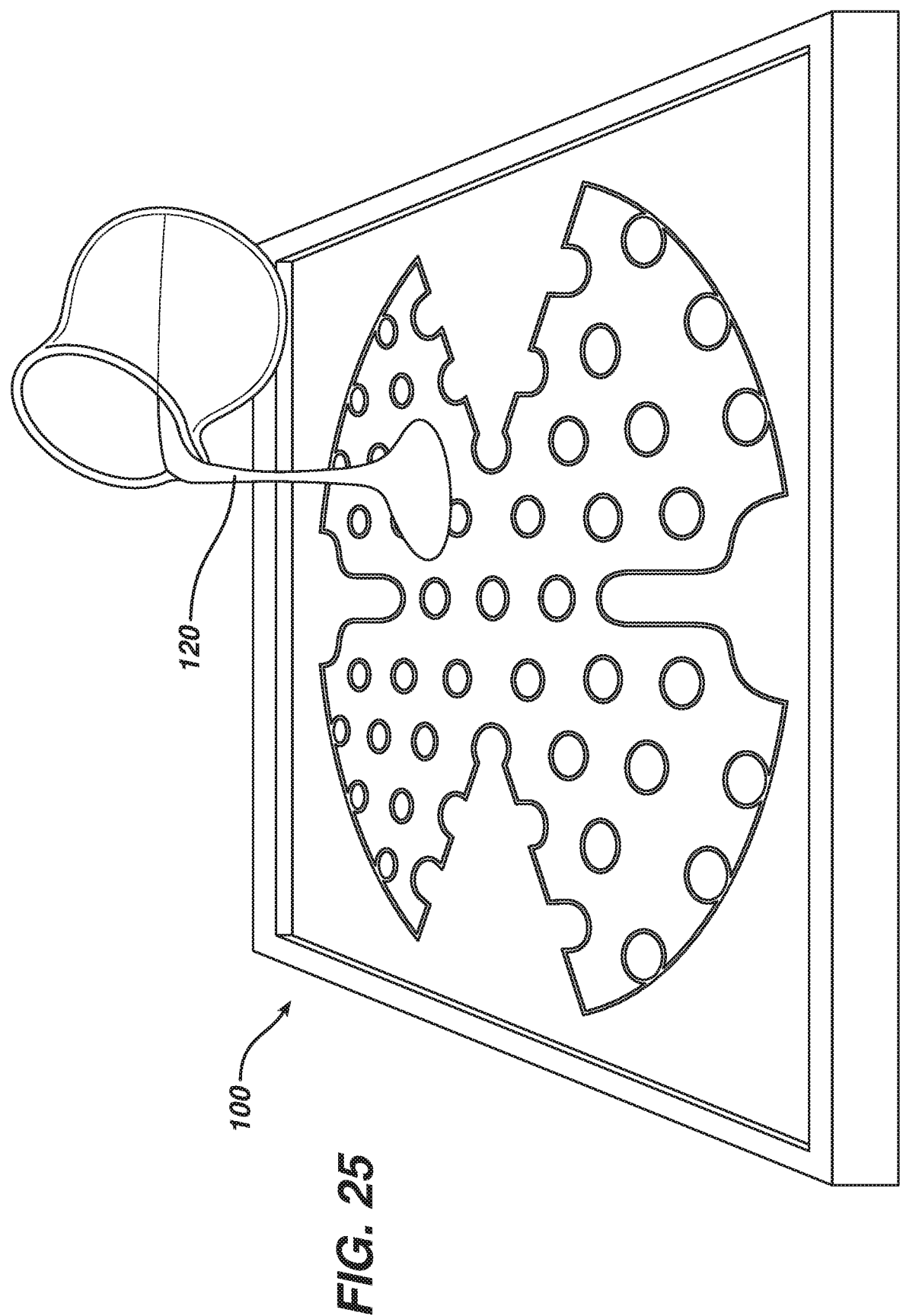
FIG. 25 is a perspective view of the mold shown in FIG. 22 while a curable fluid is being introduced to the mold.

FIG. 25 is a perspective view of mold 100 shown in FIG. 22 while a curable fluid 120 is being introduced to mold 100, in a fashion as disclosed herein. Again, the method of introduction of fluid 120 to mold 100 is shown for representative illustration; any conventional means of introducing fluid 120 to mold 100 may be practiced.

Figure 26:
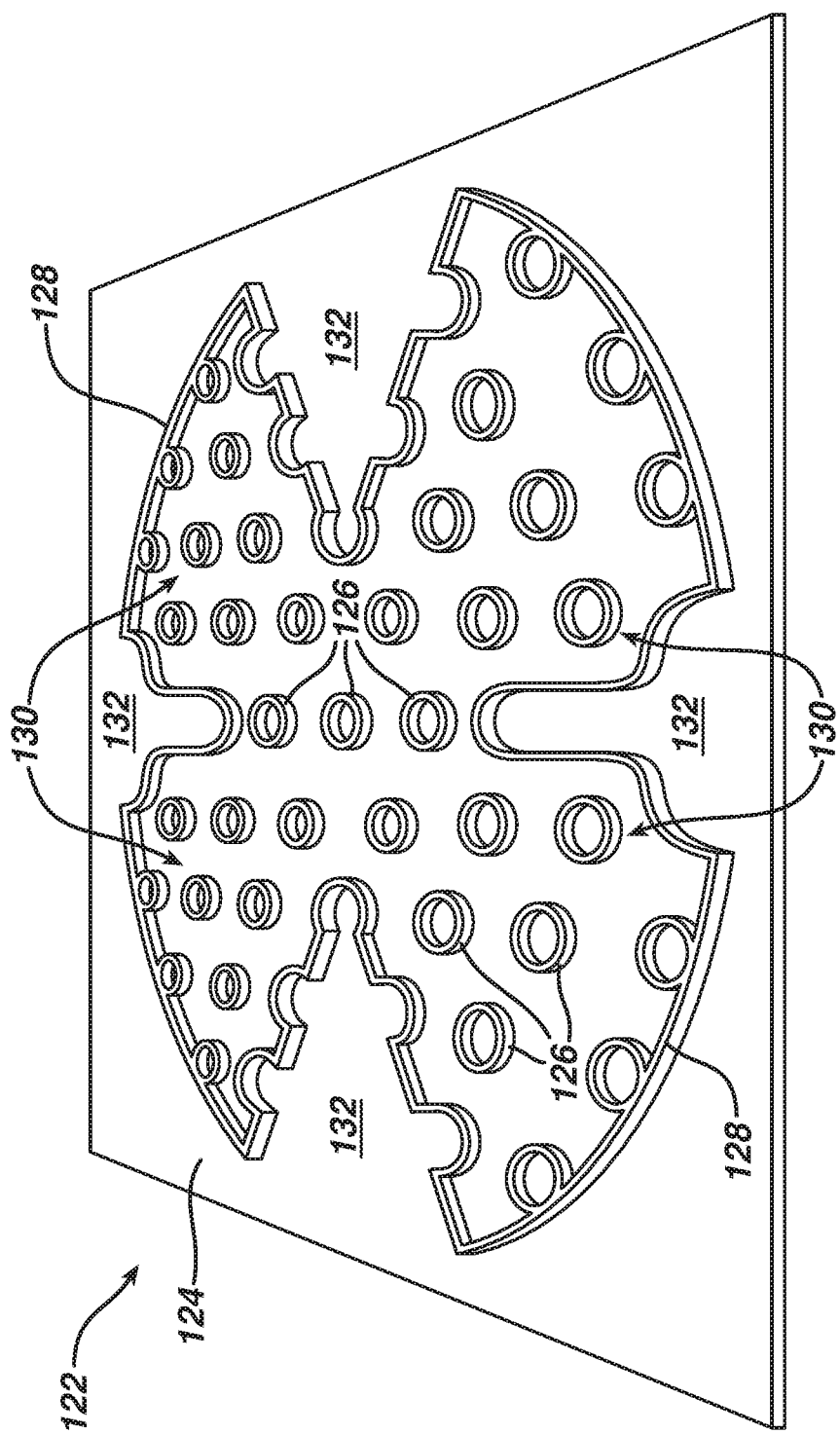
FIG. 26 is a perspective view of a portion of an impact-dissipating liner produced from the mold and curable fluid shown in FIG. 25 according to an aspect of the invention.

FIG. 26 is a perspective view of a portion 122 of an impact-dissipating liner produced by the mold 100 and curable fluid 120 shown in FIG. 25 according to an aspect of the invention. As shown, in a fashion similar to that shown in FIG. 9 for liner portion 34, liner portion 122 includes a flexible sheet 124 and a plurality of projections 126, in this aspect, circular cylindrical projections, from sheet 124. In addition, in the aspect shown in FIG. 26, liner portion 122 includes a substantially continuous peripheral wall 128 formed from slot 118 in mold 100. Also, liner portion 122 includes a plurality of lobes 130 reflective of lobes 112 in mold 110 and a plurality of corresponding voids 132 reflective of voids 116 in mold 100.

In the aspect of the invention shown in FIG. 26, sheet 124 of liner portion 122 may extend beyond the peripheral wall 128, for example, due to the shape of mold 100. However, in one aspect, any sheet 124 located beyond peripheral wall 128 may be removed, for example, trimmed to the edge of peripheral wall 128. In another aspect, sheet 124 may not extend beyond peripheral wall 128 where little or no trimming of portion 122 need be done.

Figure 27:
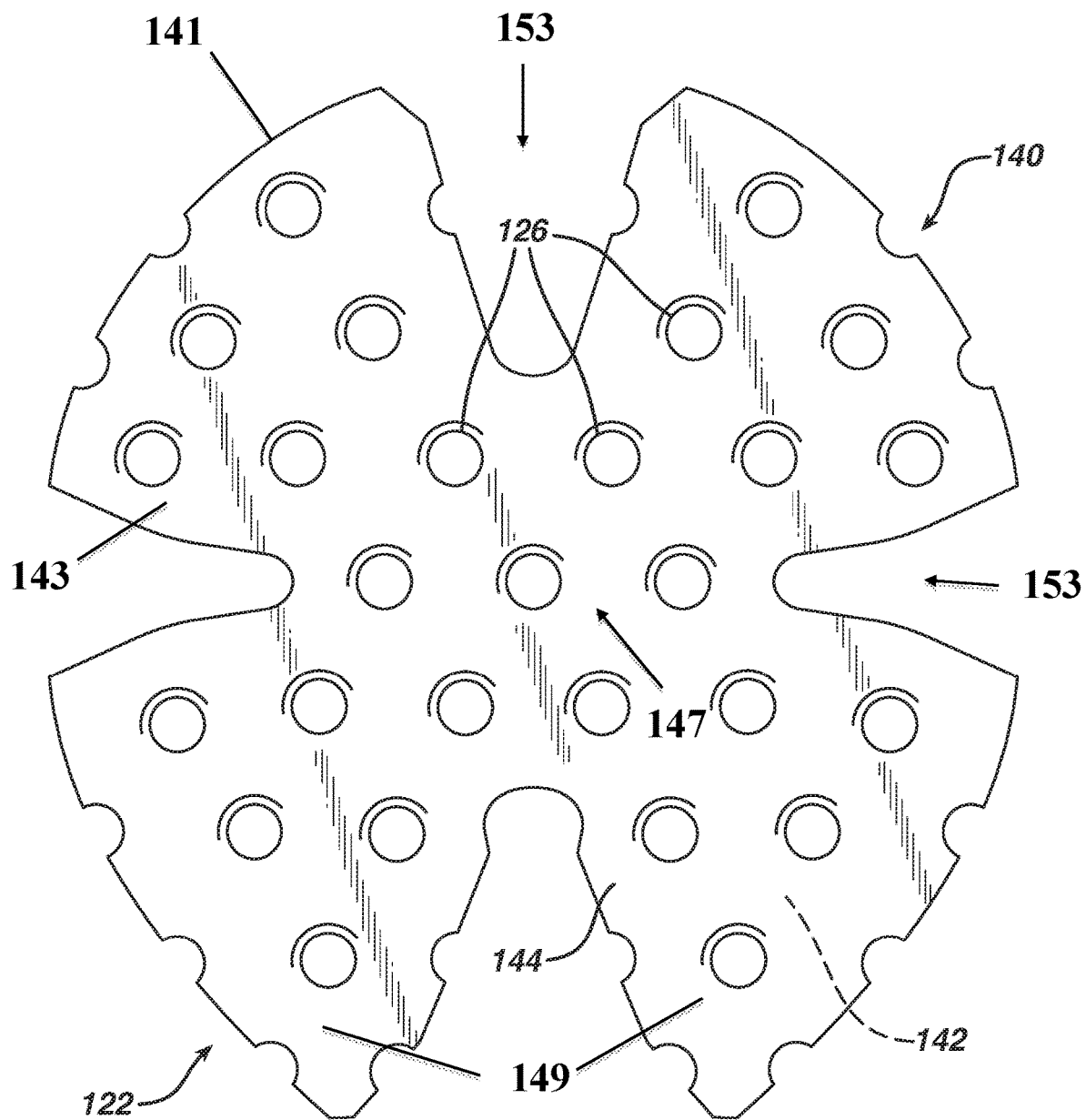
FIG. 27 is a top plan view of an impact-dissipating liner produced by the liner portion shown in FIG. 26 after being assembled and filled with a fluid according to an aspect of the invention, a bottom view comprising a mirror image thereof.
Figure 28:
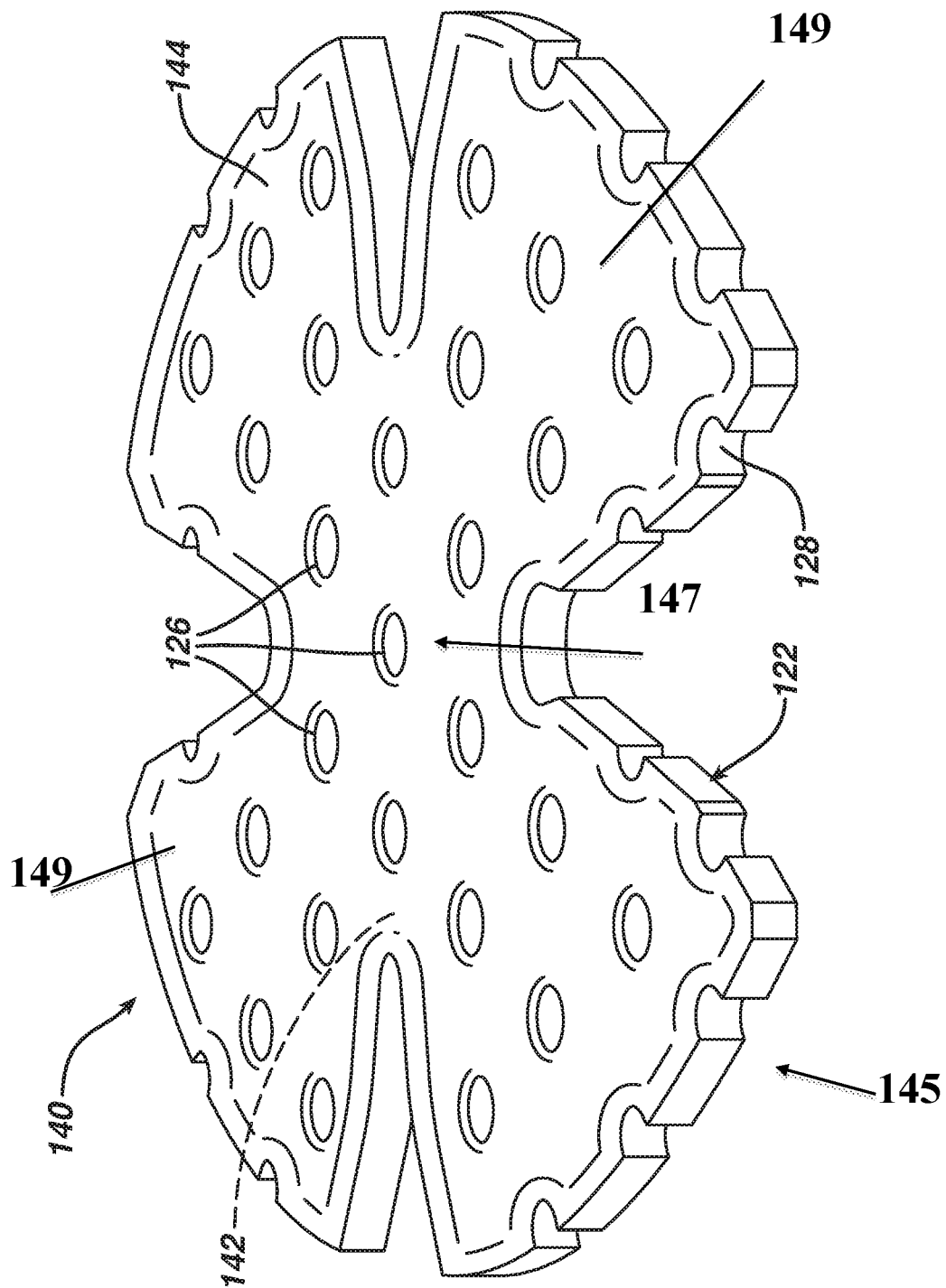
FIG. 28 is a perspective view of the impact-dissipating liner shown in FIG. 27.
Figure 70:
FIG. 70 is a front elevation view of the impact-dissipating liner shown in FIGS. 27 and 28, the rear elevation view being a mirror image thereof.
Figure 71:
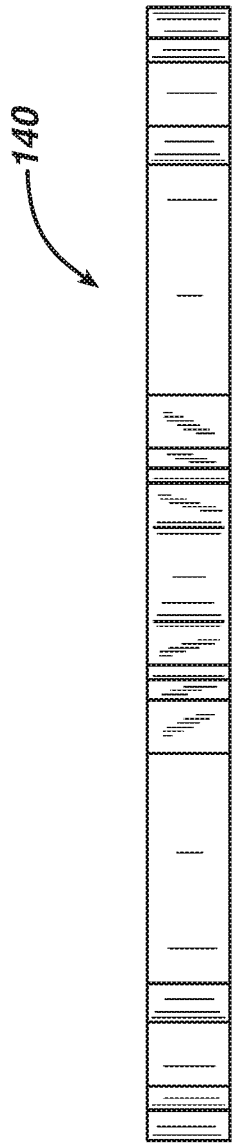
FIG. 71 is a right-side elevation view of the impact-dissipating liner shown in FIGS. 27 and 28.
Figure 72:
FIG. 72 is a left-side elevation view of the impact-dissipating liner shown in FIGS. 27 and 28.

FIG. 27 is a top plan view of an impact-dissipating liner 140 produced by the liner portion 122 shown in FIG. 26 after being assembled and filled with a fluid 142 according to an aspect of the invention. FIG. 28 is a perspective view of the impact-dissipating liner 140 shown in FIG. 27. (Side elevation views of liner 140 are shown in FIGS. 70-72.) Liner 140 may be fabricated in a fashion similar to the method shown and described with respect to FIGS. 7 through 18. For example, liner 140 may be fabricated by first fabricating a second portion of liner 144, for example, in a mold similar to mold 42 shown in FIG. 10, but with the mold having a shape reflective of or complementary to the shape of liner portion 122 shown in FIG. 26. Liner portion 122 shown in FIG. 26 may then be inverted and embedded in an uncured or partially cured fluid wherein the distal ends of projections 126 of liner portion 122 engage the uncured or partially cured fluid, and the uncured or partially cured fluid may be allowed to cure and adhere to the distal ends of projections 126 to provide a liner portion 122 and a planar liner portion 142, for example, as shown in FIGS. 13 through 17, to produce impact-dissipating liner 140 having an internal cavity, chamber, enclosure, or void. Fluid 142 may then be introduced to the internal cavity, chamber, enclosure, or void within mated portions 122 and 144, for example, by injection, to provide the impact-dissipating fluid filled liner 140 shown in FIGS. 27 and 28.

As shown in FIGS. 27 and 28, impact dissipating helmet liner 140 typically includes a flexible, fluid impermeable enclosure 141 having an upper wall 143, an opposing lower wall 145, and a peripheral or sidewall 128 extending between the upper wall 143 and the lower wall 145 and a plurality of recesses or cavities 126 extending between the upper wall 143 and the lower wall 145, each of the plurality of cavities 126 having a cavity sidewall extending from the upper wall 143 to the lower wall 145, and a fluid 142 contained in the enclosure 141. According to an aspect of the invention, the flexible, fluid impermeable enclosure 141 may comprise a central portion 147 and a plurality of lobes 149 extending from the central portion 147, wherein the central portion 147 and the plurality of lobes 149 are adapted to conform to the shape of an internal surface of a helmet (not shown), for example, helmet 210 shown in FIG. 39. As shown in FIG. 27, the plurality of lobes 149 may define radially-extending cavities 153 between adjacent lobes 149.

As discussed with respect to FIG. 26, planar liner portion 144 (not shown) may extend beyond the peripheral wall 128 of liner portion 122, for example, due to the shape of mold from which planar liner portion 144 is made. However, in one aspect, any portion of liner portion 144 that is located beyond the peripheral wall 128 of liner portion 122 may be removed, for example, trimmed to the edge of peripheral wall 128. Also, in one aspect, planar liner portion 144 may not include through holes corresponding to the insider diameters of projections 126. According to aspects of the invention, any portion of planar liner portion 144 that extends over the inside diameter of projections 126 may be removed, for example, trimmed, for instance, as shown in FIGS. 27 and 28. However, in another aspect of the invention, any portion of planar liner portion 144 that extends over or covers the inside diameter of projections 126 may not be removed. For example, in one aspect, at least some of the projections 126 and their inside diameters may be covered by portions of planer liner 144 and no through hole in planar liner 144 may be provided above or within the one or more projections 126 in liner 140.

Figure 29:
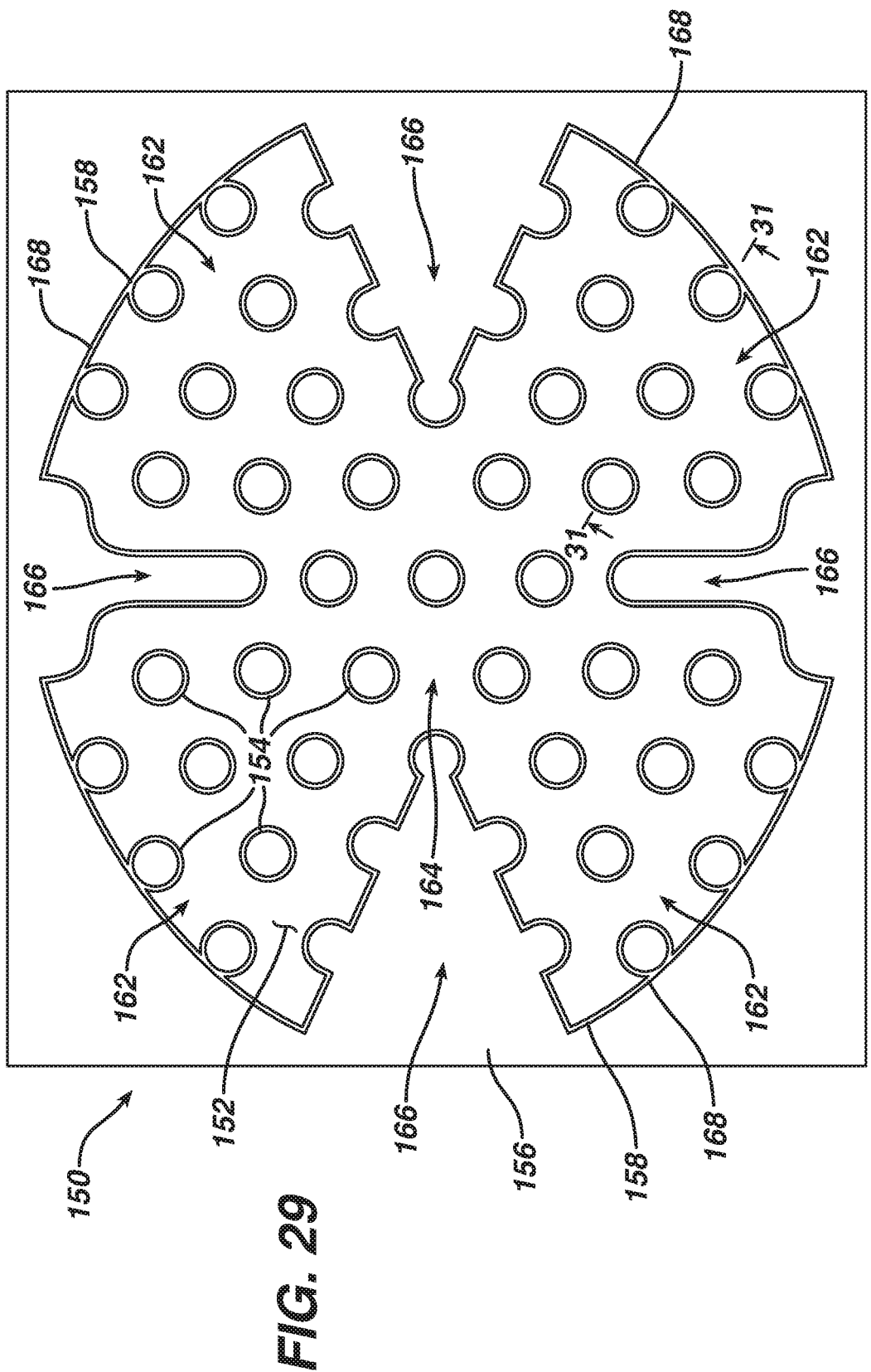
FIG. 29 is a top plan view of another mold for a portion of an impact-dissipating liner according to another aspect of the invention.
Figure 30:
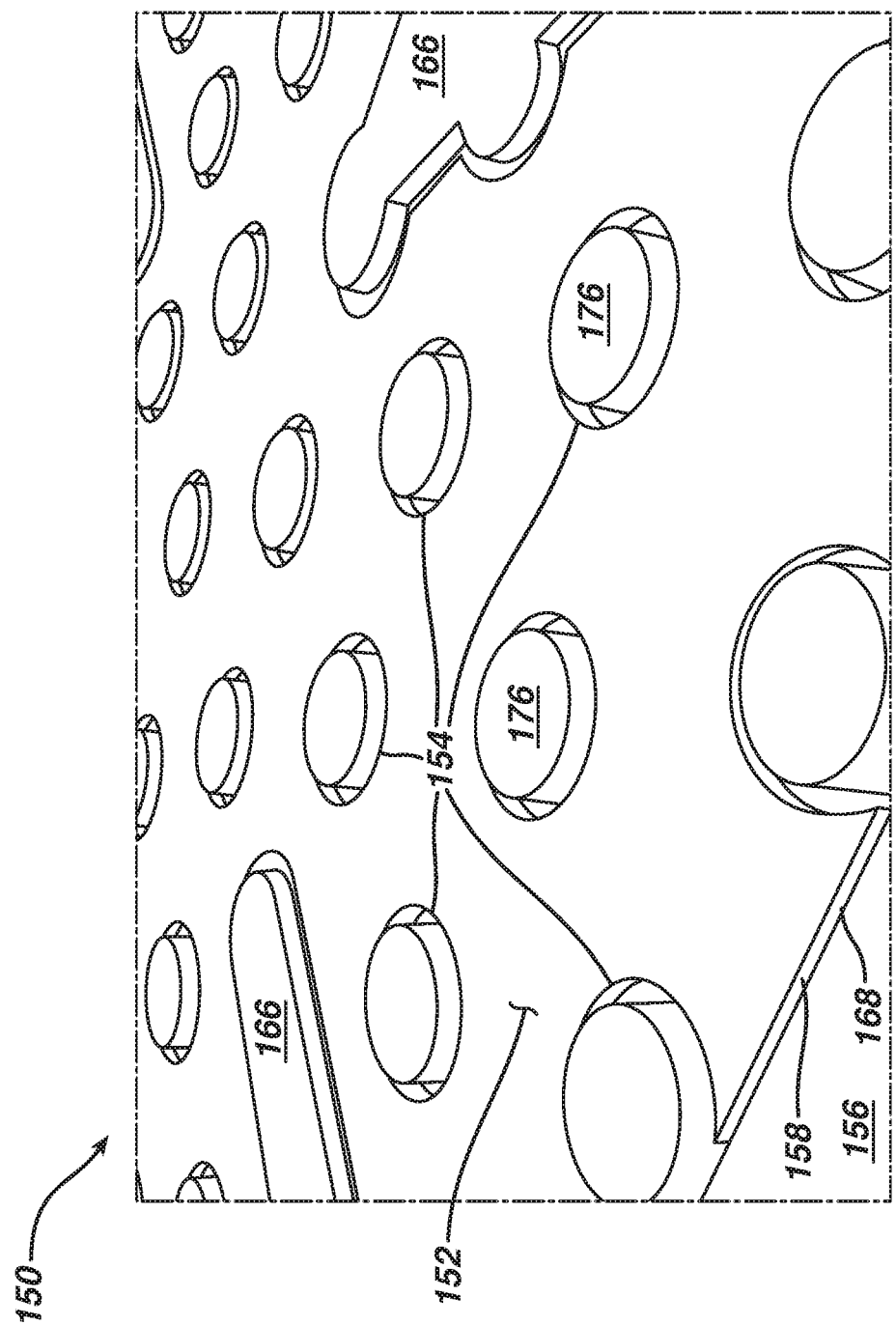
FIG. 30 is a perspective view of a mold for a portion of the mold shown in FIG. 29.

FIG. 29 is a top plan view of another mold 150 for a portion of an impact-dissipating liner according to another aspect of the invention. FIG. 30 is a perspective view of a portion of the mold 150 shown in FIG. 29.

Mold 150 may comprise many of the features and attributes of mold 10 shown in FIGS. 1 through 8. Specifically, mold 150 may also be adapted to receive a curable or hardenable fluid (not shown), for example, a fluid polyethylene or a fluid silicone, and the curable fluid may be allowed to cure, that is, solidify or harden, to form a portion of an impact-dissipating liner. As shown in FIG. 29, mold 150 may include a surface 152, and surface 152 may include a number of recesses 154 evenly distributed about surface 152 and into which curable fluid may flow and may substantially fill each recess 154 with the curable fluid. Recesses 154 may have similar sizes and shapes as recesses 16 disclosed herein. The surface 152 and the recesses 154 of mold 150 may typically be formed in a block, panel, or plate 156. Mold 150 may also include a rim or peripheral barrier 158, for example, encircling the perimeter of fluid containing area of mold 150, for instance, encircling the perimeter of surface 152, and may act to retain the curable fluid introduced to mold 150.

According to this aspect of the invention, mold 150 may be uniquely adapted for the fabrication of liner portions that can be formed into spherical shapes, for example, for use as a protective liner or barrier for a headgear or helmet, for example, a motorcycle helmet, among other helmets envisioned. Accordingly, mold 150 may comprise a plurality of lobes 162 radiating from a central portion 164, and lobes 162 may be delimited by radially directed gaps, cavities, or voids 166.

As shown in FIG. 29, in this aspect, mold 150 may include one or more peripheral slots 168, for example, substantially encircling recesses 154, and, in a fashion similar to slot 15 shown in FIGS. 2 and 3, when slot 168 is filled with a curable fluid and cured, slot 168 provides a wall or barrier to the liner portion formed from mold 150.

Figure 31:
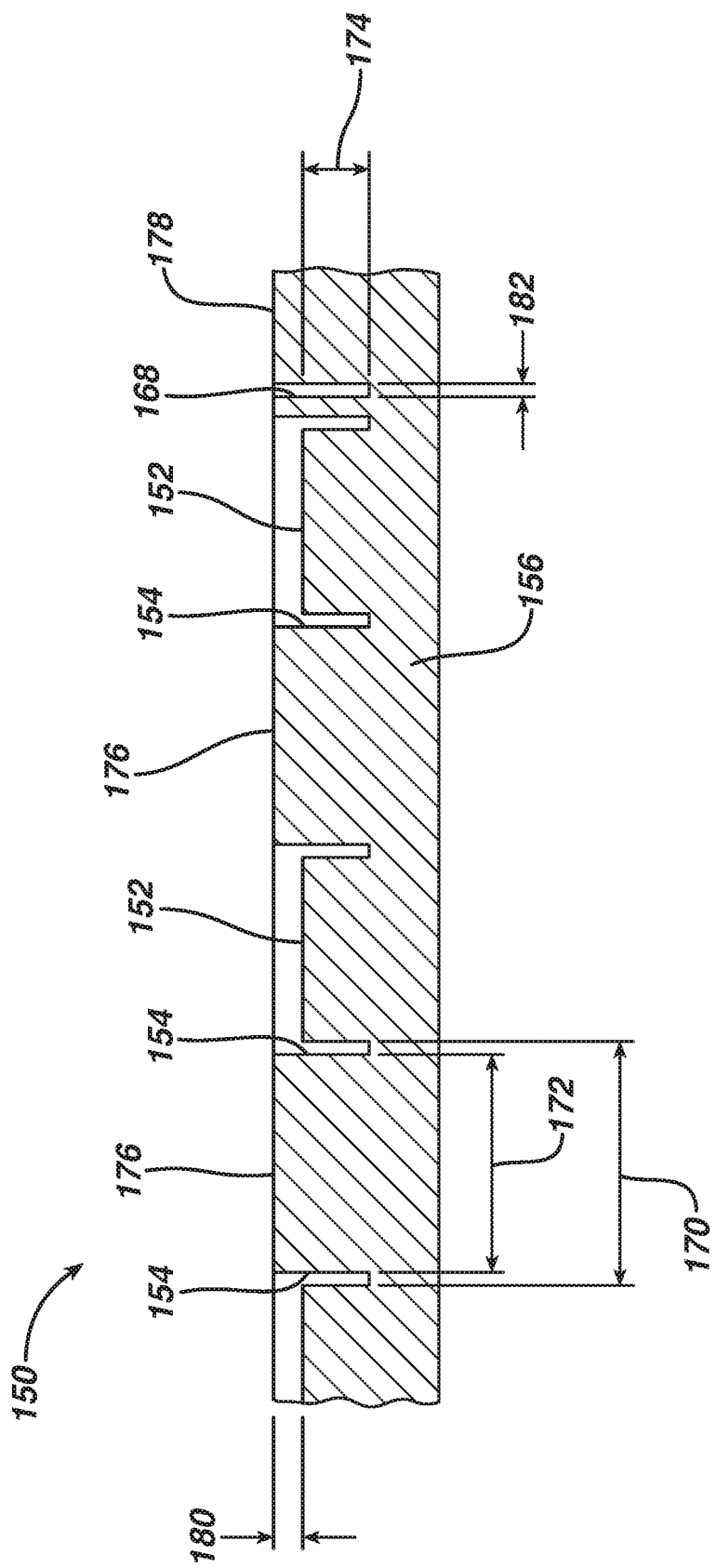
FIG. 31 is a cross sectional view of the mold shown in FIG. 29 as viewed along section lines 31-31 in FIG. 29.

FIG. 31 is a cross sectional view of mold 150 shown in FIG. 29 as viewed along section lines 31-31 in FIG. 29. As shown in FIG. 31, recesses 154, for example, circular cylindrical recesses, in surface 152 may have an outside diameter 170, an inside diameter 172, and a depth 174 below surface 152. In this aspect of the invention, inside diameter 172 may define a surface 176 elevated above surface 152. As shown in FIGS. 30 and 31, surface 176 may be elevated a distance 180 above surface 152. Though in one aspect of the invention, surface 176 defined by inside diameter 172 may be substantially coplanar with the upper surface 178 of panel 156, in other aspects, surface 176 may be above or below surface 178. FIG. 31 also illustrates the relative depth and width 182 of peripheral slot 168 in mold 150. The depth of slot 168 may be comparable in extent to the depth 174 of recesses 154.

According to aspects of the invention, outside diameter 170 of recesses 154 may range from about ¼ inch to about 3 inches, but is typically between about 0.5 inches and about 1.5 inches, and inside diameter 172 may range from about ¼ inch to about 3 inches, but is typically between about 0.5 inches and about 1.5 inches. For example, the width of recesses 154 may range from about 0.5 mm [0.02 inches] to about 5 mm [0.2 inches]. Depth 174 of each recess 154 and of slot 168 from surface 152 may range from about ½ inch to about 3 inches, but is typically between about 0.5 inches to about 1.5 inches. Also, the depth 180 of surface 151 may range from about ¼ inch to about 3 inches, but is typically between about 0.5 inches to about 1 inch, and the width 182 of peripheral slot 168 may range from about 0.01 inches to about 1 inch, but is typically between about 0.5 mm [0.02 inches] to about 5 mm [0.2 inches].

Figure 32:
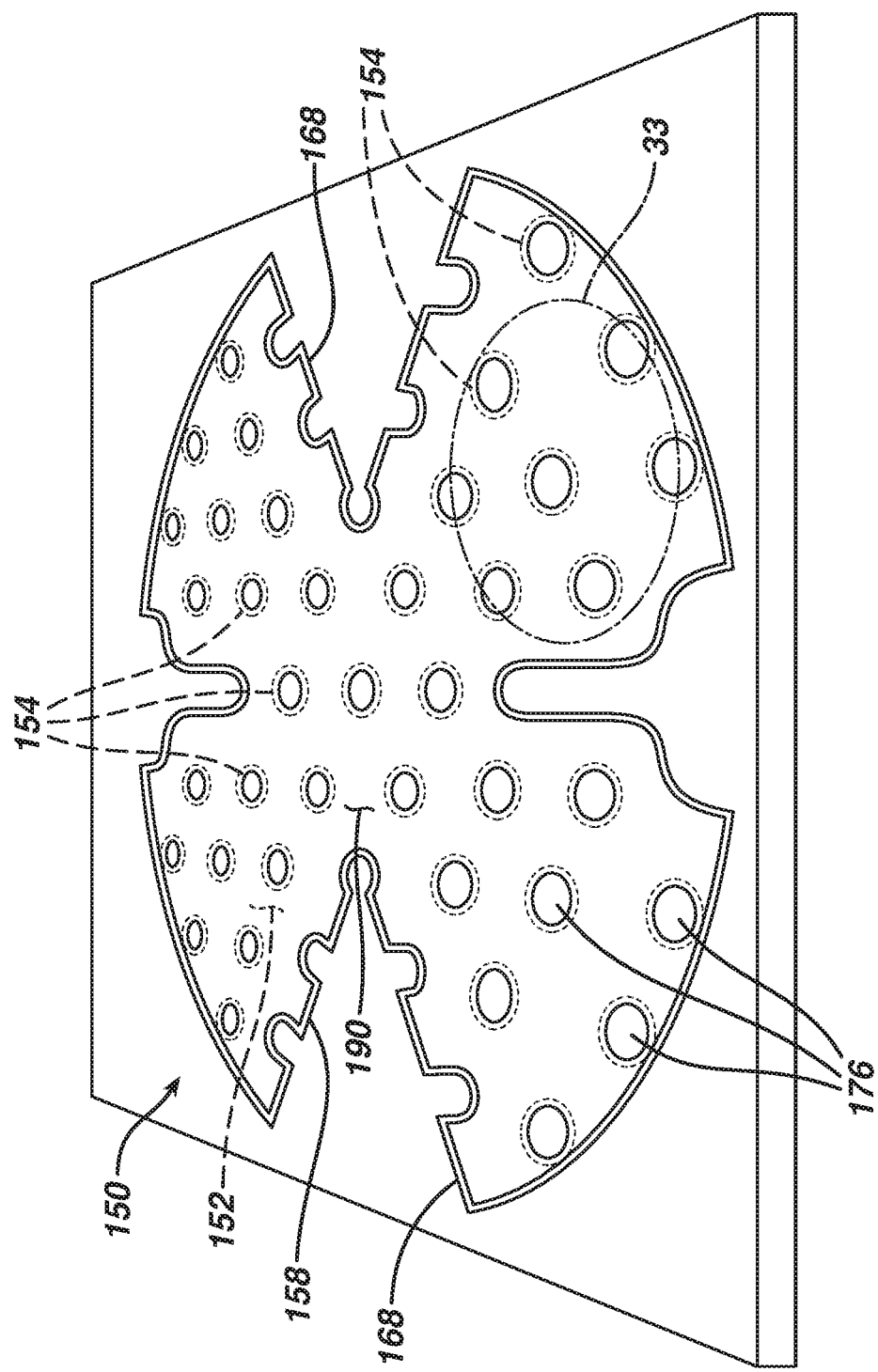
FIG. 32 is a perspective view of the mold shown in FIG. 29 when filled with a curable fluid according to one aspect the invention.
Figure 33:
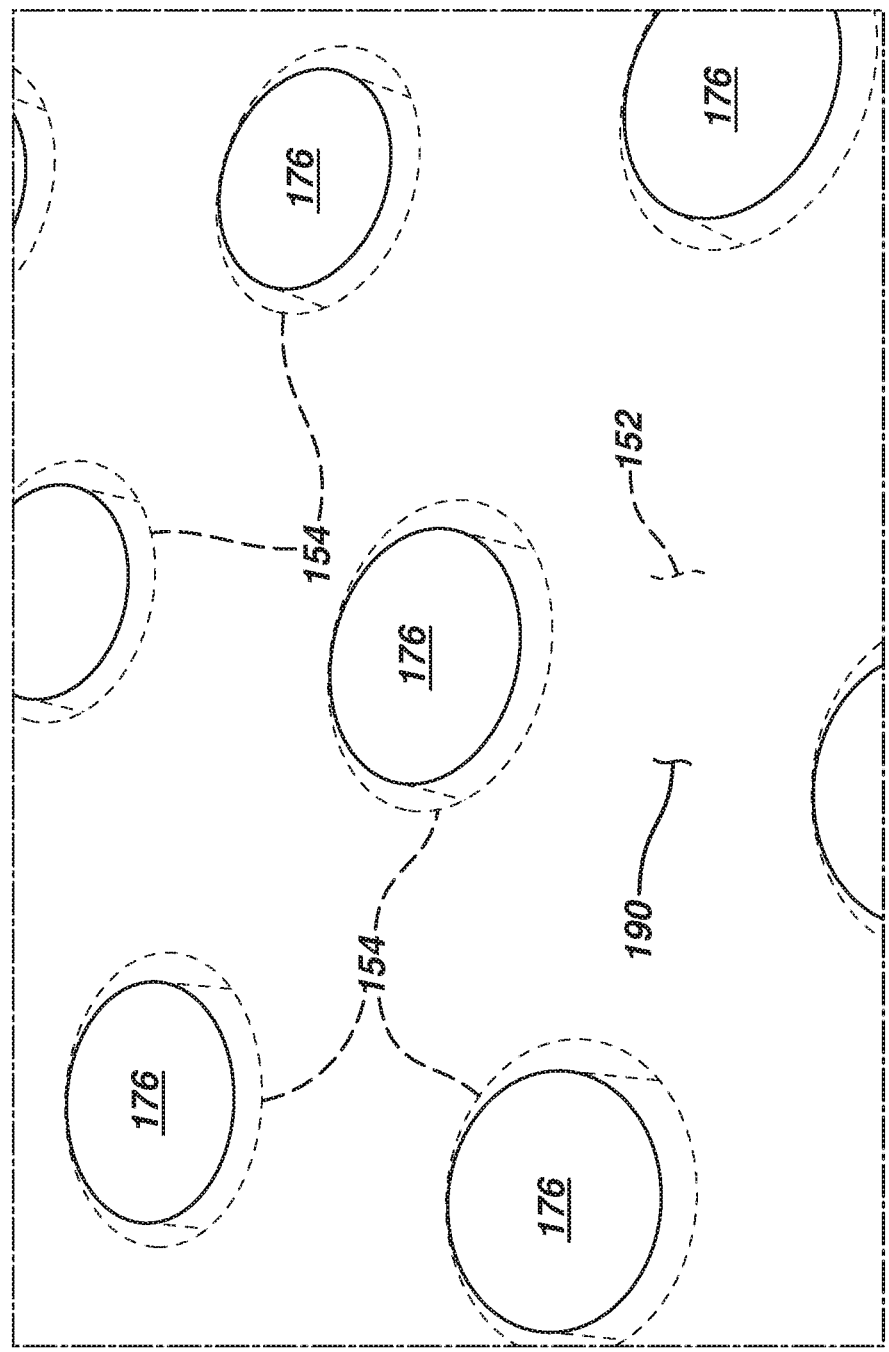
FIG. 33 is a detailed perspective view of the mold and curable fluid shown in FIG. 32 as identified by Detail 33 in FIG. 32.

FIG. 32 is a perspective view of mold 150 shown in FIG. 29 when filled with a curable fluid 190 according to one aspect the invention. As shown, in this aspect, fluid 190 may cover surface 152 and may fill recesses 154 and may fill peripheral slot 168, while being retained by peripheral wall 158. FIG. 33 is a detailed perspective view of mold 150 and curable fluid 190 shown in FIG. 32 as identified by Detail 33 in FIG. 32. As shown in FIG. 33, in one aspect, fluid 190 may cover surface 152 and may fill recesses 154 while leaving the surface 176 of recess 154 substantially devoid of fluid 190. That is, in one aspect, fluid 190 may have an elevation within mold 150 lower than the elevation of surfaces 176. In another aspect, surfaces 176 may be at least partially submerged in fluid 190 where, upon curing, a layer of cured fluid 190 may be present above at least some of surfaces 176.

Figure 34:
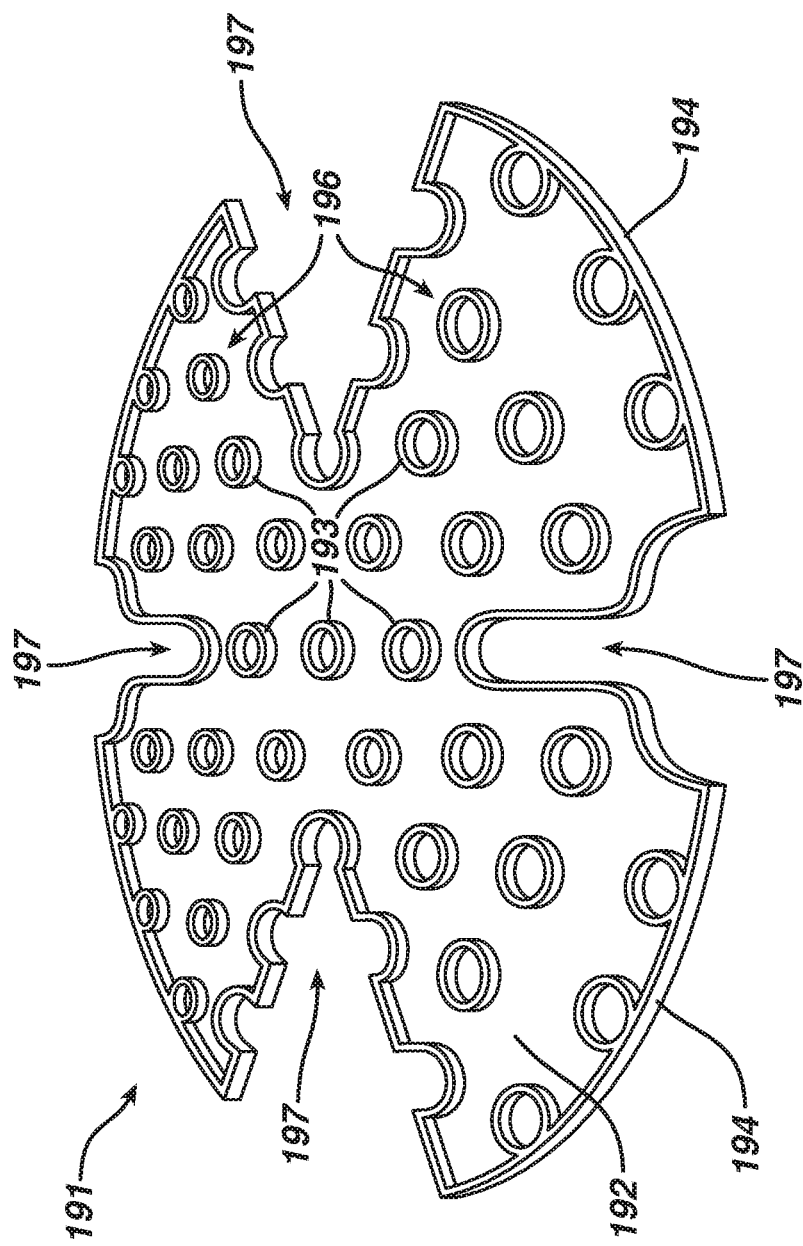
FIG. 34 is a perspective view of a portion of an impact-dissipating liner produced from the mold and curable fluid shown in FIG. 32 according to an aspect of the invention.
Figure 35:
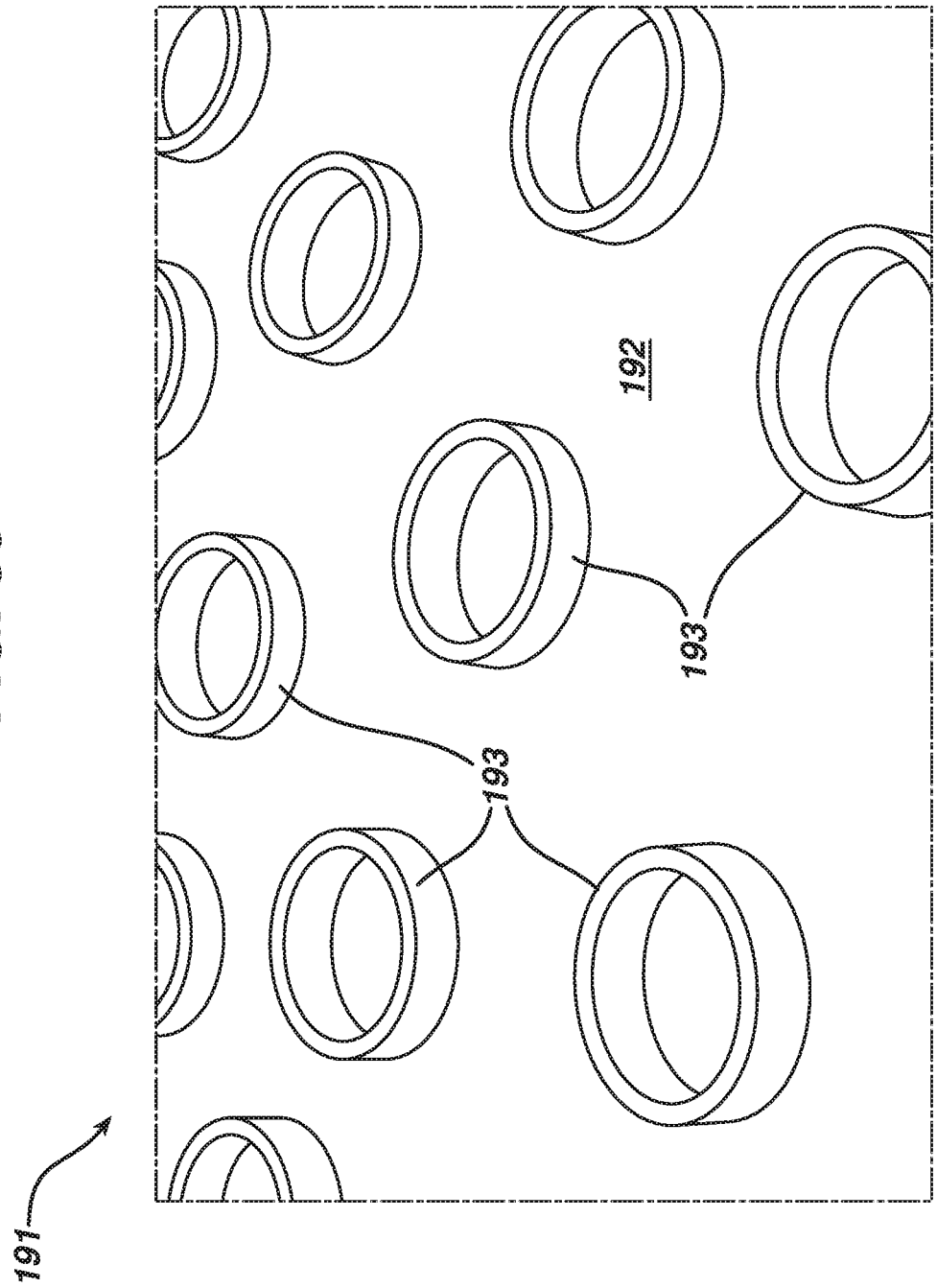
FIG. 35 is a detailed perspective view of a portion of the impact-dissipating liner shown in FIG. 34.
Figure 36:
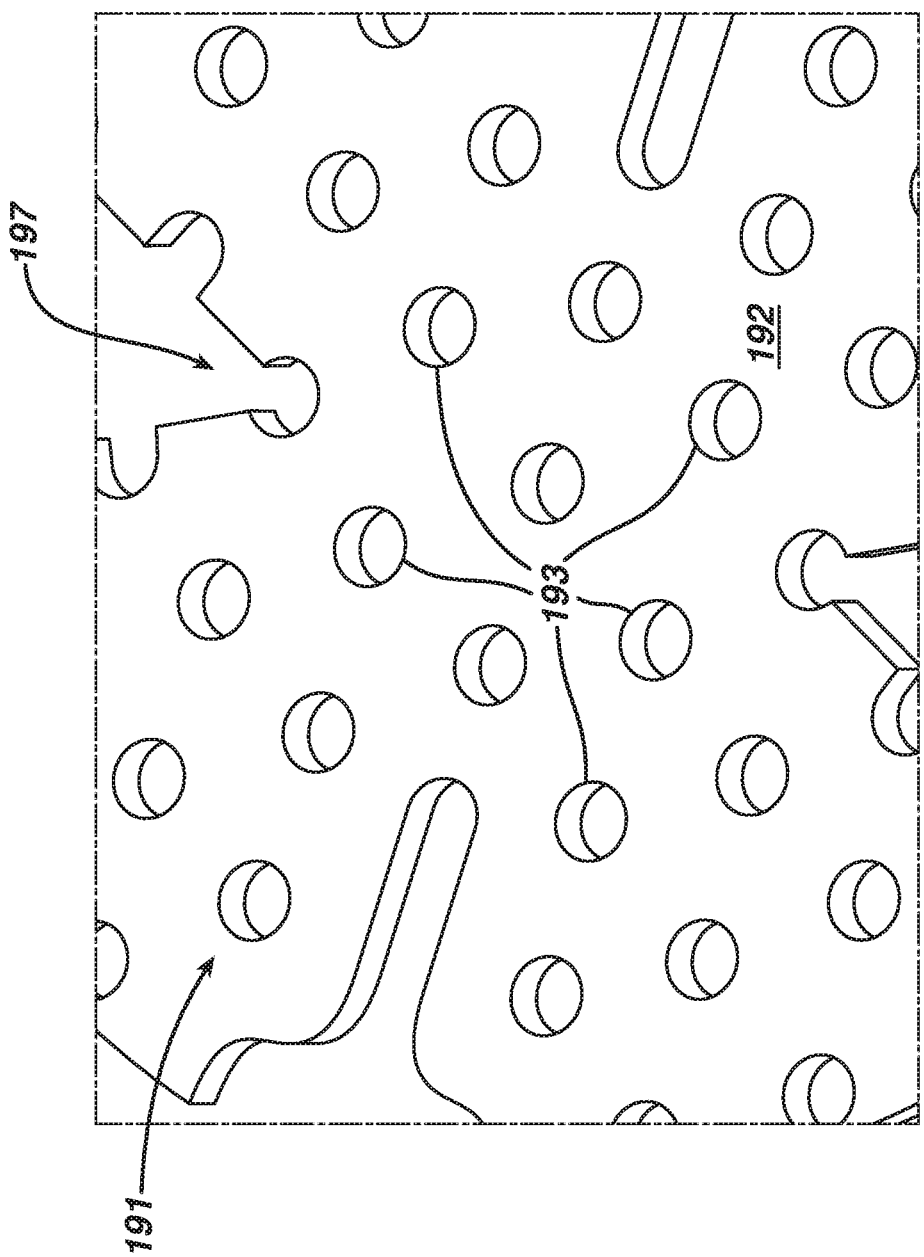
FIG. 36 is a detailed perspective view of the bottom of the portion of the impact-dissipating liner shown in FIG. 34.

FIG. 34 is a perspective view of a portion 191 of an impact-dissipating liner produced by mold 150 and curable fluid 190 shown in FIGS. 32 and 33 according to an aspect of the invention. FIG. 35 is a detailed perspective view of a portion 191 of the impact-dissipating liner shown in FIG. 34, and FIG. 36 is a detailed perspective view of the bottom or underside of the portion 191 of the impact-dissipating liner shown in FIG. 34.

In a fashion similar to portion 122 shown in FIG. 26, portion 191 of the impact dissipating liner may include a flexible sheet 192 and a plurality of projections 193, in this aspect, circular cylindrical projections, from sheet 192. In this aspect, due to the elevation of surfaces 176 in mold 150, projections 193 in portion 191 may not contain cured fluid. In other words, the inside of projections 193 may be hollow or devoid of the presence of cured fluid. According to this aspect, the absence of cured fluid within projections 193 obviates the need, if desired, to remove any undesirable cured fluid within projections 193.

In the aspect shown in FIG. 34, liner portion 191 may include a substantially continuous peripheral wall 194 formed from slot 168 in mold 150. Also, liner portion 191 may include a plurality of lobes 196 corresponding to lobes 162 in mold 150, and a plurality of corresponding voids 197 corresponding to voids 166 in mold 150.

In the aspect of the invention shown in FIG. 34, sheet 192 of liner portion 191 may not extend beyond the peripheral wall 194, for example, due to the shape of mold 150, where no excess cured fluid need be trimmed.

FIG. 37 is a top plan view of an impact-dissipating liner 200 according to an aspect of the present invention after the portion 191 of the liner shown in FIG. 34 is combined with a portion 202 and filled with a fluid 204 according to aspects of the invention. In a manner similar to the liner 140 shown and described with respect to FIGS. 27 and 28, impact-dissipating liner 200 may be fabricated in a fashion similar to the method shown and described with respect to FIGS. 7 through 18. For example, liner 200 may be provided by first providing a portion 202 of liner 200 as an uncured fluid, for example, as an uncured fluid in a mold similar to mold 42 shown in FIG. 10, but with a shape reflective of or complementary to the shape of liner portion 191 shown in FIG. 34. Liner portion 191 may then be inverted and embedded in an uncured fluid of portion 202 wherein the distal ends of projections 193 engage the uncured fluid of portion 202 (see FIG. 37), and the uncured fluid is allowed to cure to provide a liner having a liner portion 191 and a planar liner portion 202, for example, as shown in FIGS. 13 through 17, and an internal cavity, chamber, or void. Fluid 204 may then be introduced to the cavity, chamber, or void within mated portions 191 and 204, for example, by injection, to provide the impact-dissipating fluid filled liner 200 shown in FIG. 37.

Figure 38A:
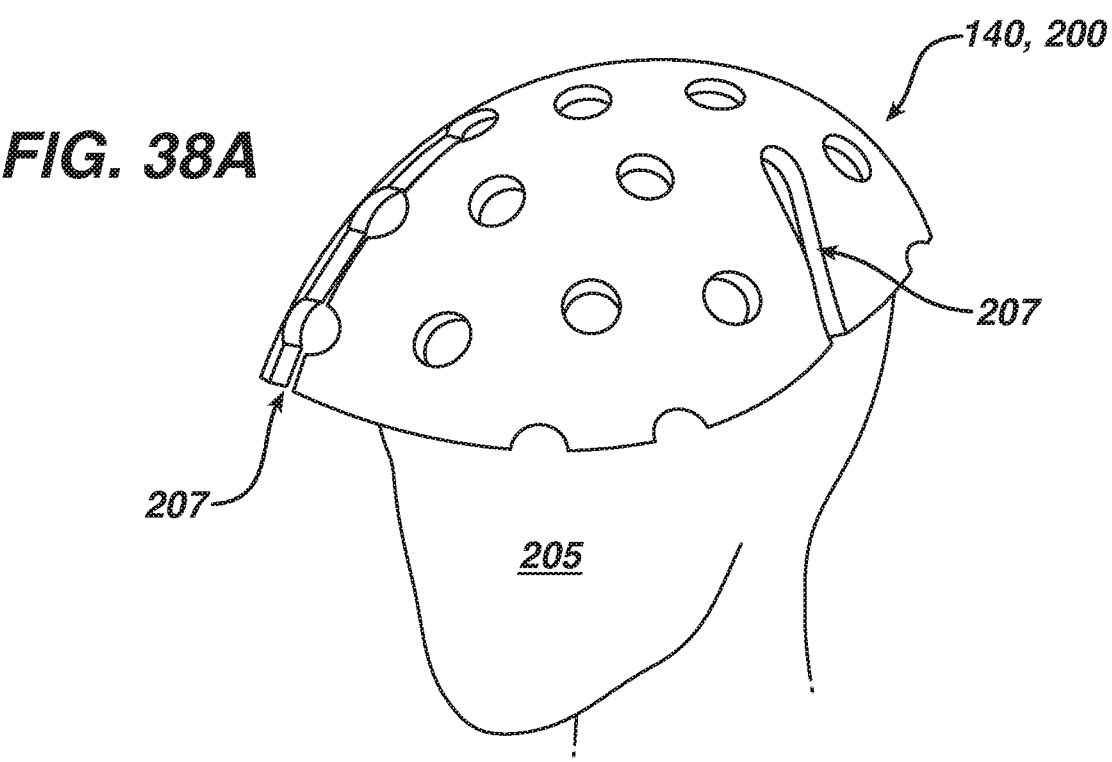
FIGS. 38A and 38B are perspective views of the impact dissipating liners shown in FIG. 27 or in FIG. 37 mounted on a head form in preparation for assembly into a helmet according to an aspect of the invention.
Figure 38B:
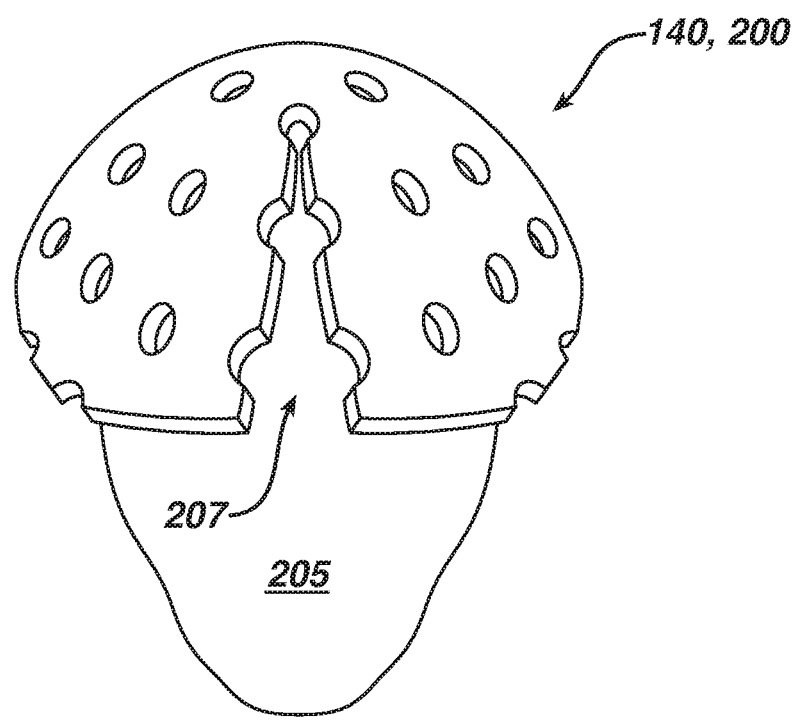

FIGS. 38A and 38B are perspective views of impact dissipating liner 140 or 200 shown in FIG. 27 or in FIG. 37, respectively, mounted on a head form 205 in preparation for assembly into a helmet according to an aspect of the invention. FIG. 38A is a side perspective view and FIG. 38B is a front elevation view of liner 140 or 200 mounted on head form 205. According to aspects of the invention, as shown in FIGS. 38A and 38B, the shapes of liners 140 or 200, for example, with radially-directed cavities or gaps 207, are adapted to conform to a generally hemispherical shape where they can be received be the generally hemispherical shape of a helmet or other structure.

Figure 39:
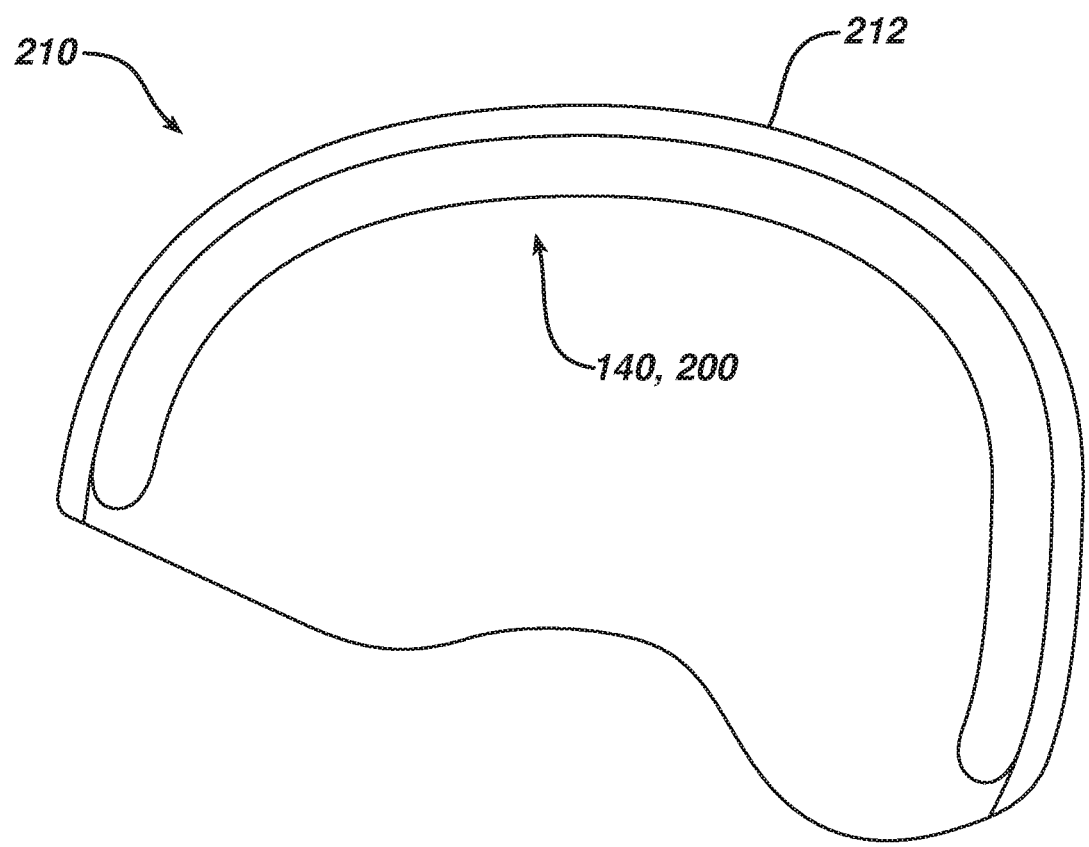
FIG. 39 is a cross-sectional view of a helmet having the impact-dissipating liner shown in FIGS. 27 or FIG. 37 according to an aspect of the invention.

FIG. 39 is a cross-sectional view of a helmet 210 having either impact-dissipating liner 140 or 200 shown in FIGS. 27 or FIG. 37, respectively, according to an aspect of the invention. As shown in FIG. 39, after folding liner 140 or 200, for example, as shown in FIG. 38, the folded liner 140 or 200 may be inserted into a helmet shell 212. The insertion or liner 140 or 200 into shell 212 may be practiced by conventional means, for example, with an adhesive, with mechanical fasteners, and/or with appropriate webbing or constraints.

Figure 40:
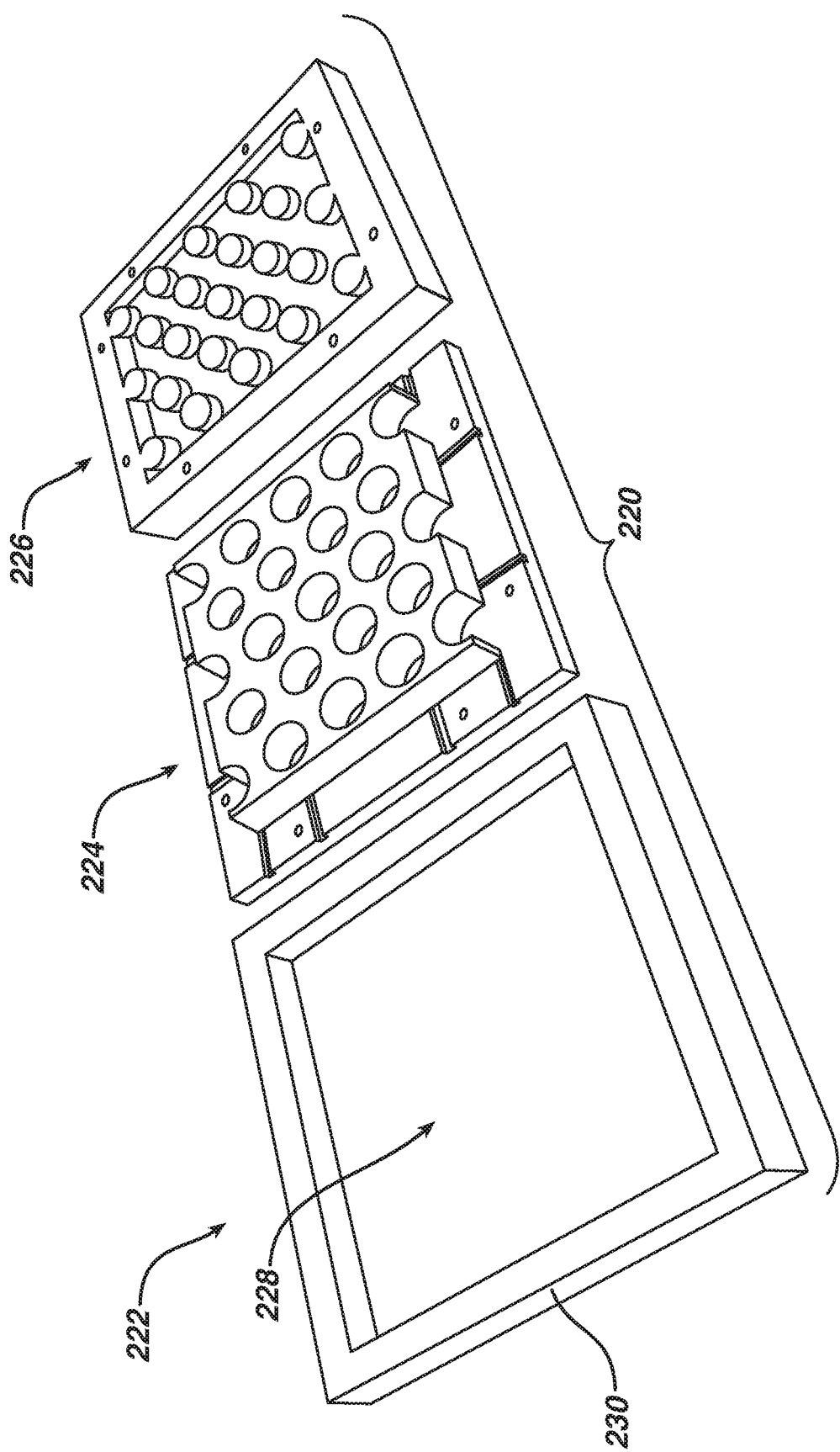
FIG. 40 is a perspective view of a set of molds that may be used to fabricate an impact-dissipating liner according to another aspect of the invention.

FIG. 40 is a perspective view of a set of molds 220 that may be used to fabricate an impact-dissipating liner according to another aspect of the invention. As shown in FIG. 40, the set 220 may typically include a base mold 222, a female-type mold 224, and a male-type mold 226. Base mold 222 may typically comprise an open recess 228 in a board, panel, or plate 230. According to aspects of the invention, recess 228 in panel 230 may typically be sized to mate with female-type mold 224 and male-type mold 226. For example, recess 228 may have a length and width ranging from about 6 inches to about 24 inches, for example, from about 10 inches to 12 inches, and a depth ranging from about 0.25 inches to about 6 inches, for example, about 1 inch to about 3 inches.

Figure 41:
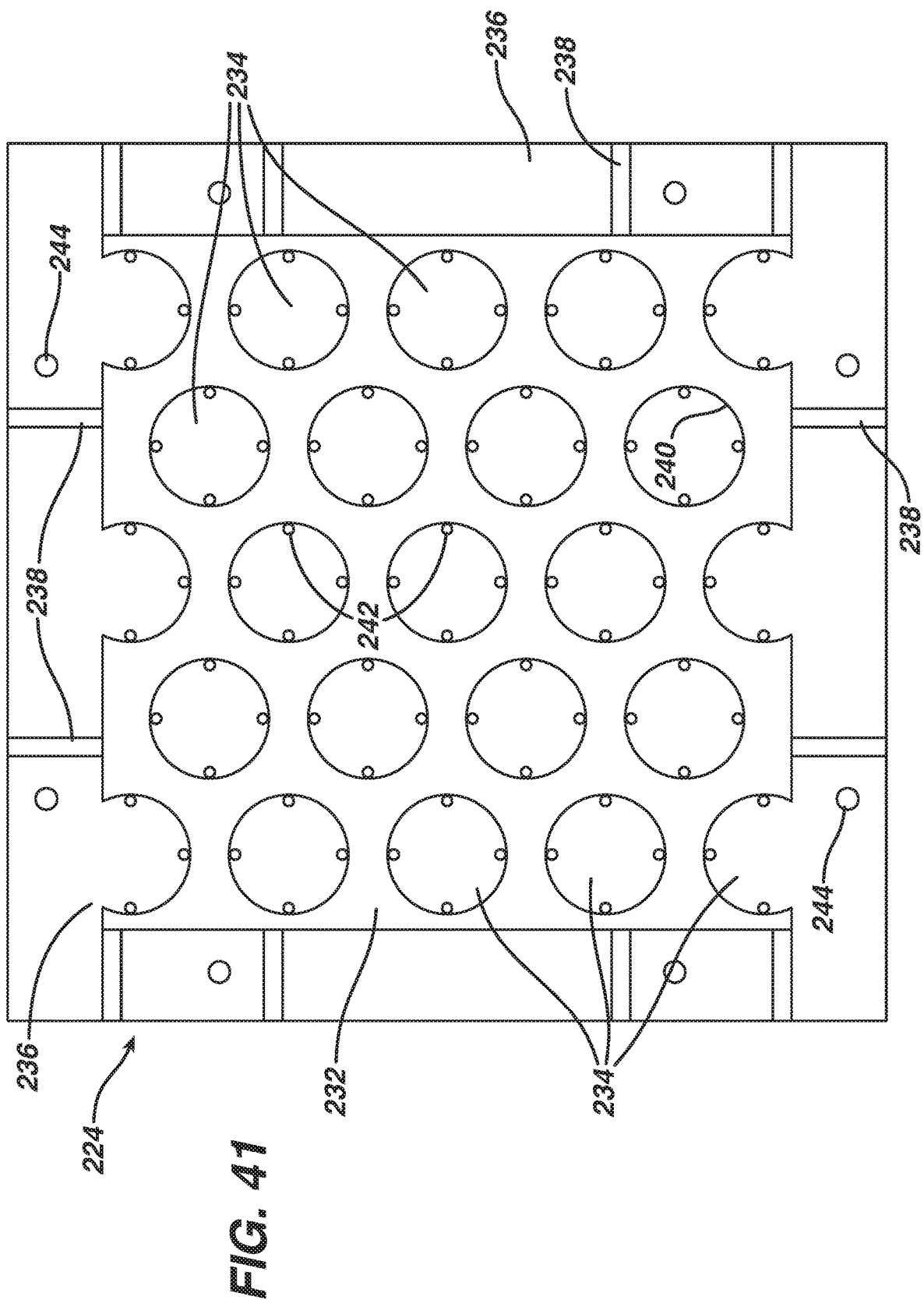
FIG. 41 is a top plan view of the male-type mold shown in FIG. 40.

FIG. 41 is a top plan view of the female-type mold 224 shown in FIG. 40. As shown in FIG. 41, female-type mold 224 may typically include a block, panel, board, or plate 232 having a plurality of recesses 234. Panel 232 may include a flange portion 236, for example, a flange portion shaped to mate with male-type mold 226. As shown in FIG. 41, recesses 234 may be circular cylindrical in shape; however, according to aspects of the invention, recesses 234 may comprise any conventional cylindrical shape, as disclosed herein, for example, square cylindrical, rectangular cylindrical, or elliptical cylindrical. As shown in FIG. 41, recesses 234 may also comprise partial cylindrical shapes, for example, to mate with similarly shaped adjacent liners (not shown).

As also shown in FIG. 41, female-type mold 224 may include a plurality of passages or recesses 238 that, in one aspect, may be adapted to function as conduits for curable fluid and, in another aspect, may be adapted to function as conduits for displaced air. According to aspects of the invention, passages 238 may communicate with one or more recesses, for example, via holes or orifices 240 in the bottoms of recesses 234. Female-type mold 224 may also include passages or holes 242 which extend through the bottom of panel and communicate with recesses 234 to provide a similar venting function as passages 238. Passages 242 may comprise conduits for introducing curable fluid or may comprise vents for discharging displaced air during processing. Passages 242 may extend in a direction substantially perpendicular to passages 238.

As also shown in FIG. 41, flange 236 may include a plurality of holes, for example, through holes, 244. Holes 244 may be provided to facilitate engagement of female-type mold 224 with male-type mold 226, for example, by functioning as pilot or guide holes for rods during assembly.

Figure 42:
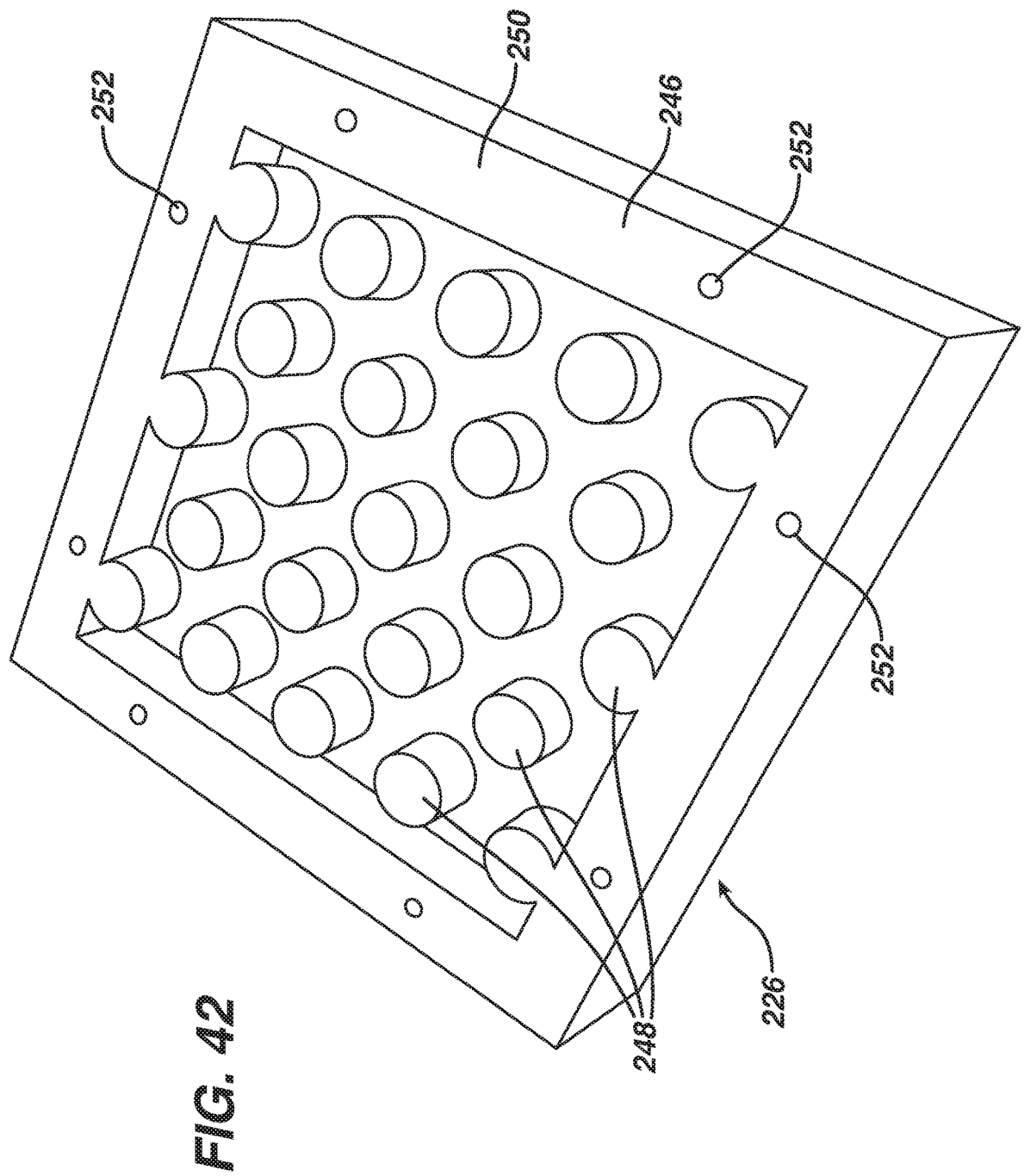
FIG. 42 is a perspective view of the female-type mold shown in FIG. 40.

FIG. 42 is a perspective view of the male-type mold 226 shown in FIG. 40. As shown in FIG. 42, male-type mold 226 may typically include a block, panel, board, or plate 246 having a plurality of projections 248. Panel 246 may include a surface portion 250, for example, shaped to mate with female-type mold 224. As shown in FIG. 42, projections 248 may be circular cylindrical in shape, for example, shaped to engage recesses 234 of female-type mold 224. However, according to aspects of the invention, projections 248 may comprise any conventional cylindrical shape, as disclosed herein, for example, square cylindrical, rectangular cylindrical, or elliptical cylindrical. As shown in FIG. 42, projections 248 may also comprise partial cylindrical shapes, for example, to mate with similarly shaped adjacent liners (not shown).

As also shown in FIG. 42, panel 246 may include a plurality of holes, for example, through holes, 252. Holes 252 may be provided to facilitate engagement of male-type mold 226 with female-type mold 224, for example, by functioning as pilot or guide holes for rods during assembly.

Molds 222, 224 and 225 may be made from any conventional material, including wood, any one of the plastics disclosed herein, or any one of the metals disclosed herein.

Figure 43:
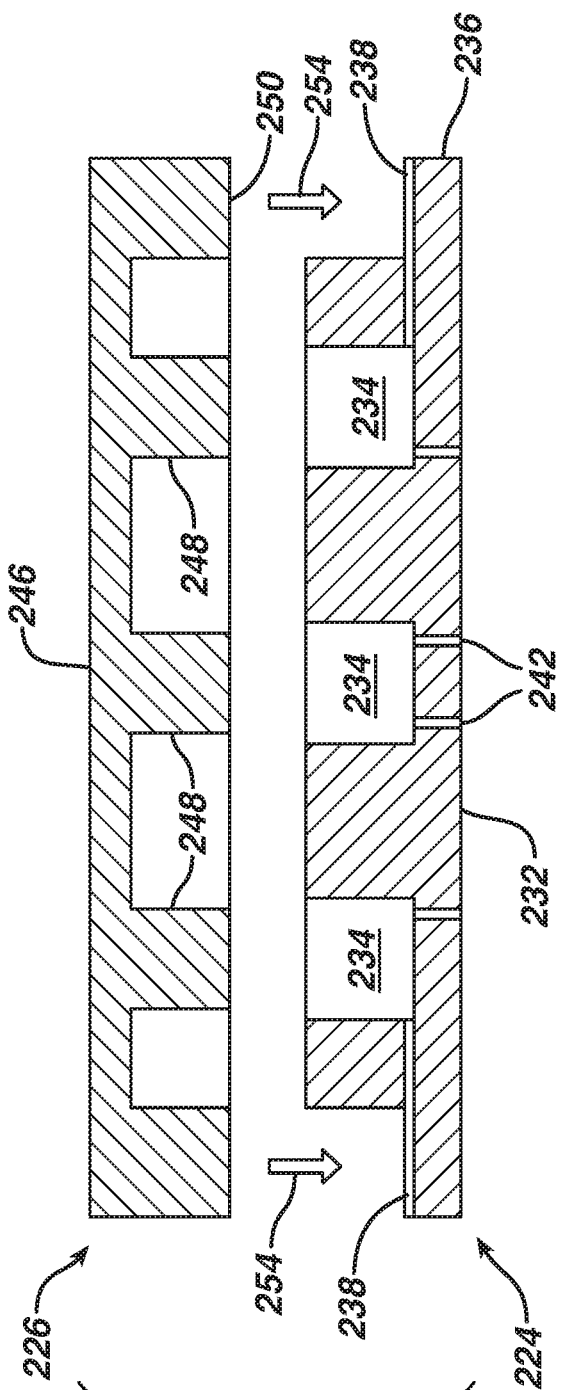
FIG. 43 is a cross section view of the male-type mold and the female-type mold shown in FIGS. 41 and 42, respectively, prior to engagement, according to aspects of the invention.

FIG. 43 is a cross section view of portions of female-type mold 224 and male-type mold 226 shown in FIGS. 42 and 43, respectively, prior to engagement according to aspects of the invention. As shown in FIG. 43, according to one aspect of the invention, male-type mold 226 may be positioned over female-type mold where projections 248 in male-type mold 226 may typically be aligned with and centered upon recesses 234 of female mold 224. This alignment of projections 248 with recesses 234 may be facilitated by the use of pilot or guide rods (not shown) in holes 252 of male-type mold 226 and holes 244 in female-type mold 224.

In one aspect of the invention, which may be referred to as "compression molding," prior to engagement of male-type mold 226 with female-type mold 224, for example, as indicated by arrows 254 in FIG. 43, an uncured or hardenable fluid (not shown), such as, a fluid silicone, may be introduced to female-type mold 224. For example, the uncured fluid may be introduced to female-type mold 224 to at least partially fill recesses 234.

Figure 44:
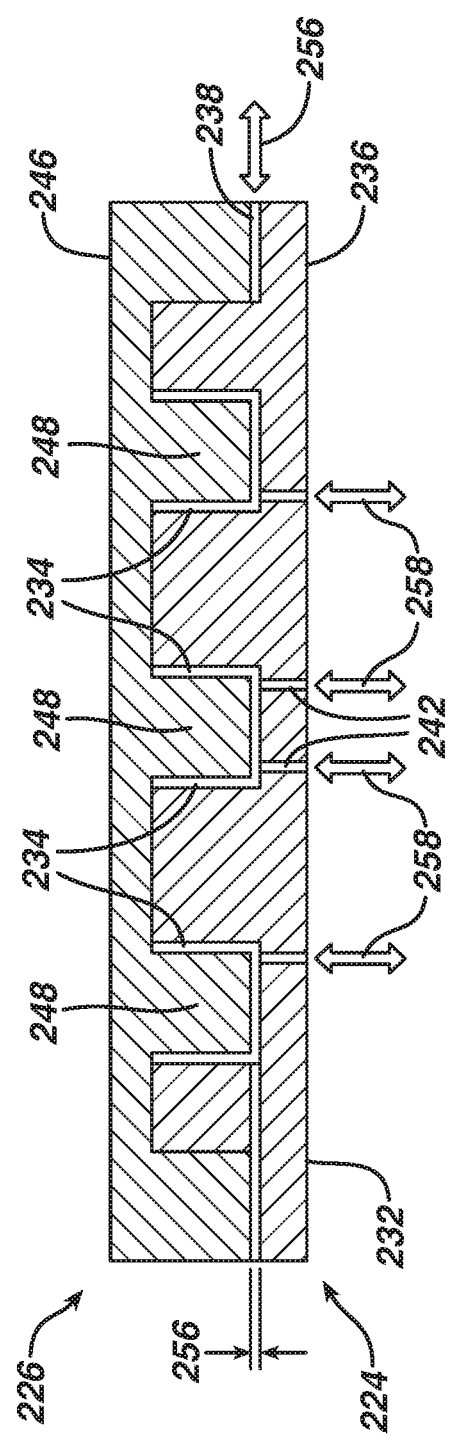
FIG. 44 is a cross section view of the male-type mold and the female-type mold shown in FIG. 43, after to engagement, according to aspects of the invention.

According to this aspect, with female-type mold 224 at least partially filled with uncured fluid, male-type mold 226 is engaged with, for example, compressed into, female-type mold where projections 248 engage and compress the uncured fluid in recesses 234. FIG. 44 is a cross section view, similar to FIG. 43, of the male-type mold 226 and the female-type mold 224 shown in FIGS. 41, 42, and 43, after engagement according to aspects of the invention. During engagement and/or compression, due to the shapes and dimensions of projections 248 and recesses 234, the projections 248 and recesses 234 distribute the uncured fluid about male-type mold 226 and female-type mold 224. According to aspects of the invention, due to the differences in the outer dimensions (for example, outside diameters) of projections 248 and the inner dimensions (for example, the inside diameters) of recesses 234, during engagement, the uncured fluid fills the voids (for example, the annular voids) between projections 248 and recesses 234. In addition, a gap 256 may typically be provided between the base of each recess 234 and the extremity (for example, bottom) of projection 248. In one aspect, this gap 256 may also be at least partially filled, but, typically, completely filled, with uncured fluid during engagement of male-type mold 226 with female-type mold 224. In this aspect of the invention, during or after engagement, excess uncured fluid may be displaced from molds 224 and 226 via passages 238 as indicated by double arrow 256, and/or through holes 242, as indicated by double arrows 258. Upon curing of the uncured fluid, a portion of an impact-dissipating liner according to aspects of the invention can be formed.

Figure 45:
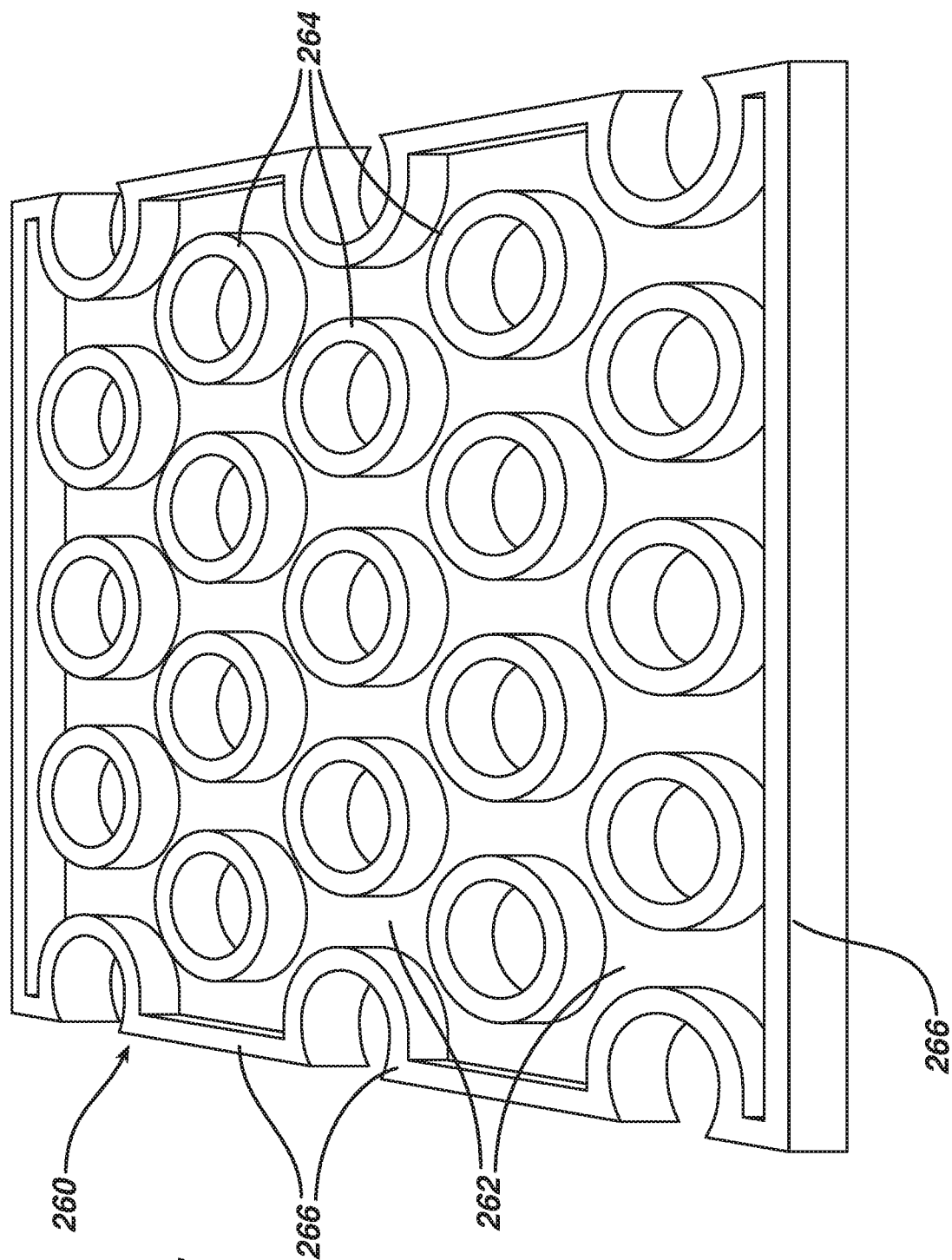
FIG. 45 is a perspective view of a portion of an impact-dissipating liner fabricated from the molds shown in FIGS. 41 through 44.

FIG. 45 is a perspective view of a portion 260 of an impact-dissipating liner fabricated from the molds 224 and 226 shown in FIGS. 41 through 44 by "compression molding," according to as aspect of the invention.

According to another aspect of the invention, aspects of the invention may be fabricated in a process that may be referred to as "injection molding," for example, to distinguish from the "compression molding" process described above. In this molding process, little or no uncured fluid, for example, fluid silicone, may be introduced to female-type mold 224 prior to engagement with male-type mold 226. In this aspect, as shown in FIG. 44, male-type mold 226 is first engaged with female type mold 224 where projections 248 align and engage with recesses 234. After engagement, uncured fluid may then be introduced to the engaged molds 224 and 226 to at least partially, but, typically, substantially completely, fill the voids between projections 248 and recesses 234, and at least partially fill the void defined by gap 256 shown in FIG. 44. The uncured fluid may be introduced to one or more passages or holds, for example, introduced through one or more passages 238 as indicated by double arrow 256, and/or through one or more holes 242, as indicated by double arrows 258. The uncured fluid (not shown) may be introduced to engaged molds 224 and 226 under pressure, for example, the uncured fluid may be "injected" into the engaged molds 224 and 226, for example, under conventional injection molding pressures, flows, and temperatures.

Figure 46:
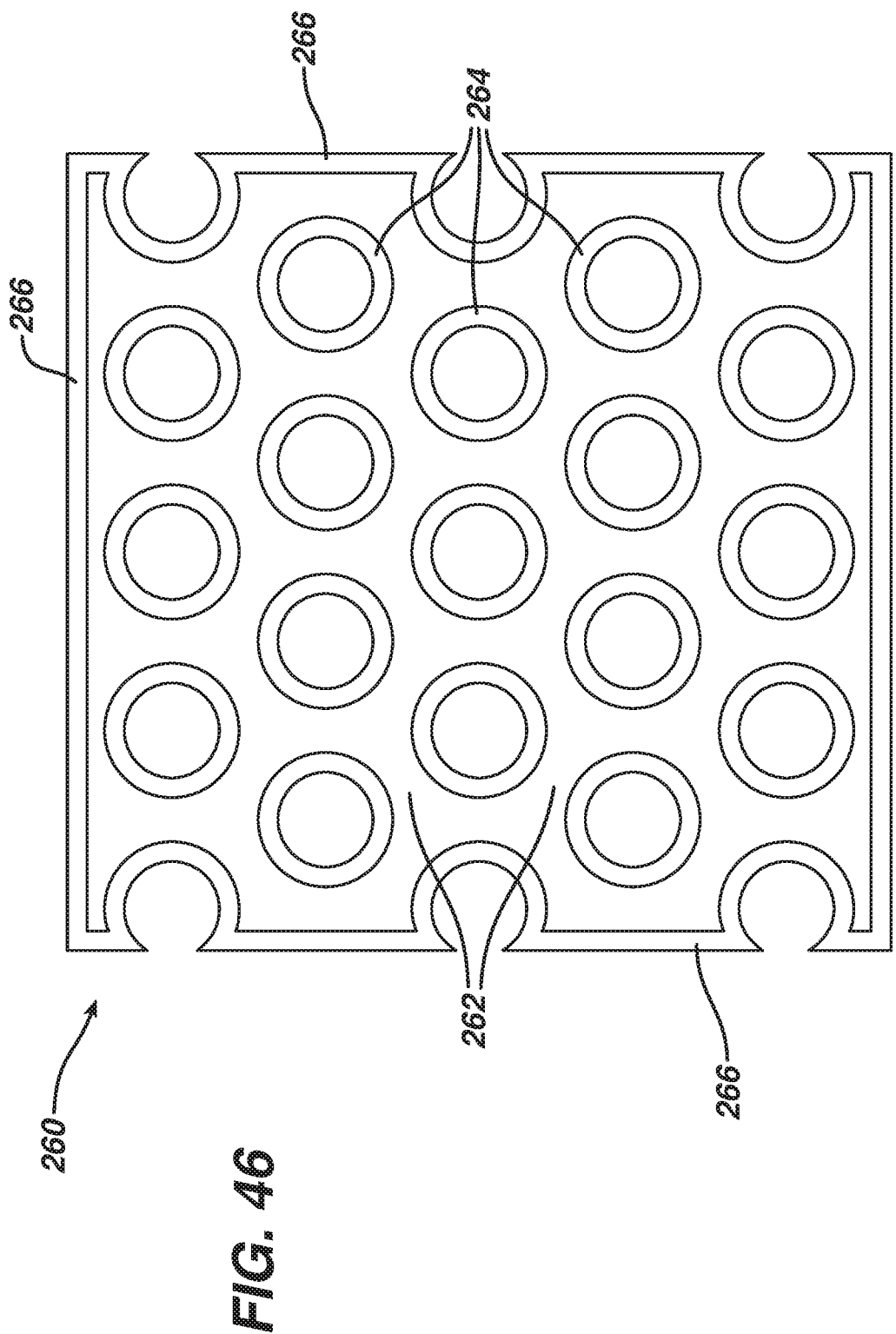
FIG. 46 is a top plan view of the liner shown in FIG. 45.

FIG. 45 is a perspective view of a portion 260 of an impact-dissipating liner fabricated from the molds 224 and 226 shown in FIGS. 41 through 44 that may be formed by "injection molding," according to as aspect of the invention. FIG. 46 is a top plan view of the liner shown in FIG. 45. As shown in FIGS. 45 and 46, in a fashion consistent with the aspect of the invention disclosed herein, liner portion 260 of an impact dissipating liner (not shown) includes a flexible sheet 262 and a plurality of projections 264, in this aspect, circular cylindrical projections, from sheet 262. In this aspect, the insides of projections 264 in portion 260 do not contain, for example, due to the shape of molds 224 and 226. In other words, the inside of projections 264 may be hollow or devoid of the presence of cured fluid. According to this aspect, the absence of cured fluid within projections 264 obviates the need to remove any undesirable cured fluid within projections 264. In another aspect, the insides of projections 264 may contain a cured fluid, for example, covering the tops of projections 264.

In the aspect shown in FIGS. 45 and 46, liner portion 260 includes a substantially continuous peripheral wall 266 formed from a slot in molds 224 and 226. In one aspect of the invention, sheet 262 of liner portion 260 may not extend beyond the peripheral wall 266, for example, due to the shape of molds 224 and 226, where no excess cured fluid need be trimmed.

Figure 47:
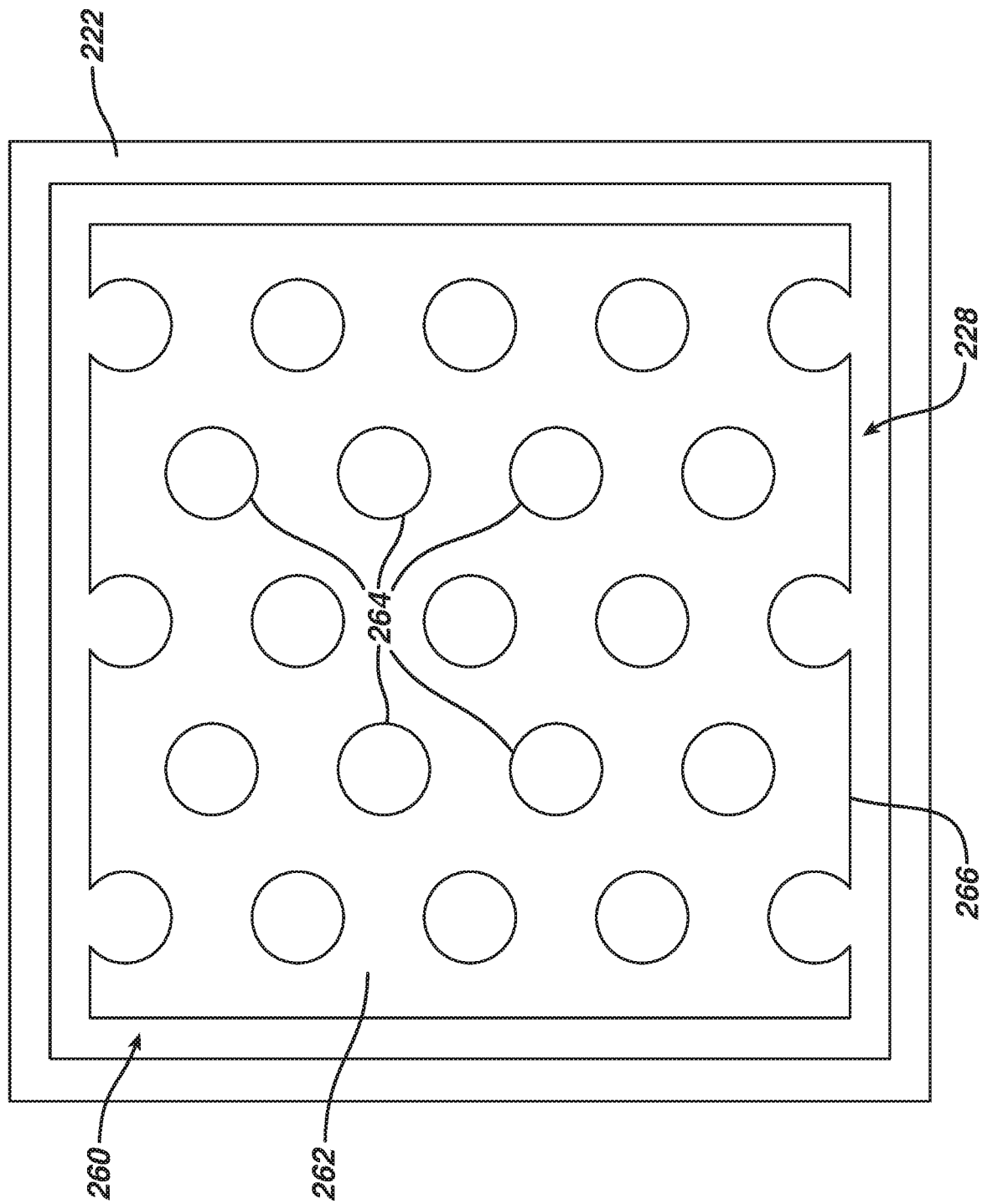
FIG. 47 is a top plan view of the portion of the impact-dissipating liner shown in FIGS. 45 and 46 after placement in the base mold shown in FIG. 40.

FIG. 47 is a top plan view of the portion 260 of the impact-dissipating liner shown in FIGS. 45 and 46 after placement in base mold 222 shown in FIG. 40. According to this aspect of the invention, liner portion 260 is positioned in base mold 222 where the distal ends of projections 264 contact the bottom or lower surface of the recess 228 of base mold 222. In this aspect of the invention, before or after positing portion 260 into base mold 222, a curable fluid (not shown) may then be introduced to the recess 228 of mold 222 and allowed to cure, and, in curing, adhere to portion 260 to provide the an unfilled, impact-dissipating liner as disclosed herein.

Figure 48:
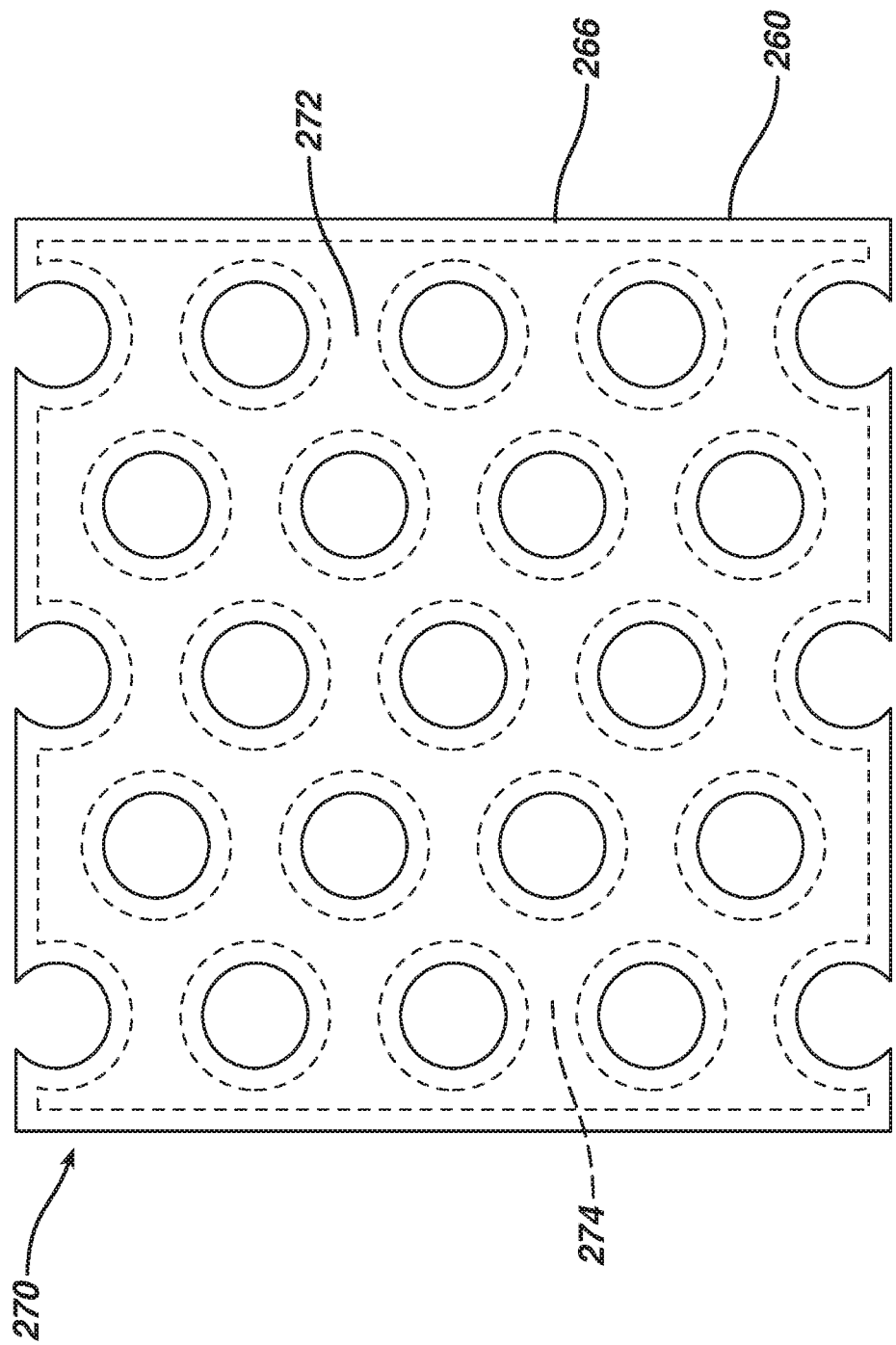
FIG. 48 is a top plan view of an impact-dissipating liner fabricated from the portion shown in FIGS. 45 and 46 after assembly with a portion fabricated from in the base mold shown in FIG. 47 and after injection with a fluid.

FIG. 48 is a top plan view of an impact-dissipating liner 270 fabricated from the portion 260 shown in FIGS. 45 and 46 after assembly with a layer 272 formed from an uncured fluid introduced to base mold 222 shown in FIG. 47. Liner 270 includes an internal fluid 274, for example, ethylene glycol, which may have been introduced via injection as disclosed herein. According to one aspect, the formation of impact-dissipating liner 270 may be similar to the formation of liner 70 as down and described with respect to FIGS. 10 through 19. One distinction between the formation of liner 270 and liner 70 is the integral formation of sidewalls 266 in liner 270, where liner 70 may be formed without sidewalls.

Figure 49:
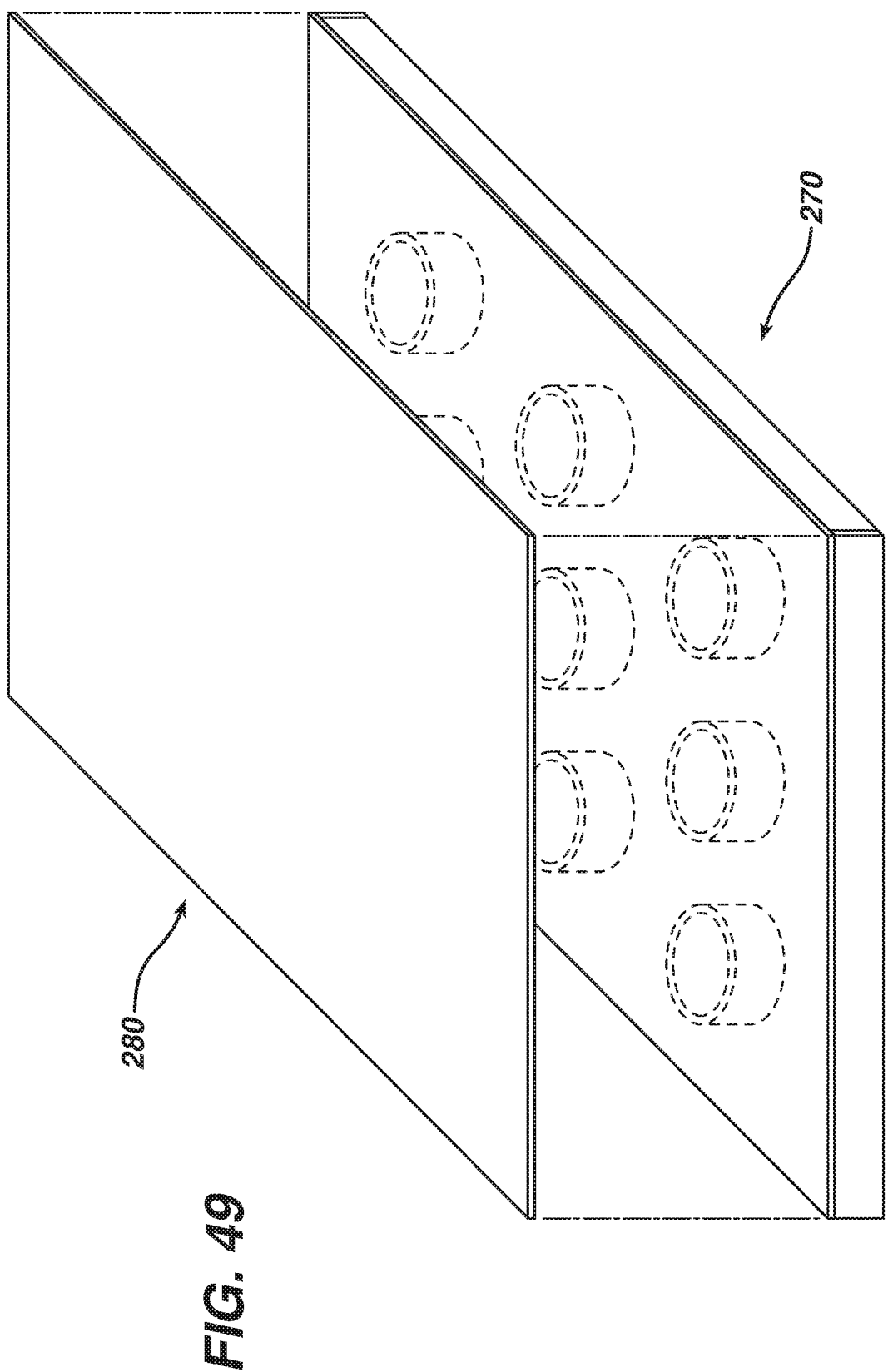
FIG. 49 is an exploded perspective view of the impact-dissipating liner shown in FIG. 48 prior to assembly with a protective panel according to one aspect of the invention.

FIG. 49 is an exploded schematic perspective view of the impact dissipating liner 270 shown in FIG. 48 prior to assembly with a protective panel 280 according to one aspect of the invention. As described herein, panel 280 may comprise a metal or plastic, and be mounted to impact-dissipating liner 270 by conventional means, for example, with an adhesive or with mechanical fasteners.

FIG. 50 is a cross section view of portions of a liner portion 302 and male-type mold 304 prior to engagement according to another aspect of the invention. Liner portion 302 may be similar in design and construction to liner portion 260 shown in FIGS. 45 and 46. Male-type mold 304 may be similar in design and construction to male-type mold 224 shown in FIGS. 40 through 44. Liner portion 302 may typically include a sheet 306 and projections 308, for example, hollow, cylindrical projections, as disclosed herein, having internal surfaces 310, for example, a circular cylindrical surface having an inside diameter. Male-type mold 304 may typically have projections 312, for example, solid, cylindrical projections, having an external surface 314, for example, a circular cylindrical surface having an outside diameter.

In this aspect, after fabrication of liner portion 302, for example, in molds 224 and 226 shown in FIGS. 40-44, liner portion 302 is positioned adjacent male-type mold 304 (for example, over male-type mold 304 as shown in FIG. 50) with the internal surfaces 310 of projections 308 of liner portion 302 substantially aligned with the external surfaces 314 of projections 312 of male-type mold 304. Then, prior to or during engagement of liner portion 302 with mold 34, for example, as indicated by arrow 316, an uncured fluid 320 for example, a liquid silicone, is introduced to mold 304 to provide a level of uncured fluid in mold 304 and about projections 312. As shown in FIG. 51, with the engagement of liner portion 302 with mold 304, the internal surfaces 310 of projections 308 and the external surfaces 314 of projections 312 engage, contact, or bear against each other, and, according to this aspect of the invention, pilot or guide the engagement of projections 310 with projections 312. In one aspect, the engagement of internal surfaces 310 with external surfaces 314 enhances or ensures the proper alignment of projections 310 with projections 312.

According to this aspect of the invention, with the engagement of projections 308 with projections 310 progresses, the distal ends of cylindrical projections 308 at least contact, but typically become immersed in, uncured fluid 320 in mold 304. According to this aspect of the invention, with the curing of uncured fluid 320 and the engagement or adherence of cured fluid 320 with the distal ends of projections 308, an unfilled impact-dissipating liner may be formed. This liner may then be filled with a fluid to provide another impact-dissipating liner according to aspects of the invention.

Figure 53:
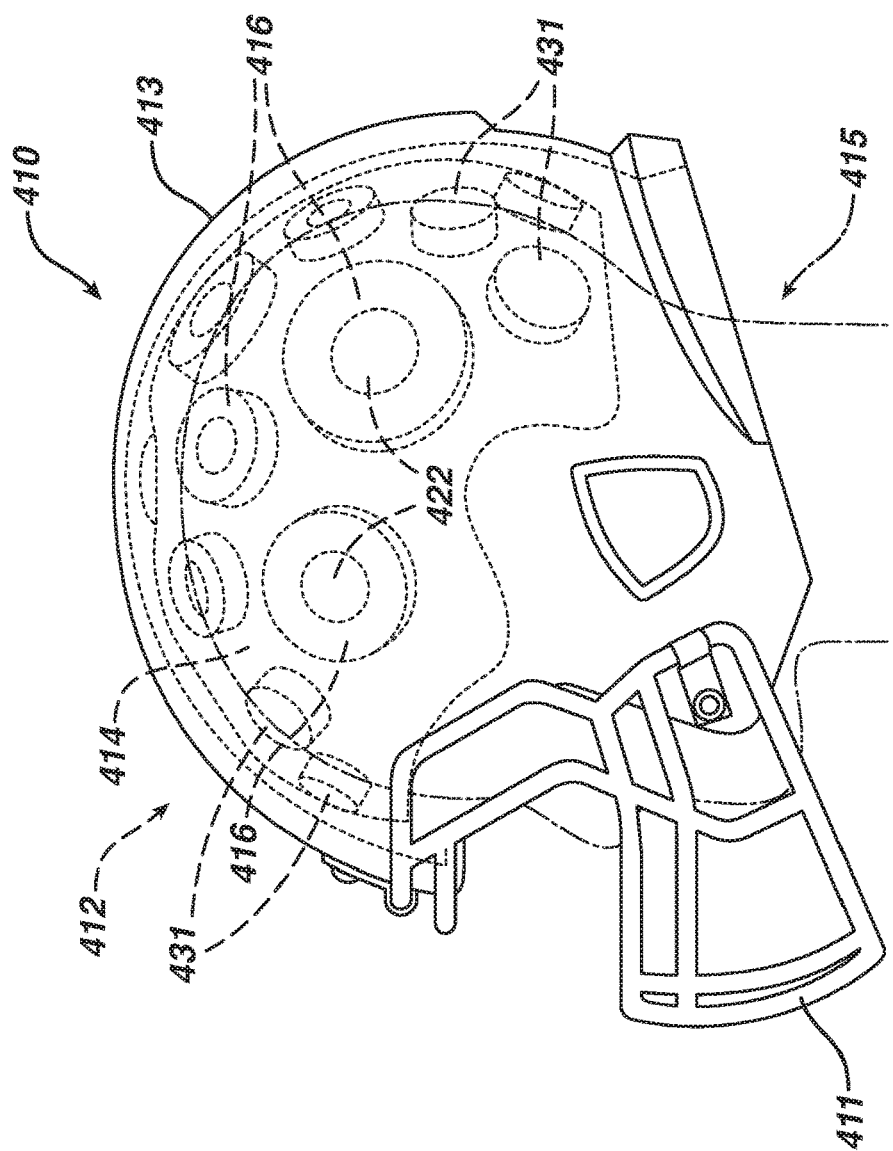
FIG. 53 is a side elevation view of the helmet shown in FIG. 52, showing features of one aspect of the invention in phantom.
Figure 52:
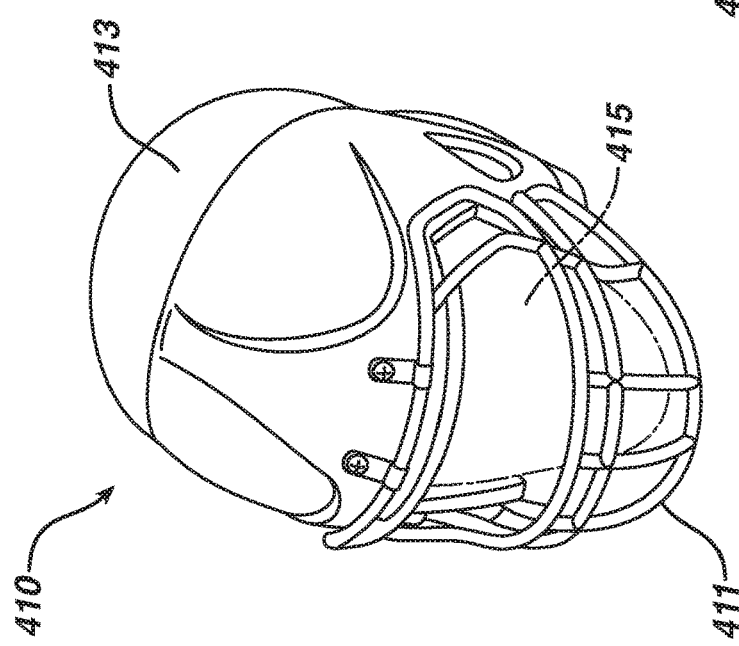
FIG. 52 is a perspective view of a helmet employing one aspect of the present invention.
Figure 55:
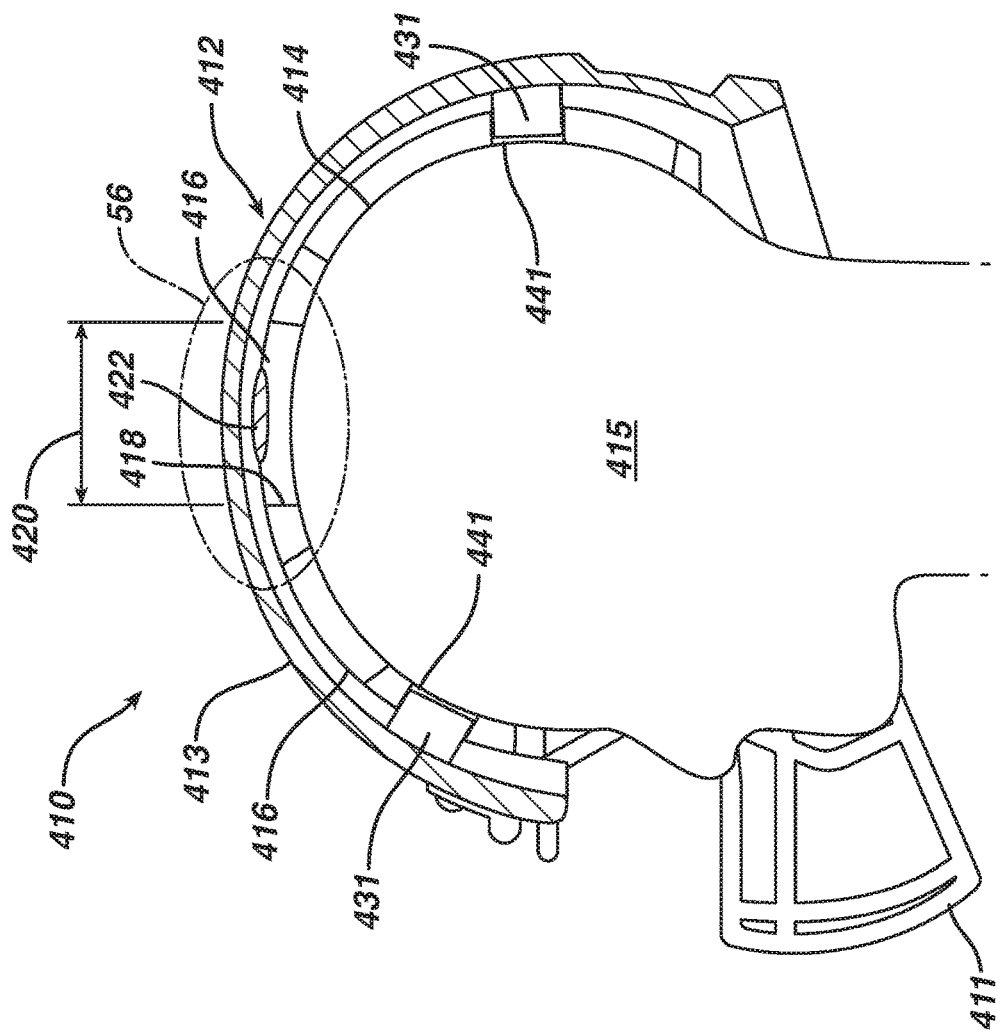
FIG. 55 is a cross-sectional view of the helmet shown in FIG. 54 as viewed along section lines 55-55 in FIG. 54.
Figure 54:
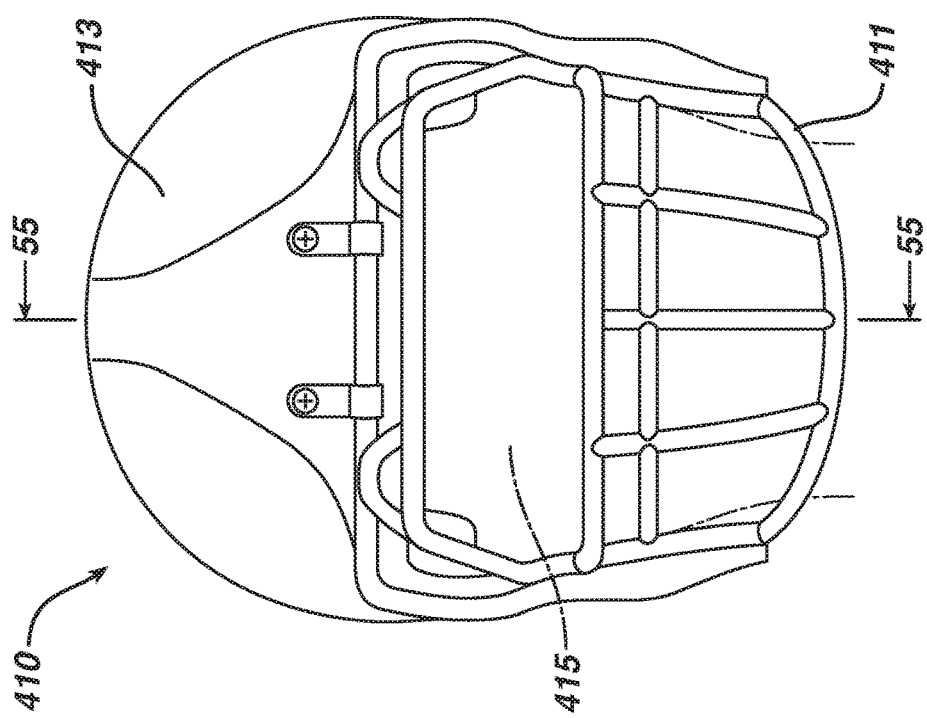
FIG. 54 is a front elevation view of the helmet shown in FIG. 52.

FIG. 52 is a perspective view of a helmet 410 employing another embodiment of the present invention. FIG. 53 is a side elevation view of the helmet 410 shown in FIG. 52, showing features of one aspect of the invention in phantom. FIG. 54 is a front elevation view of the helmet 410 shown in FIG. 52. FIG. 55 is a cross-sectional view of the helmet 410 shown in FIG. 54 as viewed along section lines 55-55 in FIG. 54. Though helmet 410 is shown as a typical football helmet in FIGS. 52-55, with a typical football helmet facemask 411, according to aspects of the invention, helmet 410 may comprise any protective headgear that can benefit the user by having aspects of the invention. For example, any of the aspects of the invention disclosed herein may be adapted to, but not limited to, baseball catcher's helmets, baseball batter's helmets, soft ball catcher's helmets, softball batter's helmets, hockey helmets, hockey goalie masks/helmets, motorcycle and motor cross helmets, skiing and snowboarding helmets, skateboarding helmets, lacrosse helmets, bicycle helmets, jockey helmets, medical protection helmets, rock or ice climbing helmets, mountain climbing helmets, football helmets, an official's (for example, an umpire's or a referee's) helmet, a construction helmet and military helmets, among others. It is also envisioned that aspects of the invention disclosed in FIG. 52-55 may be employed in any of the impact-dissipating liners and other aspects disclosed herein.

As shown in FIGS. 52-55 and, in particular, FIG. 55, aspects of the present invention include a protective helmet insert arrangement 412 having a liner 414, for example, a deformable, impact-dissipating liner as disclosed herein, positioned inside the shell 413 of helmet 410 to protect the head 415 of a wearer of helmet 410. Liner 414 typically includes at least one recess 416, though a plurality of recesses 416 may typically be provided. The at least one recess 416 includes an internal surface 418 and the internal surface typically has an internal dimension 420. The one or more recesses 416 may comprise through holes in liner 414; however, in some aspects of the invention, the one or more recesses 416 may not extend completely through liner 414. For example, in one aspect, the one or more recesses 416 may comprise a "blind hole" in liner 414, for instance, where the bottom of recess 16 may comprise a portion of liner 414.

According to aspects of the invention, arrangement 412 of helmet 410 includes at least one body 422 positioned within helmet 410, though in one aspect a plurality of bodies 422 may be provided.

FIG. 56 is a detailed view of the portion of arrangement 412 identified by Detail 56 in FIG. 55 showing, among other things, one body 422 that may be used with one aspect of the invention. The at least one body 422 may typically be mounted beneath shell 413 of helmet 410, for example, mounted within an interface, retainer, or harness 421 mounted in shell 413, and body 422 includes an external surface 424. In one aspect, body 422 may be mounted directly to shell 413, for example, by means of adhesive or mechanical fasteners. External surface 424 may typically be shaped to conform to the shape of the internal surface 418 of the at least one recess 416, though the shape of external surface 424 may vary from the shape of internal surface 418.

According to aspects of the invention, for example, as illustrated in FIG. 56, upon an impact upon helmet 410 having arrangement 412, the deformable liner 414 deforms, thus reducing the internal dimension 420 of the at least one recess 416 wherein at least a portion of the internal surface 418 of the at least one recess 416 may contact at least a portion of the external surface 424 of the at least one body 422. According to aspects of the invention, this contact of the internal surface 418 with body 422 limits the deformation of liner 422, and, it is understood at this time, limits the dissipation of impact energy due to fluid kinetic energy and enhances the dissipation of impact energy by deformation (elastic deformation and/or plastic deformation) of liner 414 and/or of body 422.

In one aspect, internal dimension 420 of recess 416 may comprise a width or diameter ranging from about 0.125 inches to about 12 inches, but is typically between about 0.5 inches to about 1.5 inches. Liner 414 may have thickness ranging from about 0.125 inches to about 6 inches, but is typically between about 0.25 inches to about 3.0 inches.

As also shown in FIGS. 52-55, aspects of the present invention may also include one or more "pins" or bodies 431 mounted to the inside surface of shell 413, for example, with an adhesive and/or a mechanical fastener. According to aspects of the invention, bodies 431 are positioned and adapted to engage recesses or through holes 441 in liner 414 to assist in positioning and/or retaining liner 414 within helmet shell 413.

Liner 414, and any liner disclosed herein, may comprise any flexible liner having recesses 416 sized to accommodate one or more bodies 422, for example, any one or more of the impact-dissipating liners fabricated by the methods disclosed herein. According to aspects of the invention, liner 414 may comprise any deformable material, for example, any elastomeric material, for instance, a natural polymer, such as, polyisoprene rubber, or a synthetic polymer, such as, a neoprene, a thermoplastic elastomer, a thermoplastic rubber, and a polyvinyl chloride, or an ethylene propylene diene monomer (EPDM) rubber, and the like. Liner 414 may also be made of a fabric, a leather, a leather board, an expanded vinyl foam, a flocked vinyl film, a polyurethane, a latex foam on scrim, supported polyurethane foam, laminated polyurethane film or in-mold coatings such as polyurethane, styrene-butadiene-rubber, acrylonitrile-butadiene, acrylonitrile terpolymers and copolymers, vinyls, or other acrylics, among others. In one aspect, liner 414 may be characterized by good flexibility, for example, as indicated by a low modulus of elastic, while being easily moldable.

Liner 414, and any liner disclosed herein, may comprise an elastomeric material having a tendency to compress under load, for example, to provide cushioning when exposed to impact loading, for example, a natural or synthetic rubber, a foam, a thermoplastic elastomer, a polyurethane elastomer, a silicone elastomer, a polyvinyl chloride (PVC) elastomer, an olefinic elastomer, a polyamide elastomer, or a gelatinous elastomers, among others.

In one aspect, liner 414 may encase a fluid 417, for example, in one or more cavities 419 within liner 414.

In one aspect of the invention, liner 414 may comprise a fluid-filled, elastomeric liner, for example, liner 414 may comprise a Liquid-Gel Impact Reaction Liner (L-GIRL) as described in U.S. Pat. No. 8,856,972 (the disclosure of which is included by reference herein). In one aspect, liner 414 may comprise fluid-filled elastomeric material having recesses 416. Liner 414 may be fabricated from a gel-like material, for example, a synthetic impact gel or a soy-based impact gel, among others.

The fluid 417 encased in liner 14, and any fluid located in any liner disclosed herein, may be a liquid or a gas, but is preferably a liquid, for example, a viscous liquid, such as, a gel. In one aspect, fluid 17 may comprise water, that is, substantially water having additives or preservatives. In one aspect, fluid 17 may be an oil, such as, a mineral oil or a vegetable oil. The oil may have a natural source or be synthetic. The fluid 17 may comprise a relatively high-viscosity fluid, for example, a high-viscosity fluid having the capable to enhance the absorption of impact loading, such as, an ethylene glycol and/or a propylene glycol.

The one or more bodies 422 and 431 may assume a broad range of sizes, shapes, and materials, for example, depending upon the size of helmet 410 and the expected loading, for example, impact loading, helmet 410 is likely to experience. FIG. 57 is a side elevation view of body 422 shown in FIG. 56 that may be used for aspects of the invention. FIG. 58 is top plan view of body 422 shown in FIG. 57. Body 422 or 431 may comprise a cylindrical shape according to aspects of the invention, for example, a right cylindrical shape. The right cylindrical shape may be circular or non-circular, for example, polygonal or oval. In one aspect, as shown in FIG. 56 through 58, body 422 or 431 may be semicircular or curvilinear "dome" shaped, for example, having a circular cylindrical base 423 portion, which defines surface 424, and a radiused or curvilinear dome portion 425 above base portion 423. In other aspects, no dome portion may be provided, for example, the upper surface of body 422 or 431 may be planar. In other aspects of the invention, body 422 or 431 may be oval or polygonal in shape (as shown, for example, in FIGS. 61 through 66).

The one or more bodies 422 and 431 provided by aspects of the invention may made from any suitable material, for example, a metal, a plastic, an elastomer, or even wood. In one aspect, body 422 may be fabricated from a plastic, for example, a polyamide (PA), for example, nylon; a polyethylene (PE), both high-density polyethylene (HDPE) and low-density polyethylene (LDPE); a polyethylene terephthalate (PET); a polypropylene (PP), such as, expended polypropylene (EPP); a polyester (PE); a polytetrafluoroethylene (PTFE); a polystyrene (PS); an acrylonitrile butadiene styrene (ABS); a polycarbonate (PC); a polystyrene, for example, an expanded polystyrene (EPS) foam, such as, a Styrofoam EPS foam; or a polyvinylchloride (PVC); among other plastics. In one aspect, body 422 may be made of a low-density compressible material, for example, a plastic foam material, such as, expanded polypropylene (EPP), or its equivalent.

The one or more bodies 422 and 431 may made of an elastomeric material, for example, a natural polymer, such as, polyisoprene rubber; or a synthetic polymer, such as, a neoprene, a thermoplastic elastomer, a thermoplastic rubber, and a polyvinyl chloride, or an ethylene propylene diene monomer (EPDM) rubber, and the like.

As shown in FIGS. 57 and 58, body 422 or 431 may have a width or diameter 427 ranging from about 0.125 inches to about 12 inches, but is typically between about 0.5 inches to about 1.5 inches. Body 422 or 431 may have thickness 429 ranging from about 0.125 inches to about 6 inches, but is typically between about 0.25 inches to about 3.0 inches.

Figure 59:
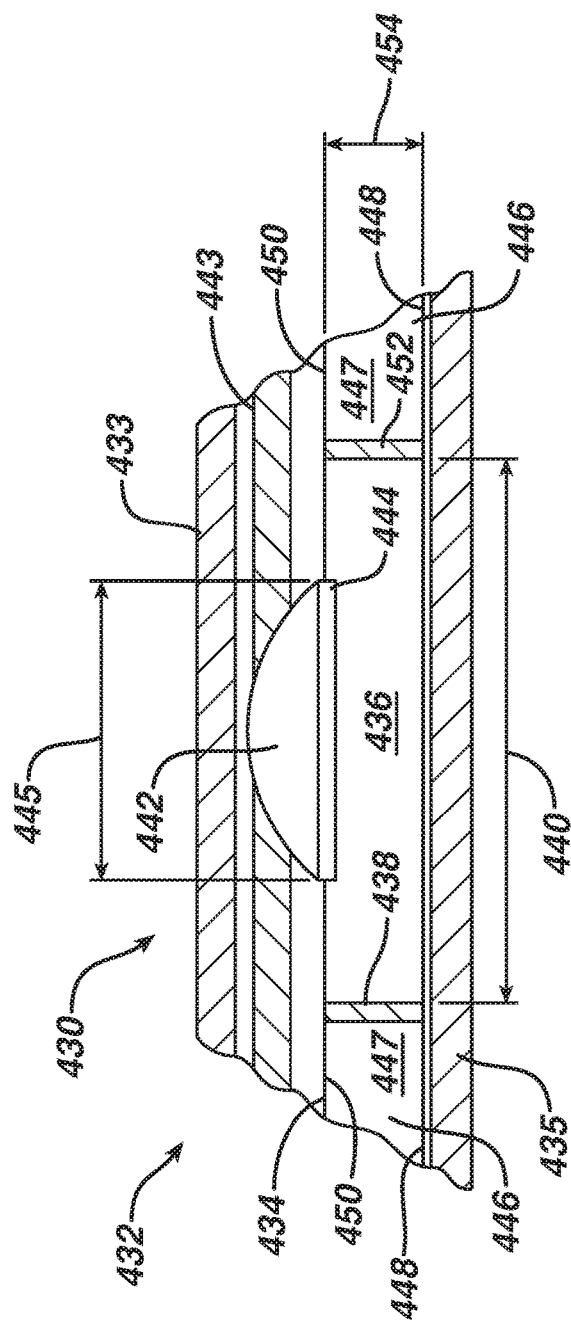
FIG. 59 is a schematic view of one aspect of the invention similar to the detail shown in FIG. 56, prior to impact, according to one aspect of the invention.
Figure 60:
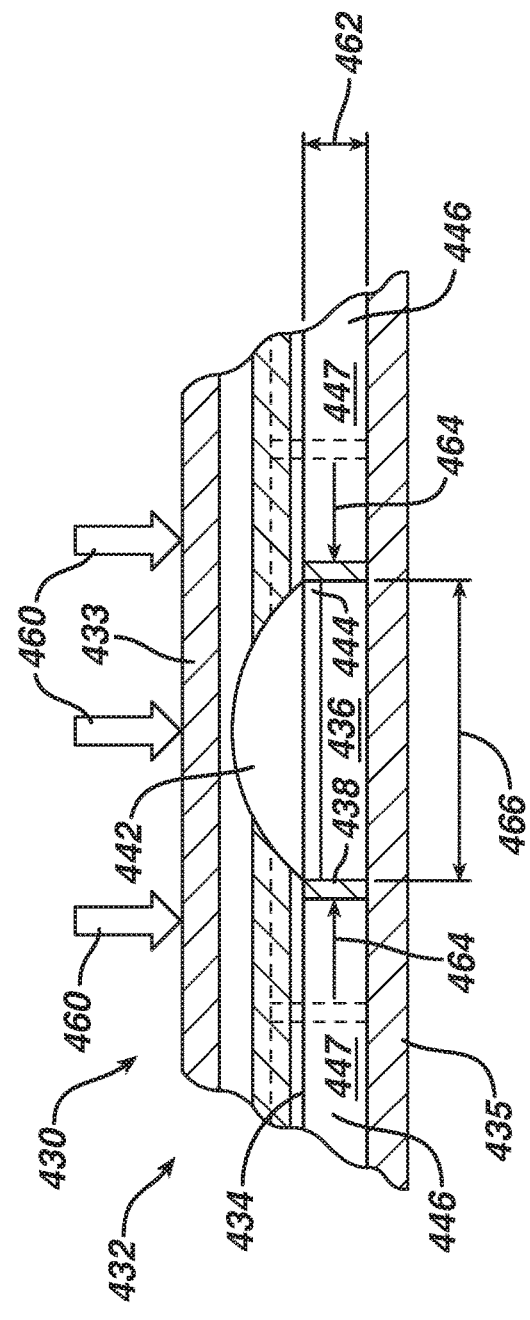
FIG. 60 is a schematic view of the aspect of the invention shown in FIG. 56, after impact, according to one aspect of the invention.

FIGS. 59 and 60 illustrate the envisioned deflection and/or deformation of the arrangement 412 according to one aspect of the invention. FIG. 59 is a schematic view of an aspect of the invention, partially in cross section, similar to the detail shown in FIG. 56, prior to impact. In order to facilitate illustration and description of aspects of the invention, FIGS. 59 and 60 schematically represent aspects of the invention in a planar format. It should be understood that the planar or linear structures shown in FIGS. 59 and 60 may typically assume a curved appearance according to aspects of the invention, for example, similar in appearance to the curved appearances of the structures shown in FIG. 56.

As shown in FIG. 59, one aspect of the invention comprises an arrangement 432, for example, similar to arrangement 412 described above, comprising a helmet 430 having a shell 433, a liner 434, for example, a deformable liner, positioned inside the shell 433 to protect the head 435 of a wearer. Though in this aspect of the invention, arrangement 432 is shown and described with respect to use as a headgear or helmet 430, arrangement 432 may be employed in any one or more of the liners, for example, the impact-dissipating liners disclosed herein.

Liner 434, which may have all the attributes of liner 414 disclosed above, typically includes at least one recess 436 having an internal surface 438 defining an internal dimension 440. Arrangement 432 according to one aspect includes at least one body 442 positioned within helmet 430. The at least one body 442 may typically be mounted beneath shell 433 of helmet 430 and may be mounted within an interface or a harness 443 mounted in shell 433. The at least one body 442 includes an external surface 444, for example, a surface about the perimeter or periphery of body 442, and an external dimension 445, for example, a thickness, a width, a depth, or a diameter, depending upon the shape of body 442. As described above, external surface 444 may typically be shaped to conform to the shape of the internal surface 438 of the at least one recess 436, though the shape of surface 444 may not conform to the shape of internal surface 438.

As shown in FIGS. 59 and 60, liner 434 may comprise a hollow, flexible liner having one or more cavities 446 containing a fluid 447, such as, water, an oil, an alcohol, and/or a diol. As shown in FIG. 59, cavities 446 may typically be bounded by an inner wall 448 of liner 434, an outer wall 450 of liner 434 and a lateral wall 452. Lateral wall 452 of cavity 446 may define the surface 438 of recess or through hole 436.

As shown in FIG. 59, under normal operation, for example, without any loading or impacts upon helmet 430, liner 434 with one or more recesses or through holes 436 may engage the head 435 (or any other surface) of the wearer (or of any surface being protected) and one or more bodies 442 is positioned above recess 436 in the shell 433 of helmet 430. Liner 434 may typically be dimensioned and shaped to comfortably adapt to the shape of the head 435 of the wearer. Liner 434 may typically have a first, or unloaded, thickness 454, and recess 436 may have a first, or unloaded, internal dimension 440.

FIG. 60 is a schematic view of the aspect of the invention, partially in cross section, shown in FIG. 59, after impact, according to one aspect of the invention. As shown in FIG. 60, arrangement 432 shown in FIG. 59 is typically compressed by a loading on helmet 430, for example, an impact loading, as indicated by arrows 460. According to aspects of the invention, due to the flexibility or compressibility of liner 434, as shown in FIG. 60, with load 460, liner 434 may typically be compressed to a thickness 462, for example, less than unloaded thickness 454. Also, due to the flexibility or compressibility of liner 434 and the presence of fluid 447 in cavities 446, with the compression of liner 434 to thickness 462, the internal dimension of recess 436 may also be compressed, as indicated by arrows 464 in FIG. 60. According to aspects of the invention, the compression of recess 436, for example, the reduction in the internal dimension 440 shown in FIG. 59 (and shown in phantom in FIG. 60) to internal dimension 466, or loaded internal dimension, of recess 436, for example, an internal dimension less than internal dimension 440 shown in FIG. 59. In one aspect, depending upon the severity of the load 460, loaded internal dimension 466 may be larger than the external dimension 445 of body 442. However, in other aspects of the invention, loaded internal dimension 466 may be reduced wherein at least a portion of internal surface 438 of recess 436 contacts at least a portion of external surface 444 of body 442. Again, according to aspects of the invention, this contact of the internal surface 438 with body 442 may limit the deformation of liner 434, and, it is understood at this time, may limit the dissipation of impact energy due to fluid kinetic energy and enhances the dissipation of impact energy by deformation (elastic deformation and/or plastic deformation) of liner 434 and/or of body 442. In other aspects of the invention, the use of one or more bodies 442 within recesses 436 may comprise one means for reducing the size (and hence the mass and weight) of liner 434. For example, in one aspect, when the expected loading is less severe and less impact energy is required to be dissipated, the size of recesses 436 may be increased to reduce the mass of liner 434 and the size of bodies 442 may be increased to increase the likelihood of contact between the internal surface 438 of recess 436 and the external surface 444 of body 442.

The deflections, deformations, and compressions shown in FIGS. 59 and 60 (and elsewhere herein) are representative only to aid in describing and illustrating aspects of the invention. The actual relative or absolute deflections, deformations, and compressions of aspects of the invention may be larger or smaller than illustrated, depending, among other things, upon the size of the helmet 430 and/or the size and use of liner 434, the materials of construction, and the loading experienced by aspects of the invention.

FIG. 61 is a schematic plan view of the aspect of the invention shown in FIGS. 59 and 60, before impact, according to one aspect of the invention. As shown in FIG. 61, liner 434 includes a recess or through hole 436 having an internal surface 438. Also, body 442 may have a circular cross section, for example, an axial circular cross section, an external surface 444, and an unloaded internal dimension 440.

FIG. 62 is a schematic plan view of the aspect of the invention shown in FIG. 61 after impact, according to one aspect of the invention. As shown in FIG. 62, under the influence of a load, for example, the load 460 shown in FIG. 60, and with the consequent compression of liner 434, recess 436 may typically be deformed or compressed as indicated by arrows 464 in FIG. 62 (and in FIG. 60). As a result, according to aspects of the invention, the internal dimension 440 of recess 436 shown in FIG. 61 may be compressed to internal dimension 466, for example, less than internal dimension 440. As discussed above, internal dimension 466 of recess 436 may be compressed where, as shown in FIG. 62, at least a portion of internal surface 438 of recess 436 may contact the external surface 444 of body 442. Accordingly, as noted above, this aspect of the invention may provide the ability to reduce the mass of the liner 434 and may also enhance the dissipation of impact energy via deformation of the liner 434 and/or the body 442.

FIGS. 63 through 66 are schematic plan views, similar to FIG. 61, of envisioned shapes of other bodies and recesses, before impact, according to other aspects of the invention. FIG. 63 is a plan view of a body 472 having a rounded rectangular axial cross section positioned within a liner having a rounded rectangular recess or through hole 476. FIG. 64 is plan view of a body 482 having an elliptical axial cross section positioned within a liner having an elliptical recess or through hole 486. FIG. 65 is plan view of a body 492 having a triangular axial cross section positioned within a liner having a triangular recess or through hole 496. FIG. 66 is plan view of a body 502 having a polygonal axial cross section, for example, an octagonal cross section, positioned within a liner having a polygonal, for example, an octagonal, recess or through hole 506. Though as shown in FIGS. 61 through 66, aspects of the invention may include bodies and recesses having comparable or complementary geometric shapes, it is also envisioned that aspects of the invention may include one or more bodies having one cross-sectional shape, such as, circular, rectangular, elliptical, and polygonal, and the like, where the shape of the recess or through hole may not be comparable or complementarity. For example, in one aspect, a body may be rectangular in cross section and the recess or through hole in which the body is positioned may be circular or elliptical in shape. Other shape combinations or permutations for a body and a recess or through hole will be apparent to those of skill in the art.

According to aspects of the invention the one or more recesses 416 (for example, as shown in FIGS. 53, 55, and 56) or 436 (for example, as shown in FIGS. 59 and 60), and the one or more bodies 422 or 442, respectively, may comprise a plurality of recesses 416 or 436 and a plurality of bodies 422 and 442, respectively, where each of the bodies are associated with a recess. In one aspect, the plurality of recesses 416 or 436 and bodies 422 or 442, respectively, may be distributed about liner 414 or 434, respectively, for example, uniformly distributed about liner 414 or 434, and the liner may be any one or more of the impact-dissipating liners disclosed herein. In one aspect, the plurality of recesses 416 or 436 and bodies 422 or 442, respectively, may be distributed about at least a portion of liner 414 or 434, respectively, for example, in one or more regions or areas of liner 414 or 434, or one or more of the impact-dissipating liners disclosed herein.

In another aspect of the invention, liner 414 or 434 may comprise a one or more recesses 416 or 436 and one or more bodies 422 or 442, respectively, positioned above, within, or adjacent the one or more recesses 416 or 436. This structure having one or more recesses 416 or 436 in liner 414 or 434, respectively, and one or more bodies 422 or 442, respectively, may comprise an individual liner insert, a portion of a liner, or an individual structure having a liquid-encased, deformable structure having the one or more recesses 416 or 436 and one or more bodies 422 or 442, respectively. One or more of these individual recess/body inserts may be located within a helmet or headgear, or in any impact-dissipating liner or structure disclosed herein.

Figure 67:
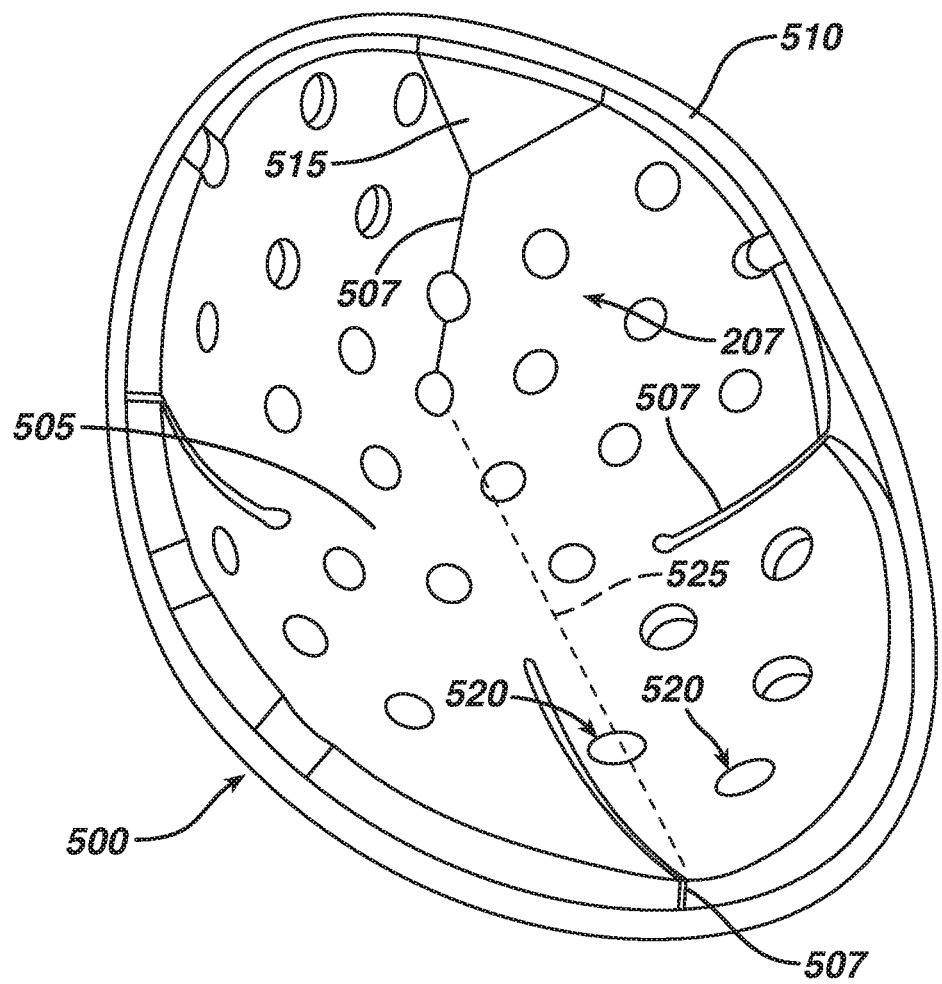
FIG. 67 is a photograph bottom perspective view of an arrangement of an impact dissipating liner within a helmet with at least one body mounted in the helmet, according to another aspect of the invention.
Figure 68:
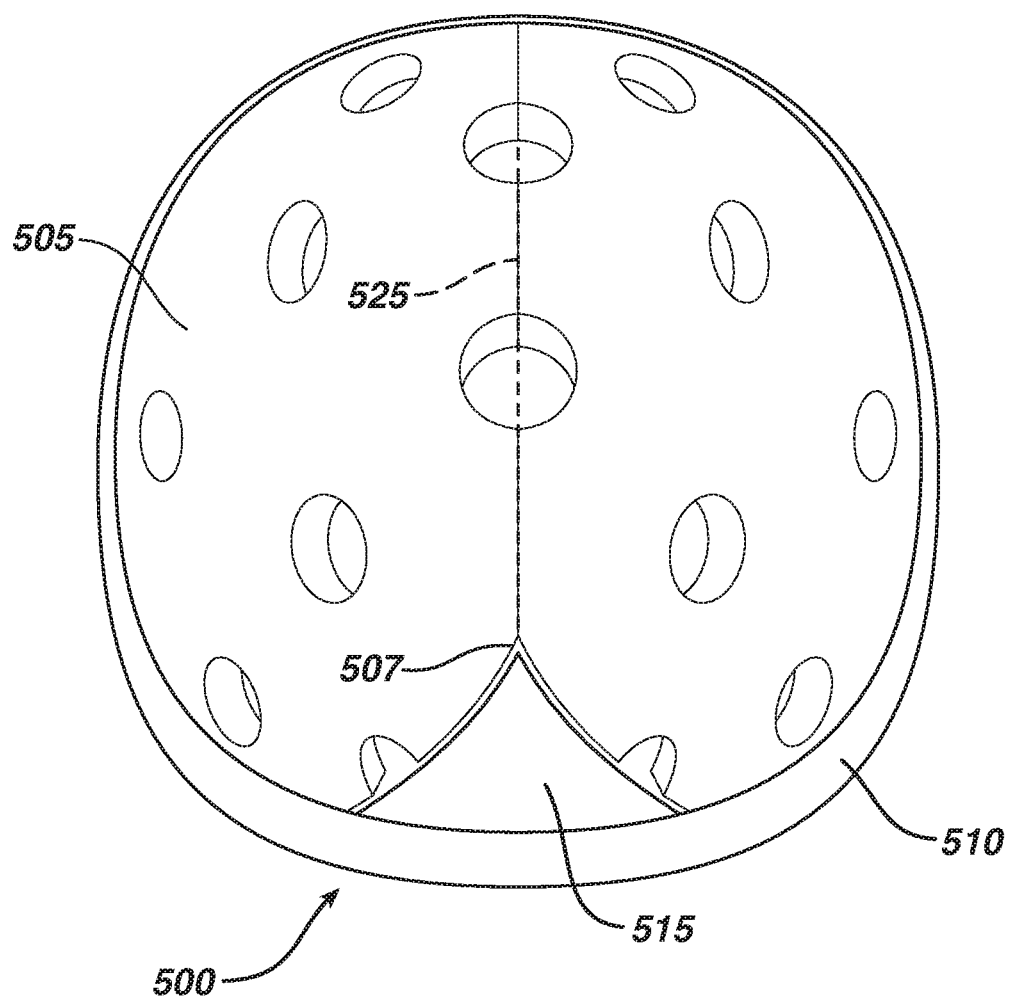
FIG. 68 is a photograph of a rear elevation view of the arrangement shown in FIG. 67.
Figure 69:
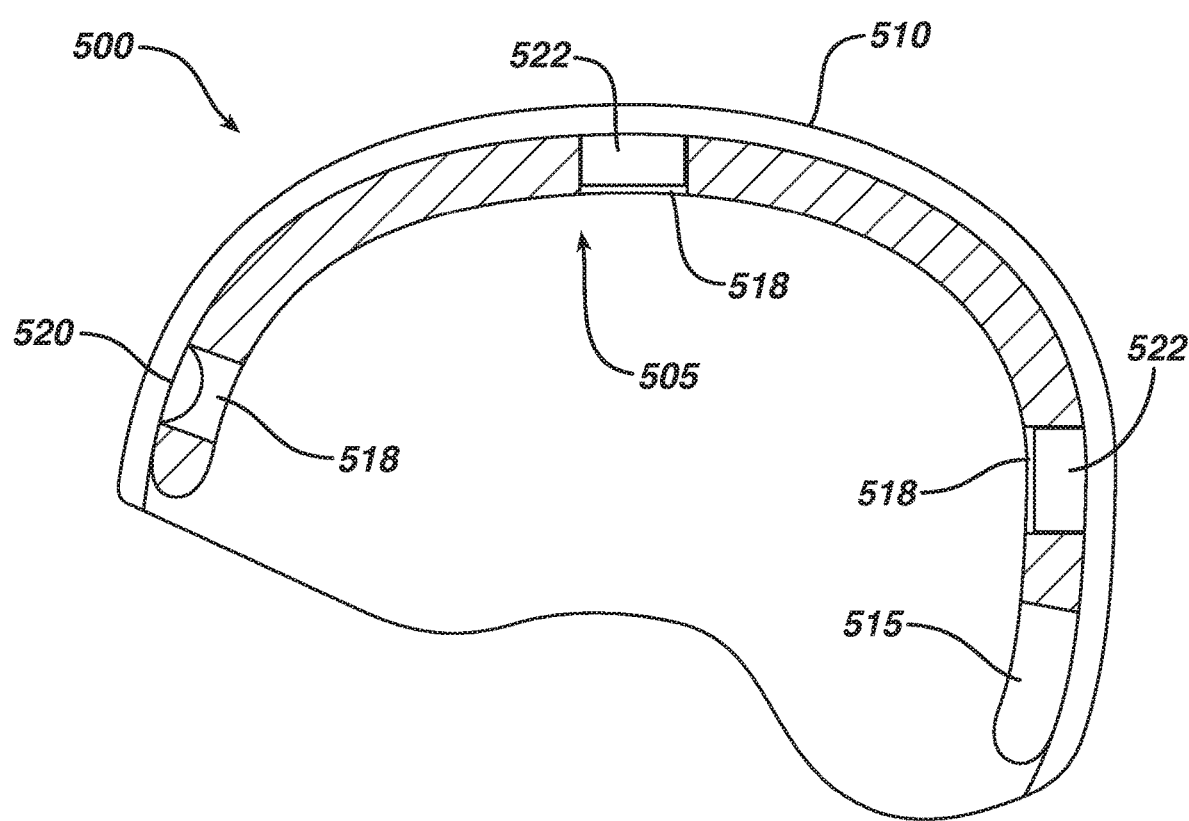
FIG. 69 is a cross-sectional view of arrangement shown in FIGS. 67 and 68.

FIGS. 67 and 68 illustrate further aspects of the invention wherein one or more bodies may be used to retain an impact resistant liner within a helmet or similar structure as disclosed herein. FIG. 67 is bottom perspective view of an arrangement 500 of an impact dissipating liner 505 within a helmet 510 with at least one body 515 mounted in helmet 510. FIG. 68 is a rear elevation view of the arrangement 500 shown in FIG. 67 having at least one body 515 mounted in helmet 510. FIG. 69 is a cross-sectional view of arrangement 500 shown in FIGS. 67 and 68 having impact-dissipating liner 505. In the aspect shown in FIGS. 67 and 68, for ease of illustration, helmet 510 comprises a transparent-helmet, though any type of helmet or hemispherical structure may be used. Impact dissipating liner 505 may be any one of the liners disclosed herein, for example, liner 140 shown in FIG. 27 or liner 200 shown in FIG. 37.

In the aspect of the invention shown in FIGS. 67, 68, and 69, at least one body 515 mounted to the internal surface of helmet 510, for example, with an adhesive, one or more hook and loop fasteners, or one or more mechanical fasteners. In the aspect shown in FIGS. 67-69, the at least one body 515 is shown as a triangular body, for example, similar in shape to body 492 shown in FIG. 65; however, according to aspects of the invention, body 515 may take any conventional shape, for example, any one of the shapes shown in FIGS. 61 through 66. According to this aspect, body 515 functions to at least partially retain liner 505 within helmet 510 or any other hemispherical structure. In one aspect, liner 505 may be retained in helmet 510 by means of one or more bodies 515 alone, that is, without the need of further means of retaining in helmet 510. For example, in one aspect, shown most clearly in FIG. 68, body 515 may engage or contact the surfaces of a radially directed cavity 507 of liner 505 and at least partially retain liner 505 in helmet 510. The one or more bodies 515 may engage any one or more of the cavities 507 in liner 505, for example, in the rear of the liner 505 as shown in FIGS. 68 and 69, in the front of the liner 505, and/or on either side of the liner 505.

In another aspect of the invention, as shown most clearly in FIG. 69, body 515 may cooperate with one or further bodies 520 and/or 522 (similar to bodies 431 shown in FIGS. 53 and 55) mounted in helmet 510 and/or cooperate with one or more bodies 515 mounted in helmet 510 to at least partially retain liner 505 in helmet 510. For example, as shown in FIG. 69, one or more bodies 520 and 522 may be mounted to the internal surface of helmet 510 and be sized and positioned to engage or be received by one or more recesses 518 in liner 505. Though shown hemispherical and cylindrical in FIG. 69, the one or more bodies 520 and 522 may take the shape of any one of the bodies disclosed herein, for example, any one of the shapes shown in FIGS. 61-65, such as, right circular cylindrical bodies. In one aspect, two or more bodies 520 and 522 mounted to the internal surface of helmet 510, for example, equally spaced along a longitudinal centerline (front to back) 525 (See FIGS. 67 and 68) of helmet 510, may engage two or more recesses 518 in liner 505, for example, equally spaced along the longitudinal centerline 525 (front to back) of liner 505. According to aspects of the invention, one or more bodies 515 and 1 or more bodies 520 and/or 522 may be used to at least partially retain liner 505 in helmet 510, or any hemispherical structure. In one aspect, one or more bodies 515 and one or more bodies 520 and/or 522 may substantially retain liner 505 in helmet 510, or any hemispherical structure, for example, without the need for further retaining means. In one aspect, one or more bodies 515 and/or one or more bodies 520 and/or 522 may provide the dual function of substantially retaining liner 505 in helmet 510 while also providing at least some of the enhanced dissipation of impact energy function, as illustrated and described with respect to FIGS. 59 and 60.

FIG. 70 is a front elevation view of the impact-dissipating liner 140 shown in FIGS. 27 and 28, the rear elevation view being a mirror image thereof. FIG. 71 is a right-side elevation view of the impact-dissipating liner 140 shown in FIGS. 27 and 28. FIG. 72 is a left-side elevation view of the impact-dissipating liner 140 shown in FIGS. 27 and 28.

Though not shown in the figures, it is envisioned that aspects of the invention may include devices and arrangements for at least partially securing the disclosed headgear to a head, for example, to the head of human or an animal. This includes straps, cords, strings, clasps, buckles, snaps, hooks, and loop and hook type fasteners (such as, Velcro® loop and hook type fasteners), among others.

Aspects of the present invention provide versatile impact-dissipating liners for bodily and structural protection. For example, when applied to head protection, aspects of the invention can provide head protection at both low-energy and high-energy impacts, from any direction, and at any one point in time. Moreover, unlike prior art head protection, aspects of the present invention have been tested and confirmed to provide repeatable impact protection, for example, protection from multiple impacts. In addition to the energy absorbing function of aspects of the invention, the lower-profile nature of aspects of the invention compared to the prior art can provide the benefit of reducing the transmission of rotational or torsional loading on the head, neck, and/or spine by providing a lower "lever arm" to any loading. For example, where the prior art is characterized by head protection having thicker liners, for instance, 2 to 3 inches thick, aspects of the present invention can be adapted to provide a liner thickness of only about ½ inch in thickness. As known in the art, this reduction in thickness, and thus reduction of impact torsional lever arm, can dramatically reduce the torsional loading upon the head, neck, and/or spine of the user.

It will be apparent from the foregoing that the invention, in its many aspects, provides impact-dissipating liners, method of fabricating impact-dissipating liners, helmets and headgear having impact-dissipating liners, arrangements, liners, and methods for protecting heads and other bodily structures, or other general non-bodily structures for which protection is desired. Again, though aspects of the invention were shown and described with respect to a headgear and helmets, it is envisioned that aspects of the invention may used for any barrier, structure, or any impact-dissipating liner disclosed herein. In one aspect, a barrier for a motor sport may comprise one or more of the impact-dissipating liners disclosed herein, for example, a barrier or wall of a race track (for example, a motor vehicle race track) or a race course (for example, a motocross course), and the like.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "including," and/or "having" when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical applications, and to enable others of ordinary skill in the art to understand the disclosure for various embodiments with various modifications as are suited to the particular use contemplated.

This written description uses examples to disclose the invention, including the best mode envisioned, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A helmet comprising:
a helmet shell;
a deformable, fluid-encasing liner positioned in the helmet shell and having at least one recess having an internal surface; and
at least one body having an external surface, the at least one body mounted to the helmet shell and positioned within the at least one recess in the deformable liner;
wherein the at least one body positions the deformable, fluid-encasing liner within the helmet shell.

2. The helmet as recited in claim 1, wherein the at least one body further retains the deformable liner within the outer shell.

3. The helmet as recited in claim 1, wherein the at least one recess comprises a plurality of recesses distributed about the deformable liner.

4. The helmet as recited in claim 1, wherein the at least one recess comprises a plurality of though holes in the deformable liner.

5. The helmet as recited in claim 1, wherein the at least one body comprises a cylindrical body.

6. The helmet as recited in claim 5, wherein the at least one cylindrical body comprises a right cylindrical body.

7. The helmet as recited in claim 6, wherein the at least one right cylindrical body comprises a right circular cylindrical body.

8. The helmet as recited in claim 1, wherein the at least one body comprises a compressible material.

9. The helmet as recited in claim 1, wherein the at least one body comprises a foam material.

10. The helmet as recited in claim 1, wherein the at least one body comprises an elastomeric material.

11. The helmet as recited in claim 1, wherein the at least one recess comprises a plurality of through holes distributed about the deformable liner.

12. The helmet as recited in claim 1, wherein the at least one body comprises a plurality of pins.

13. The helmet as recited in claim 1, wherein the at least one body is mounted to the helmet shell by one of an adhesive, loop fasteners, and mechanical fasteners.

14. The helmet as recited in claim 1, wherein, upon impact upon the helmet, at least a portion of the internal surface of the at least one recess contacts at least a portion of the external surface of the least one body.

15. The helmet as recited in claim 14, wherein contact of the at least the portion of the internal surface of the least one recess with the at least the portion of the external surface of the least one body dissipates at least some impact energy to the internal surface of the at least one recess.

16. The helmet as recited in claim 14, wherein contact between the at least the portion of the internal surface of the at least one recess with the at least the portion of the external surface of the at least one body limits reduction of an internal dimension of the at least one recess.

17. The helmet as recited in claim 1, wherein the at least one body comprises a diameter between 0.5 inches and 1.5 inches.

18. The helmet as recited in claim 1, wherein the at least one body comprises a thickness between 0.25 inches and 3 inches.

19. The helmet as recited in claim 1, wherein the fluid encased in the deformable, fluid-encasing liner comprises one of water and an oil.

20. The helmet as recited in claim 1, wherein the helmet comprises at least one of a baseball catcher's helmet, a baseball batter's helmet, a soft ball catcher's helmet, a softball batter's helmet, a hockey helmet, a hockey goalie mask, a motorcycle helmet, a motor cross helmet, a skiing helmet, a snowboarding helmet, a skateboarding helmet, a lacrosse helmet, a bicycle helmet, a jockey helmet, an official's helmet, a medical protection helmet, a rock or ice climbing helmet, a mountain climbing helmet, a football helmet, a construction helmet, and a military helmet.

\* \* \* \* \*